United States Patent [19]
Pulsipher et al.

[11] Patent Number: 5,948,055
[45] Date of Patent: Sep. 7, 1999

[54] DISTRIBUTED INTERNET MONITORING SYSTEM AND METHOD

[75] Inventors: Eric A. Pulsipher; Darren D. Smith; Dominic L. Ruffatto, all of Fort Collins, Colo.

[73] Assignee: Hewlett-Packard Company, Palo Alto, Calif.

[21] Appl. No.: 08/705,358

[22] Filed: Aug. 29, 1996

[51] Int. Cl.⁶ .................................................. G06F 17/00
[52] U.S. Cl. ........................................................... 709/202
[58] Field of Search ......................... 395/184.01, 185.01, 395/180, 200.32, 200.54; 370/408; 340/825.06; 709/202

[56] References Cited

U.S. PATENT DOCUMENTS

| | | | |
|---|---|---|---|
| 5,561,769 | 10/1996 | Kumar et al. | 395/200.05 |
| 5,568,605 | 10/1996 | Clouston et al. | 395/182.02 |
| 5,651,006 | 7/1997 | Fujino et al. | 370/408 |
| 5,655,081 | 8/1997 | Bonnell et al. | 395/200.32 |
| 5,689,645 | 11/1997 | Schettler et al. | 395/200.1 |
| 5,706,508 | 1/1998 | Chen et al. | 395/616 |
| 5,758,083 | 5/1998 | Singh et al. | 395/200.53 |
| 5,774,669 | 6/1998 | George et al. | 395/200.54 |

OTHER PUBLICATIONS

Solution of a problem in Concurrent Programming Control, Dijkstra, E. ACM, 1965.
RFC 768 User Datagram Protocol, Postel, J., 1980.
RFC 827 Exterior Gateway Protocol (EGP), Rosen, E., 1982.
Variations in C, Schustack, S. Microsoft Press, 1985.
Operating Systems Design and Implmentation, Tanenbaum, A. Prentice–Hall, 1987.
Computer Architecture and VAX Assembly Language Programming, Brink et al., Benjamin Cummings Publishing, 1987.
RFC 1351 SNMP Administrative Model, Davin et al., 1992.
An SNMP–based Expert Network Management System for a Large–Scale OSI–based Campus Network, Mansfield et al. 1992.

Primary Examiner—Ellis B. Ramirez

[57] ABSTRACT

An internet monitoring system efficiently discovers topology data of a network by utilizing a distributed object model. The topology data represents the devices and interconnections of the network and can be used to display various conceptual views of the network at a management station. In accordance with the internet monitoring system, different sets of topology data are discovered with corresponding sets of computer-based stations, such as management stations or collection stations, by discovering the topology at respective regions of the network. Further, the different sets of topology data can be combined at a management station to derive a global view of the network. Both management and remote stations include a layout mechanism for receiving topology data and driving the output device based upon the topology data and a discovery mechanism for discovering and storing the topology data. The discovery mechanism includes a network monitor for discovering topology data corresponding with a particular station-specific region of the network, a topology database for storing topology data, and a topology manager for controlling the topology database. The management station, unlike the collection station, utilizes a replicator for communicating with at least one other station to receive topology data from a different region of the network and to forward the different set of topology data to its respective topology manager. The management station has algorithms for handling overlap in monitored regions through the choice of a primary station for each object monitored.

57 Claims, 31 Drawing Sheets

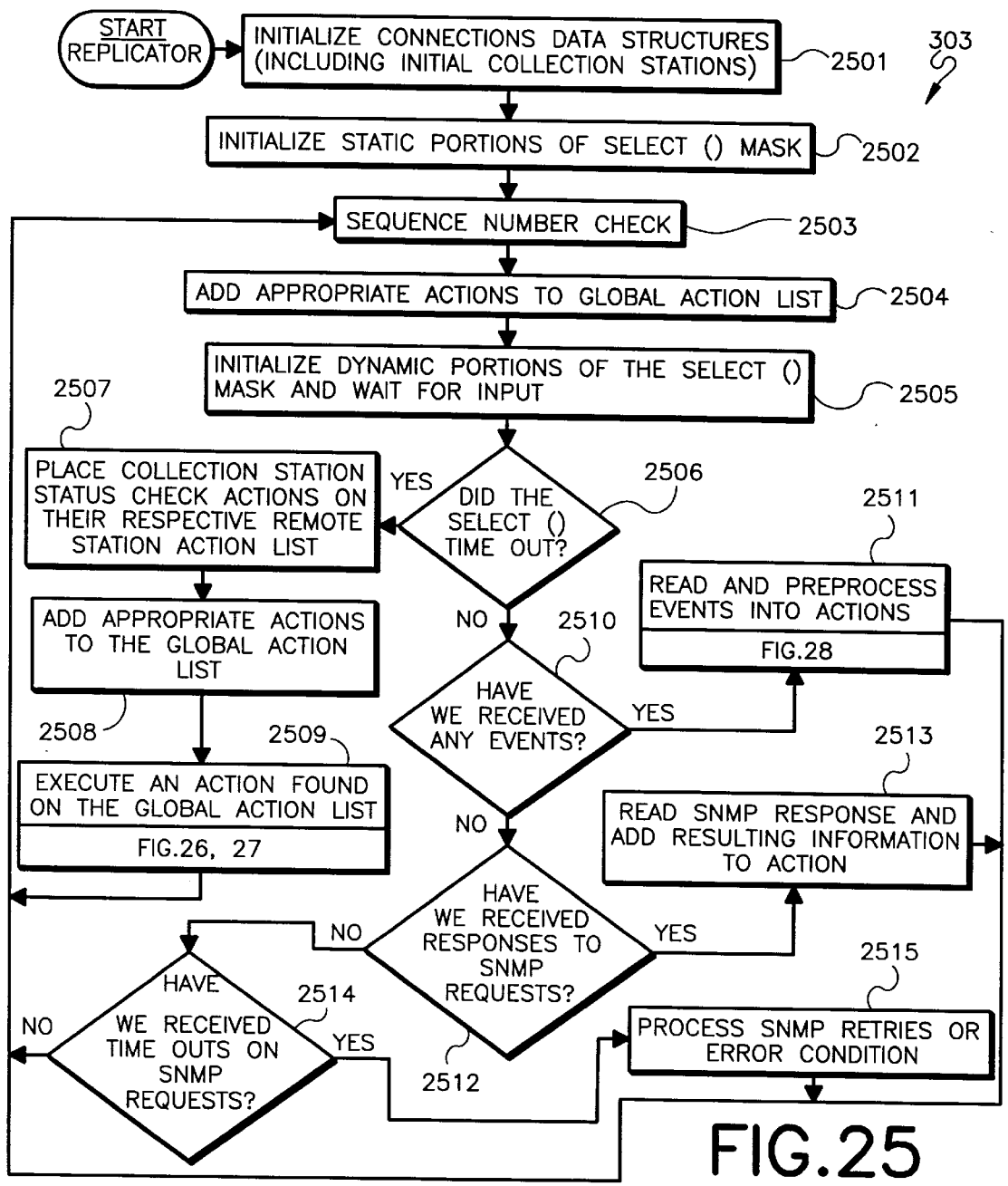

DISTRIBUTED INTERNET MONITORING SYSTEM AND METHOD

FIELD OF THE INVENTION

The present inventions generally relates to data communication networks and, more particularly, to a distributed internet monitoring system and method for permitting high performance generation of a network management map of a data communication network by using a plurality of stations to monitor and exchange data regarding the network.

BACKGROUND OF THE INVENTION

A data communications network generally includes a group of devices, for instance, computers, repeaters, bridges, routers, etc., situated at network nodes and a collection of communication channels for interconnecting the various nodes. Hardware and software associated with the network and particularly the devices permit the devices to exchange data electronically via the communication channels.

The size of networks varies. A local area network (LAN) is a network of devices in close proximity, typically less than one mile, and usually connected by a single cable, for instance, a coaxial cable. A wide area network (WAN) is a network of devices which are separated by longer distances, often connected by, for example, telephone lines or satellite links. In fact, some WANs span the U.S. as well as the world. Furthermore, many of these networks are widely available for use by the public, including commonly universities and commercial industries.

A very popular industry standard protocol for data communication along the networks is the Internet Protocol (IP). This protocol was originally developed by the U.S. government's Department of Defense, and has been dedicated for public use by the U.S. government. In time, the Transmission Control Protocol (TCP) and the User Datagram Protocol (UDP) were developed for use with the IP. The former protocol (TCP/IP) is a protocol which guarantees transfer of data without errors, as it implements certain check functionality, and the latter protocol (UDP/IP) is a protocol which does not guarantee transfer of data, but requires much less overhead than the TCP/IP platform. Furthermore, in order to keep track of and manage the various devices situated on a network, the Simple Network Management Protocol (SNMP) was eventually developed for use with a UDP/IP platform. The use of the foregoing protocols has become extensive in the industry, and numerous vendors now manufacture many types of network devices which can employ these protocols.

Management stations are connected to a network and are configured by a management software package to discover the network topology. The network topology generally includes the network nodes and node interconnections existing on the network. From the network topology, the station constructs a network management map, which comprises a collection of various submaps. Each submap corresponds with a different view of the network and any can be driven to a display device. Typically, the submaps are arranged in a hierarchy.

As an example of a network management map, consider the following possible implementation, which has been implemented in the past in the well known "OPENVIEW"™ management software, which is manufactured by and commercially available from the Hewlett-Packard Company, U.S.A. The map has a root submap defined at a root level. The root submap represents the highest logical level submap in the hierarchy and shows objects acting as anchor points for different submap hierarchies. Each hierarchy is essentially a separate management domain. This could be, for instance, a network, logical grouping of nodes, or some other domain. An internet submap is defined at an internet level and is generated by "exploding" an object within the root submap. "Exploding" in the context of this document means that the user prompts the station with an input device to break down and provide more data pertaining to an object at issue. Further, the internet submap illustrates objects in the form of networks and routers. Any one of a number of network submaps can be exploded from the internet submap. Each network submap shows objects in the form of segments and connectors. Any one of a number of segment submaps can be exploded from an object within a network submap. Each segment submap shows objects in the form of network nodes. Finally, any one of a number of node submaps can be exploded from an object within a segment submap. Each node submap shows objects in the form of interfaces within that node.

Hewlett-Packard's "OPENVIEW"™ management software has been the subject of several patents, including for instance, U.S. Pat. No. 5,185,860 issued to J. C. Wu on Feb. 9, 1993, and U.S. Pat. No. 5,276,789 issued to Besaw et al. on Jan. 4, 1994. U.S. Pat. No. 5,185,860 describes an automatic discovery system for a management station for determining the network devices and interconnections of a network, or the topology. U.S. Pat. No. 5,276,789 describes a graphic display system for a management station for graphically displaying the topology of a network and provides for various views (including, internet, network, segment, and node views) that can be requested by a user.

Although the presently available SNMP management stations and related software are meritorious to an extent, the art of SNMP management is still in a state of infancy, and the performance of these management stations and software can still be enhanced and optimized. A specific area where optimization is envisioned involves the discovery mechanism, which monitors and manages the network and systems connected on the network. In many management schemes, monitoring of the network originates from a single management station, no matter how large or geographically distributed. This was the practice in Hewlett-Packard's "OPENVIEW"™ management software as is described in, for example, U.S. Pat. No. 5,185,860 to J. C. Wu.

Unfortunately, this operation methodology is problematic to an extent and inhibits optimal performance. It limits the number of nodes that can be monitored because of limited system resources. It results in large amounts of traffic over expensive connections. Moreover, if multiple sites within the environment want data about the entire network, each site must directly monitor the entire network itself. No sharing of data occurs.

SUMMARY OF THE INVENTION

An object of the present invention is to overcome the inadequacies and deficiencies of the prior art as noted previously in the background section.

Another object of the present invention is to provide an internet monitoring system that increases the size of the environment that can be monitored.

Another object of the present invention is to provide an internet monitoring system that minimizes traffic on a network.

Another object of the present invention is to provide an internet monitoring system that reduces traffic over expensive links in a network in order to minimize costs.

Another object of the present invention is to provide an internet monitoring system that can share data with other internet monitoring systems in order to achieve a distributed monitoring model and higher performance.

Briefly described, the present invention is a distributed internet monitoring system and method that implement a distributed internet monitoring model, where cooperating management and/or collection stations can share topology data in an efficient manner. The topology data represents the devices and interconnections of the network and can be used to display various conceptual views of the network at a management station. In accordance with the internet monitoring system, different sets of topology data are discovered with corresponding sets of computer-based stations, such as management stations or collection stations, by discovering the topology at respective regions of the network. Further, the different sets of topology data can be combined at a management station to derive a global view of the network. Both management and collection stations include a layout mechanism for receiving topology data and driving the output device based upon the topology data and a discovery mechanism for discovering and storing the topology data. The discovery mechanism includes a network monitor for discovering topology data corresponding with a particular station-specific region of the network, a topology database (dB) for storing topology data, and a topology manager for controlling the topology database. The management station, unlike the collection station, has a replicator for communicating with at least one other station to receive topology data from a different region of the network and to forward the different set of topology data to its respective topology manager.

The present invention can also be viewed as a novel methodology. The method efficiently discovers network topology data and comprises the following steps: determining a various sets of topology data with a corresponding set of management and/or collection stations by discovering the devices and interconnections situated at predetermined respective areas of the network and combining the different sets of the topology data at a management station to derive a global view of the entire network topology data at the management station.

In addition to achieving all of the aforementioned objects, the present invention has numerous advantages, a few of which are delineated hereafter, as mere examples.

An advantage of the distributed internet monitoring system is that it greatly increases scaleability in terms of the size of the environment that can be monitored accurately.

Another advantage of the internet monitoring system is that it greatly reduces traffic over expensive links in order to save on costs.

Another advantage of the distributed internet monitoring system is that it implements a distributed model that matches well with a user's environment and the way the user works.

Another advantage of the internet monitoring system is that it implements cooperating management and/or collection stations that can share data, thereby reducing redundant and unnecessary polling.

Another advantage of the internet monitoring system is that it provides for backup capabilities for insuring more accurate data and more reliable access to that data.

Another advantage of the distributed internet monitoring system is that it provides for a replication process for collecting data at a remote site and bringing it to a management station that is to generate the global view of the network.

Another advantage of the distributed internet monitoring system is that it provides a unique way in which multiple sets of topology data is merged for a common global view.

Another advantage of the distributed internet monitoring system is that it provides for a backup collection station if an original collection station goes down or can no longer be reached.

Another advantage of the distributed internet monitoring system is that it provides support for handling the overlap in monitored objects between collection stations.

Other objects, features, and advantages of the present invention will become apparent to one with skill in the art upon examination of the following drawings and detailed description. It is intended that all such additional objects, features, and advantages be included herein within the scope of the present invention, as is defined in the claims.

BRIEF DESCRIPTION OF THE DRAWINGS

The present invention can be better understood with reference to the following drawings and detailed description. The drawings are not necessarily to scale, emphasis instead being placed upon clearly illustrating principles of the invention. Moreover, in the drawings, like reference numerals designate corresponding parts throughout the several views.

FIG. 25 is a flow chart showing a possible methodology that can be implemented by the replicator in the management station of FIG. 3A;

DETAILED DESCRIPTION OF THE PREFERRED EMBODIMENT

The discovery/layout software for implementing the distributed internet monitoring system of the present invention can be stored on any computer readable medium for use by or in connection with a computer related system or method.

In the context of this document, a computer readable medium is an electronic, magnetic, optical or other physical device or means that can contain or store a computer program for use by or in connection with a computer related system or method. Thus, for example, the novel discovery/layout software can be stored and transported on a portable data storage device (e.g., a cassette), or as another example, can be stored in the memory of a computer for the purpose of driving the computer when called upon.

A. Management/Collection Station

Figure 1:
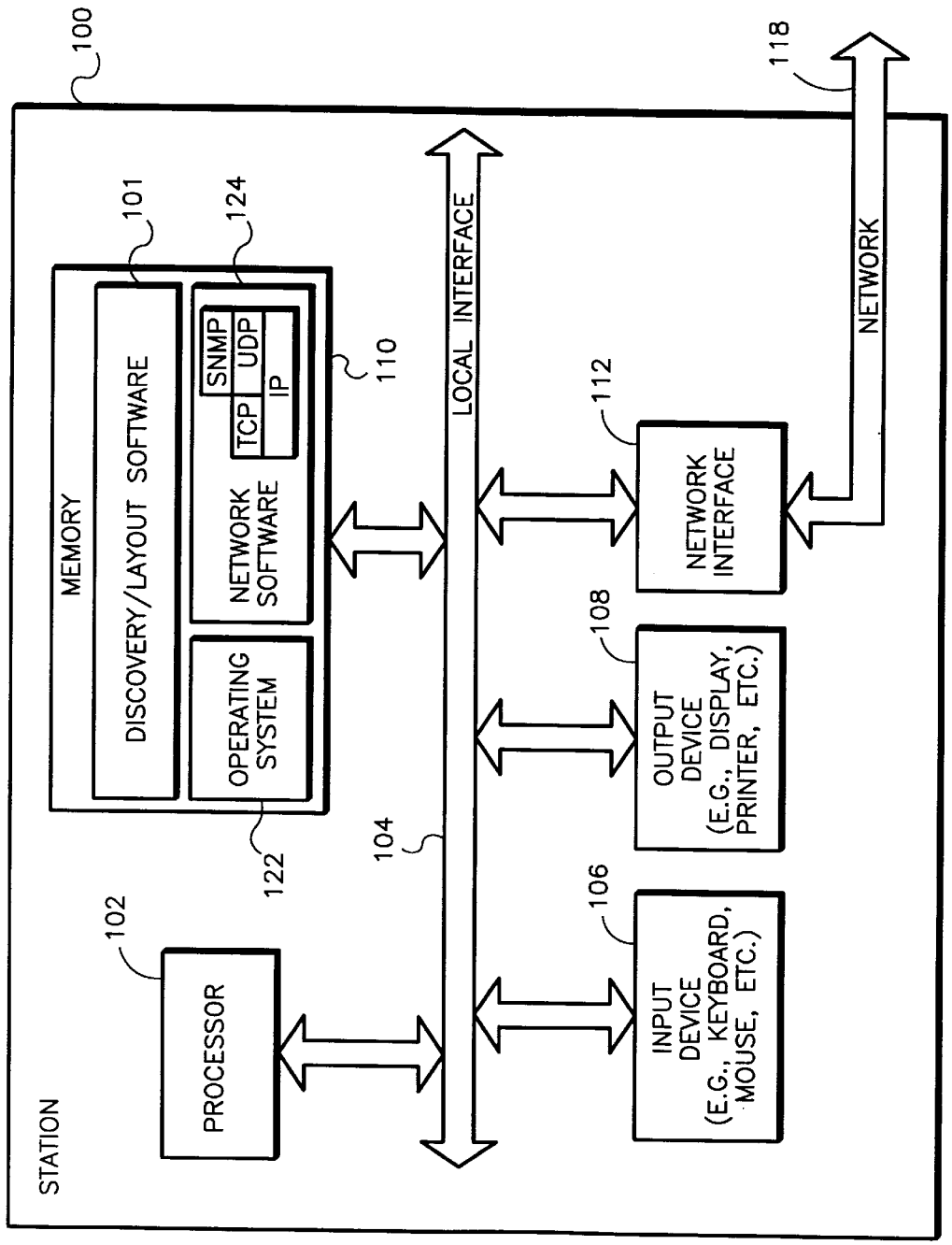
FIG. 1 is a block diagram of a management station and a collection station, both of which can be used to implement the distributed internet monitoring system and method of the present invention.

FIG. 1 shows a block diagram of an object-oriented station 100 (e.g., management station 100a of FIG. 3A or collection station 100b of FIG. 3B) that can be implemented with any suitable computer. A group of the stations 100 is utilized in order to implement the distributed internet monitoring system. As shown in FIG. 1, the computer-based station 100 contains and is driven by discovery/layout software 101, which implements the distributed internet monitoring system of the present invention. The station 100 contains any suitable processor 102. The processor 102 communicates to other elements within the station 100 over a local interface 104, such as a bus or bus network. An input device 106, for example, a keyboard or mouse, is used to input data from a user of the station 100, and an output device 108, for example, a display or printer, is used to output data to the user. A network interface 112 is used to interface the station 100 to a network 118 in order to allow the station 100 to act as a node on a network 118. A memory 110 within the station 100 contains the discovery/layout software 101, which implements the distributed internet monitoring system of the present invention. Conceptually, the memory 110 is meant to be all-inclusive in that it includes both the volatile and nonvolatile memory elements, e.g., the random access memory, disk storage, cmos initialization memory, etc.

The discovery/layout software 101 communicates with any suitable operating system 122 and network software 124 to discover the nodes on the network 118 and to communicate with other computers executing the discovery/layout software. The network software 124 serves as the intelligence, including validation, for the data communication protocols. As further shown in FIG. 1, in the preferred embodiment, the network software implements TCP and UDP over IP, and the SNMP over the UDP. All of the foregoing protocols are well known in the art.

The discovery/layout software 101 implements object-oriented functionality. In the context of SNMP managers and this document, object-oriented means that most of the management system actions and processes that the user can invoke are oriented toward a class of devices rather than individually managed network nodes.

Figure 2:
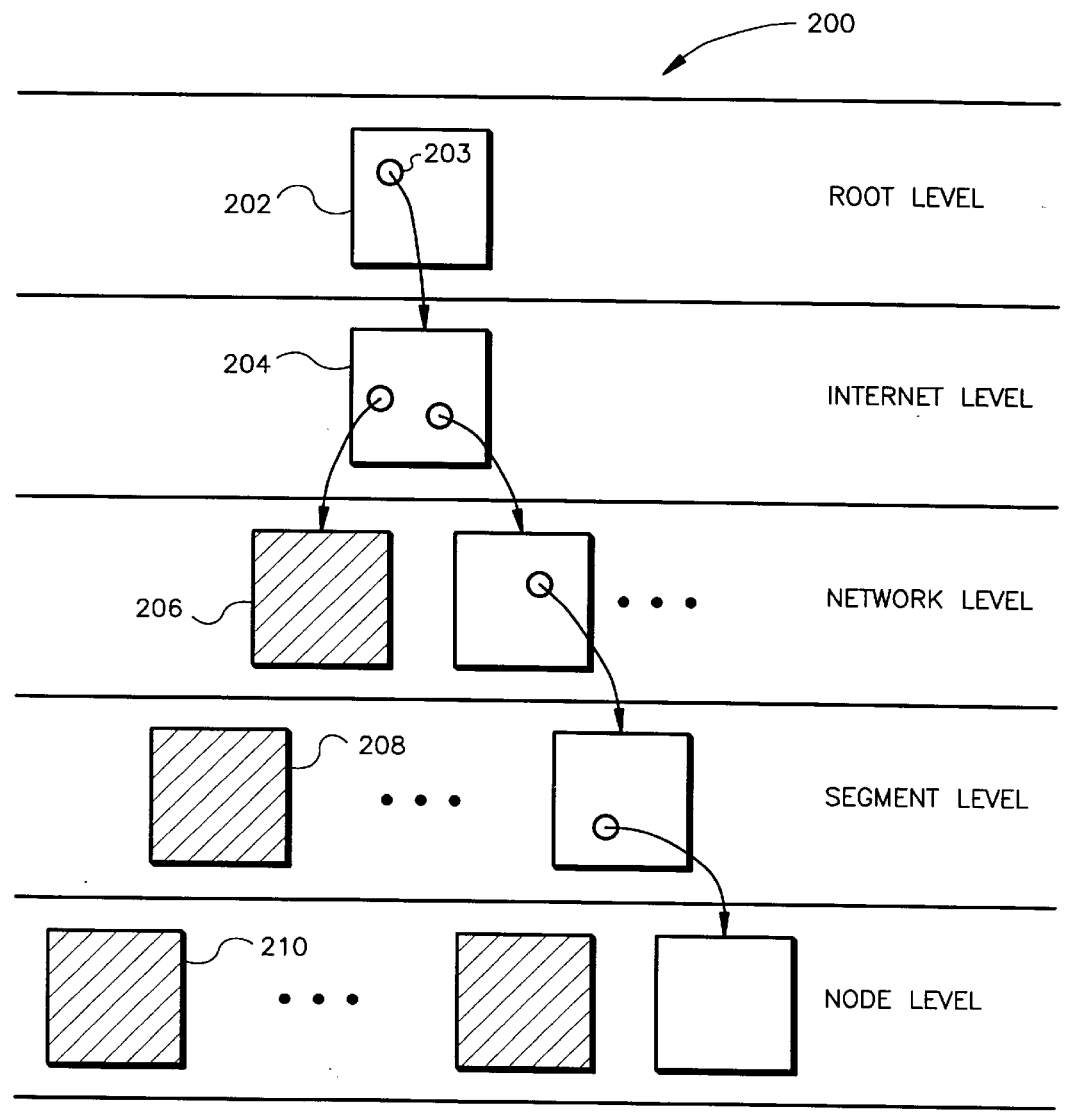
FIG. 2 is a block diagram of a network management map, which comprises a collection of submaps generated by the station of FIG. 1 and which can be displayed with the output device of FIG. 1.

Generally, the discovery/layout software 101 of the station 100 of FIG. 1 is configured to discover the network topology, that is, network nodes and node interconnections existing on the network 118 in a particular region that is defined for the station 100, and to construct a network management map for the particular region comprising various submaps, any of which can be used for displaying the network topology on the output device 108. FIG. 2 shows a network management map 200 which is generated by the discovery/layout software 101 from topology data discovered from the network 118. The discovery/layout software 101 can drive any of the various submaps to the display 108 (FIG. 1) for viewing by the user.

The submaps in the map 200 of FIG. 2 are arranged in a hierarchy. A root submap 202 is defined at a root level. The root submap 202 represents the highest logical level submap in the hierarchy and shows objects 203 acting as anchor points for different submap hierarchies. Each hierarchy is a separate management domain. This could be, for instance, a network, logical grouping of nodes, or some other domain. An internet submap 204 is defined at an internet level and is generated by "exploding" an object 203 within the root submap 202. "Exploding" in the context of this document means that the user prompts the station 100 with the input device 106 to break down and provide more data pertaining to the object 203 at issue. Further, the internet submap 204 illustrates objects 203 in the form of networks and routers. Any one of a number of network submaps 206 can be exploded from the internet submap 204. Each network submap 206 shows objects 203 in the form of segments and connectors. Any one of a number of segment submaps 208 can be exploded from an object 203 within a network submap 206. Each segment submap 208 shows objects in the form of network nodes. Finally, any one of a number of node submaps 210 can be exploded from an object 203 within a segment submap 208. Each node submap 210 shows objects 203 in the form of interfaces within that node.

1. Management Station

Figure 3A:
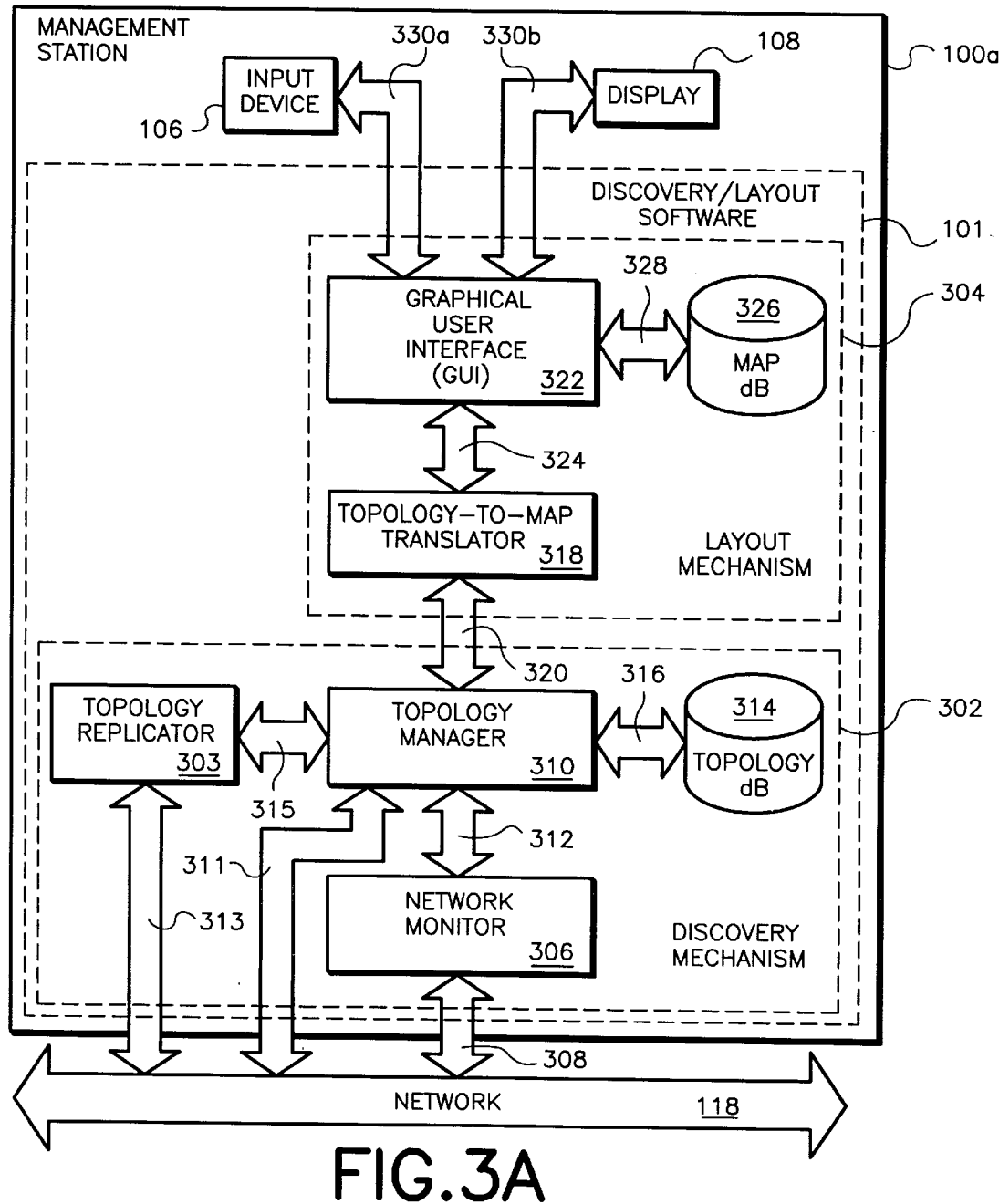
FIG. 3A is a block diagram illustrating the discovery/layout software of the management station of FIG. 1, which software includes a replicator.

The architecture of the management station 100a is shown in FIG. 3A. At a general architecture level, the discovery/layout software 101 of the management station 100a comprises a discovery mechanism 302 for discovering nodes and interconnections of the network 118 that are within the particular region defined for the management station 100a and a layout mechanism 304 for receiving topology data from the discovery mechanism 302 and for generating the network management map 200 (FIG. 2) for driving the display 108. Moreover, one or more integrating applications (not shown) may communicate display and map information with the layout mechanism 304.

The discovery mechanism 302 has a network monitor 306 in communication with the network 118 as indicated by arrow 308, a topology manager 310 in communication with the network monitor 306 as indicated by arrow 312, and a topology database (dB) 314 in communication with the topology manager 310 as indicated by arrow 316.

The network monitor 306 transmits and receives data packets to and from the network 118. The network monitor 306 discovers and monitors network topology, as indicated by arrow 308. When network topology changes on the network, the network monitor 306 generates events, or traps (SNMP vernacular), which include an object identifier and object change information. The network monitor 306 can also receive events from other devices, such as a router, in the network 118. The network monitor 306 interacts with the network 118 by way of the network software 124 (FIG. 1), which essentially comprises protocol stacks, corresponding to IP, TCP, UDP, and SNMP in the preferred embodiment, and which generally implements these protocols and performs validation functions. Furthermore, the network monitor 306 populates the topology database 314 by way of the topology manager 310 and notifies the topology manager 310 of events (topology changes).

The topology manager 310 manages the topology database 314, as indicated by arrow 316. The topology manager 310 prompts the network monitor 306 to update topology data related to particular events and receives topology updates, as indicated by arrow 312. The topology manager 310 also responds to SNMP queries from remote replicators 303.

The topology database 314 stores topology data based upon objects, which are used to partition the network for logical reasons. Objects include, for example but not limited to, a network, a segment, a computer, a router, a repeater, a bridge, etc. Moreover, the topology data stored with respect to the objects includes, for example but not limited to, an interface or device address, an interface or device type, an interface or device manufacturer, and whether an interface or device supports the SNMP protocol.

The management station 100a includes a topology replicator 303, which enables the management station 100a to obtain other sets of topology data from other stations 100 (100a or 100b) in order to derive a global view of the network 118. The topology replicator 303 is in communication with the network 118, as indicated by arrow 313, and is in communication with the topology manager 310, as is indicated by arrow 315. The topology replicator 303 is responsible for tracking data from remote topology managers 310, which are situated within other stations 100 (FIG. 1), and merging that data into the local topology database 314. In the preferred embodiment, the replicator 303 utilizes SNMP to communicate with remote stations 100. Further, the replicator 303 implements several novel algorithms for handling the data from remote stations 100, while the topology manager 310 implements several novel algorithms for merging the data into the topology database 314. These algorithms will be further described later in this document.

In cases when the management station 100a is configured to act as a collection station 100b (in which case the replicator 303 is inactive), the topology manager 310 responds directly to the network 118 to queries from remote replicators 303, as indicated by arrow 311. The queries correspond to the SNMP/UDP/IP protocol in the preferred embodiment.

The layout mechanism 304 has a topology-to-map translator 318 in communication with the topology manager 310 as indicated by arrow 320, a graphical user interface (GUI) 322 in communication with the topology-to-map translator 318 as indicated by arrows 324, and a map database 326 in communication with the GUI 322 as indicated by arrow 328.

The topology-to-map translator 318 converts topology data from the topology database 314 to map data and constructs the various submaps 202–210 in the network management map 200 of FIG. 2. The topology-to-map translator 318 can forward a request to the topology manager 310, as indicated by arrow 320, in order to obtain topology data regarding particular objects. Moreover, in addition to forwarding topology data to the topology-to-map translator 318 upon request, the topology manager 310 advises the topology-to-map translator 318 of when topology data has changed based upon an event so that the translator 318 can make any appropriate changes in the submaps 202–210.

The GUI 322 manages the map database 326, as indicated by the arrow 328, and manages the display 108 and input device 106, as indicated by the arrow 330b. The GUI 322 receives map updates from the translator 318, as indicated by arrow 324, and submits user-triggered events to the translator 318, as indicated by arrow 324. A user-triggered event includes a prompt 330a from a user to explode an object, as described relative to FIG. 2. Finally, it should be noted that U.S. Pat. No. 5,276,789 to Besaw et al., which is incorporated herein by reference, describes a graphical user interface which could be employed to implement the GUI 322 herein.

2. Collection Station

Figure 3B:
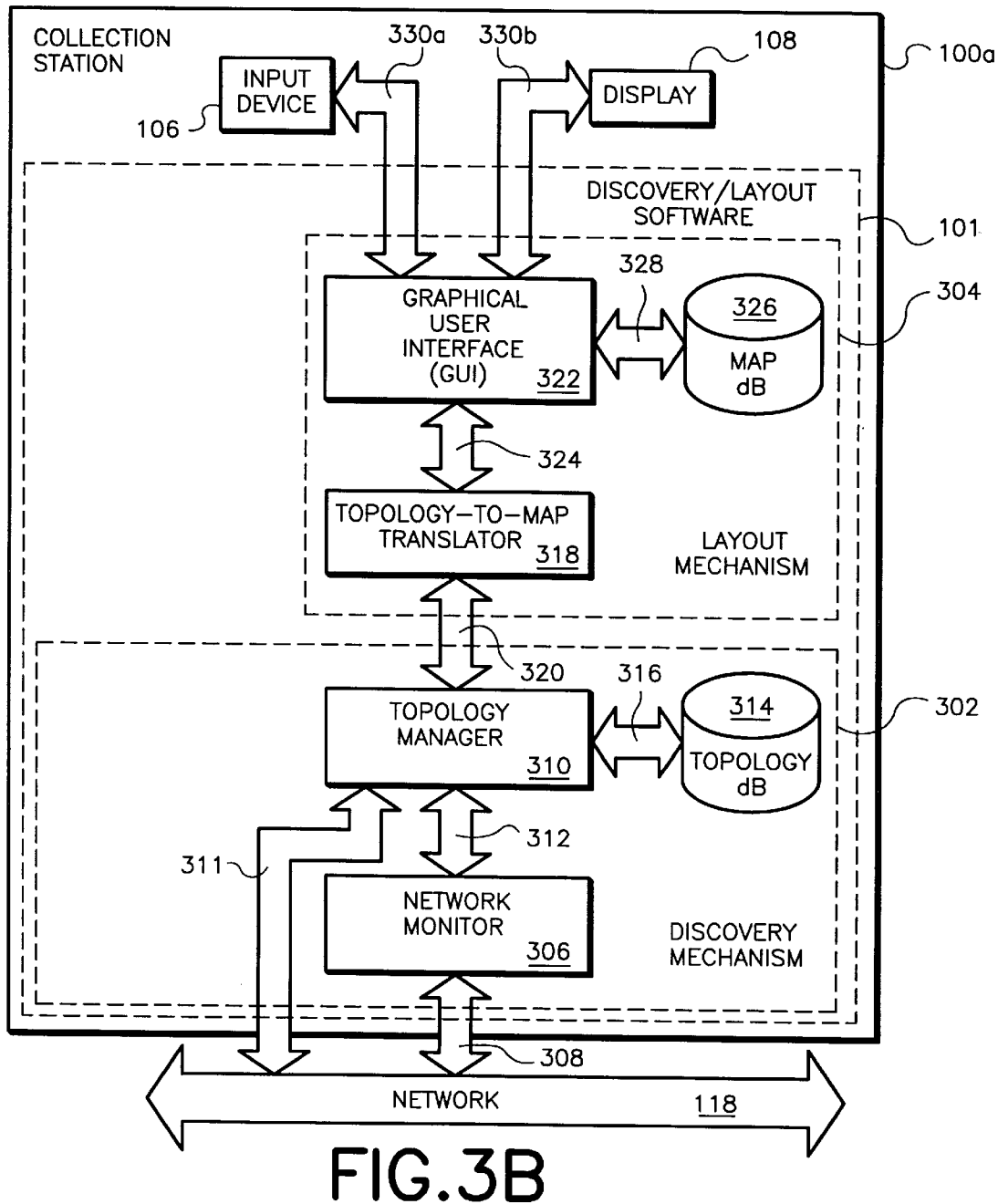
FIG. 3B is a block diagram illustrating the discovery/layout software of a collection station of FIG. 1, which does not include a replicator, unlike the management station of FIG. 3A.

The discovery/layout software 101 of the collection station 100b is illustrated in FIG. 3B. The architecture of the discovery/layout software of the collection station 100b is very similar to that of the management station 100a, as described with reference to FIG. 3A hereinbefore. In the figures, particularly, FIGS. 3A and 3B, like reference numerals designate corresponding components, and furthermore, in regard to the collection station 100*b* of FIG. 3B, the discussion previously in regard to like elements is incorporated herein by reference. The collection station 100*b*, unlike the management station 100*a*, does not utilize a topology replicator 303 to enable the collection station 100*b* to obtain other sets of topology data from other stations 100 in order to derive a global view of the network 118. However, the topology manager 310 uses the network to respond to queries from the replicator 303 (FIG. 3A), as indicated by reference arrow 311 in FIG. 3B. In the preferred embodiment, queries conform to the SNMP/UDP/IP protocol.

B. Distributed Internet Monitoring System

Figure 4:
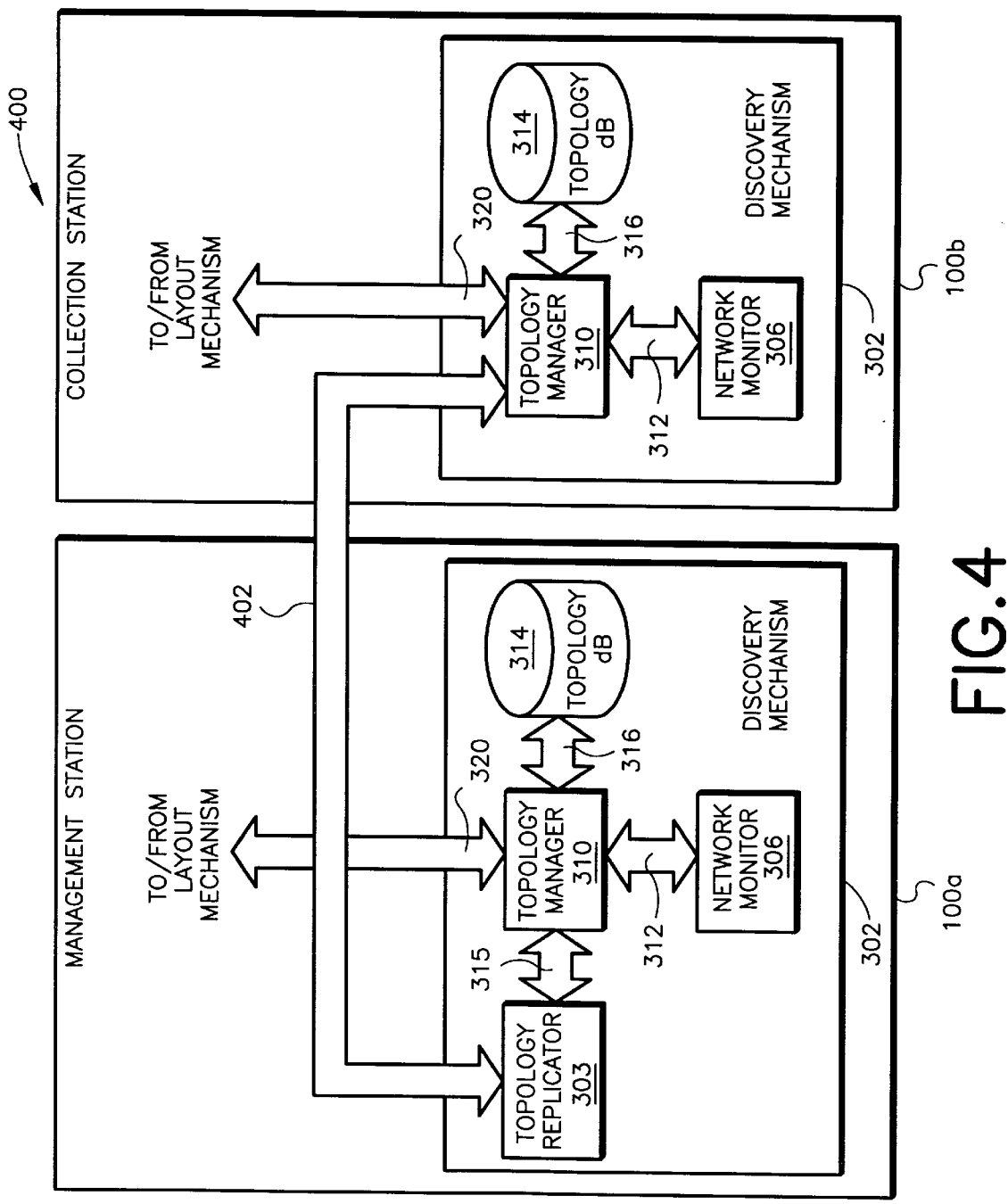
FIG. 4 is a block diagram illustrating communication between discovery mechanisms of a management station of FIG. 3A, which includes a replicator, and a collection station of FIG. 3B, which does not include a replicator.

A distributed internet monitoring system 400 in accordance with the present invention will now be described with reference to FIG. 4. Pursuant to the distributed internet monitoring system 400, two or more stations 100 assist each other in monitoring the network 118. In order to practice the distributed internet monitoring system 400, a management station 100*a* communicates to at least one other station 100, such as a collection station 100*b* or a management station 100*a*. In FIG. 4, as an example, a management station 100*a* is shown in communication with a collection station 100*b*. The discovery mechanism 302 associated with each station 100*a*, 100*b* is assigned to monitor a predefined respective region of the network 118. Further, the discovery mechanism 302 of the collection station 100*b* shares its local topology data with the discovery mechanism 302 of the management station 100*a* so that the management station 100*a* can generate and display a global view of the network 118.

As shown by an arrow 402 in FIG. 4, the discovery mechanism 302 of the collection station 100*b* communicates its topology data to a replicator 303 in the discovery mechanism 302 of the management station 100*a*. The aforementioned communication can occur over the network 118 or over some other communication link, including a dedicated connection. In the preferred embodiment, the communication indicated by arrow 402 occurs via the SNMP/UDP/IP protocols over the network 118.

C. Objects

The distributed internet monitoring system 400 deals with data represented in the form of structures referred to as "topology objects" or "objects." Topology objects are the internal representation of real world objects, and the term is used to refer both to the organization of the data as well as to the internal structures used to track that data. For example, for a given computer (node) in the real world, the system 400 will track a body of data about that node. That data is stored in a form that models that node in the topology database 314. Additionally, the topology manager 310 and the applications that deal with it will read that data into an internal structure that represents that node's data, and that internal structure is referred to as a "topology node object" or just a "node."

In the system 400, each topology manager 310 tracks the following types of objects: (a) a node object that represents the computers and connective devices in the network 118; (b) an interface object that represents the logical connections of the node to various networks; every interface must be associated with a node, and a node may have zero or more interfaces; (c) a segment object that represents a physical cable to which nodes are attached via interfaces; a segment conceptually contains those nodes which have interfaces connected to the segment; (d) a network object that represents a logical IP network; (e) the network object conceptually contains several segments and the nodes that are connected to those segments; (f) a global internet object that contains global information and conceptually contains all other objects; and (g) a station object that represents a remote node that is acting as a host for the collection station software; a station object conceptually contains all the objects that are reported by that collection station's topology manager 310.

Each of the above objects contains in it a generic object structure that is common to all the objects. The generic object structure is used when a method or algorithm can be applied independently of the type of object. In object oriented methodology terms, the generic object is a base class for the more specific objects.

Each type of object has a unique type of "name" field that is used to identify it. For example, networks have an "IP Network Name" that is based on the IP subnet address and subnet mask of the network. Segments have an "IP Segment Name" that is composed of the name of the network that contains the segment, and the word "segment" with a unique number after it. Nodes have an "IP Hostname" that is based on the official IP hostname of the node, while each interface has an IP address.

Each object has multiple types of identifiers (IDs). First, each individual object has a "universal unique identifier" (UUID). The UUID is basically a string that is guaranteed to be unique across multiple stations 100.

Additionally, each object has associated with it a local identifier called the "local object ID". This identifier is an integer for use within a local station 100. When multiple versions of an object are reported with the same name field, they should all map to the same local object ID.

Figure 5:
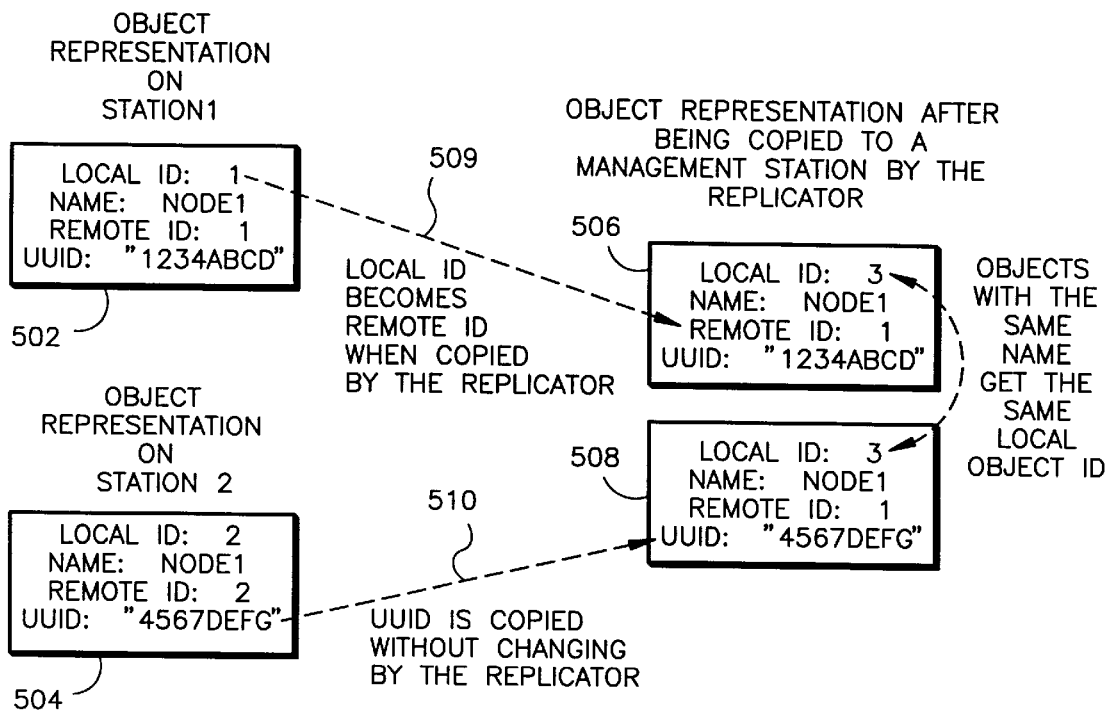
FIG. 5 is a block diagram illustrating identifications that are accorded objects in accordance with the distributed internet monitoring system and method of the present invention.

With reference to FIG. 5, when an object is copied from a station 100 to a management station 100*a*, the local object ID on the remote station 100 is copied into a field in the object called the "remote object ID" at the management station 100*a*, as indicated by reference arrow 509. The remote object ID is tracked by the replicator 303 of the management station 100*a* and used to communicate with the remote station 100. As further indicated by reference arrow 510, the UUID for each object remains the same in both the remote station 100 and the management station 100*a*.

The topology manager 310 supports the concept of both "removed" and "deleted" objects. Objects which are deleted have all data removed from the topology database 314 and are no longer tracked by the topology manager 310. Objects which are marked as removed objects are objects that are pending deletion once all symbols representing the object have been removed from the GUI 322 (FIGS. 3A, 3B) by the topology translator 318 (FIGS. 3A, 3B). Removed objects are tracked by the topology manager 310, but are not generally involved in some of the other relationships tracked by the topology manager 310.

D. Merging Multiple Versions of Objects

Figure 6:
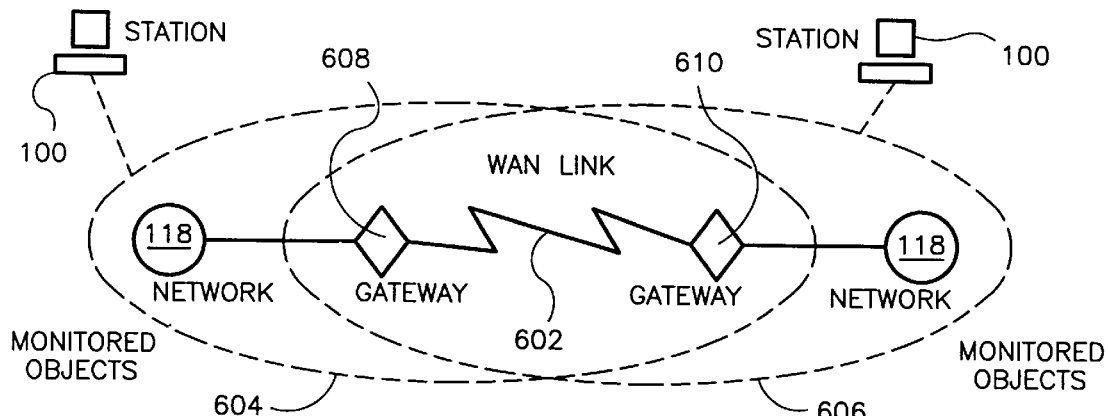
FIG. 6 is a block diagram illustrating overlapping sets of monitored objects in accordance with the distributed topology data model of the present invention.

In a distributed environment with multiple stations 100 reporting information, there are a couple of cases where overlap in the set of objects monitored by a station 100 occurs. Overlap can occur at the boundaries between sites, and can occur by design for redundant/backup monitoring of more critical objects. A typical boundary overlap can occur at the WAN-link 602 between two sites 604, 606, as shown in FIG. 6. In the example of FIG. 6, two stations 100 are each monitoring a corresponding local site, but are also monitoring the WAN-link 602 and the gateway 608, 610 on the other side of the link 602. To ensure complete coverage the user will configure the stations 100 to have some overlap, particularly of important nodes like gateways and routers.

When the data from the different stations 100 is brought together at a management station 100*a*, it is highly desirable to present a merged view of all the objects being monitored to the user. The alternative is to present separate views of those objects monitored by each station 100, without handling the overlap or presenting a merged view. To present a merged view, the objects monitored by different stations 100 are matched up so that, from the user's perspective, only one object exists.

Once it is determined that the objects reported by two different stations 100 are in fact the same real world object, the conflict should be resolved. Possible options include (a) choosing one version and ignoring the other versions, (b) tracking all versions and present all versions to the user, and (c) merging all versions into a single object. All of these have trade-offs. The implementation described herein and employed by the internet monitoring system 400 takes a compromise position between (a) and (c). This implementation provides a great deal of power in the model that is presented to the user, as will be further clear hereafter with reference to FIG. 7.

To handle the multiple versions of objects reported by multiple stations 100, an approach is taken in which a copy of the data for each object is tracked. However, for presentation purposes for the user, one version of the object is chosen as the "primary" version of the object. The primary version of the object is used to determine the object's status and other presentation attributes for the user. When the network monitor 306 or the topology replicator 303 deal with objects, they deal with a particular version for a particular station 100 (the local station 100 in the case of the network monitor 306; a particular remote station 100 in the case of the topology replicator 303).

Figure 7:
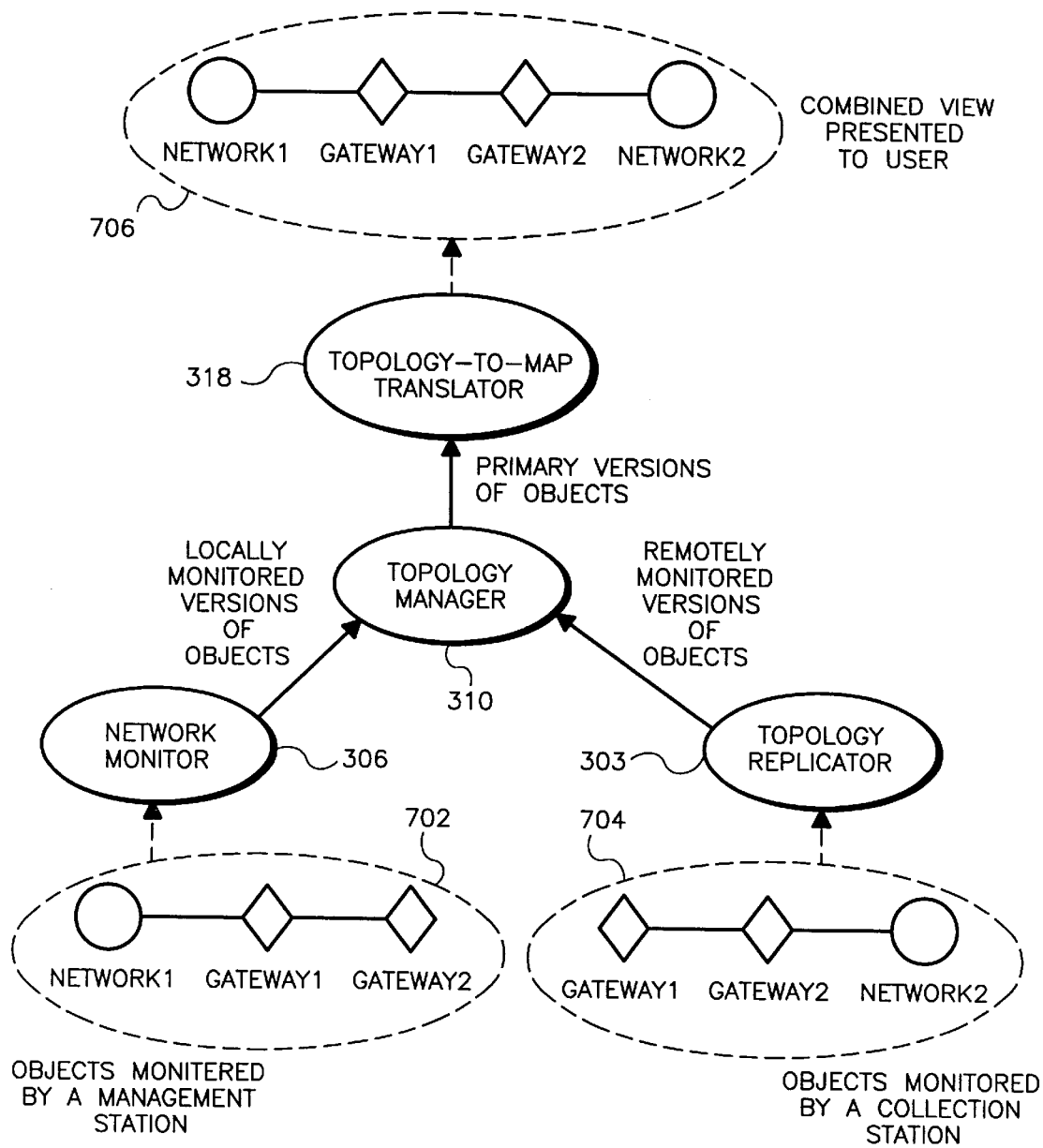
FIG. 7 is a block diagram showing a merged view of objects that can be implemented by the topology manager of FIGS. 3A and 3B.

More specifically, as shown by way of example in FIG. 7, the network monitor 306 of one station 100 discovers the topology data 702, which includes the gateways 1 and 2 and network 1, and further, the discovery mechanism 302 of another station 100 discovers topology data 704, which includes the gateways 1 and 2 and a network 2. The topology translator 318 on the other hand, deals only with the primary versions of objects, presenting a merged view 706 to the users. The merged view 706 includes primary versions of gateways 1 and 2 and networks 1 and 2.

Figure 8A:
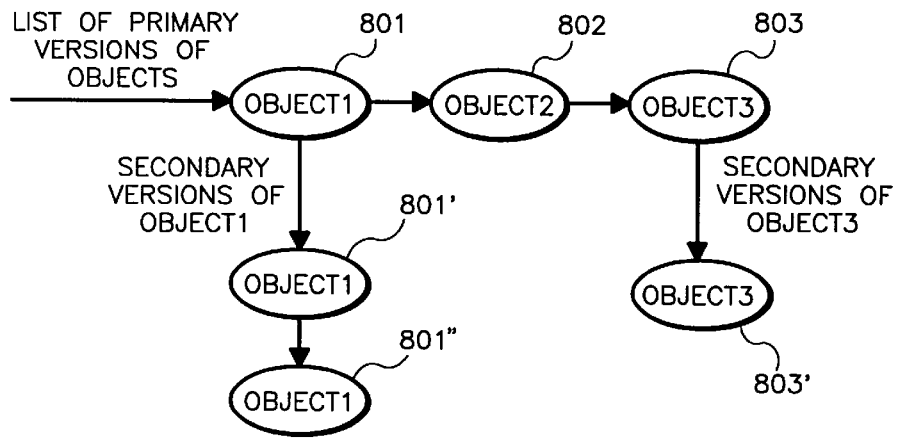
FIGS. 8A and 8B are block diagrams showing a possible methodology that can be implemented by the topology manager of FIGS. 3A and 3B to track multiple versions of objects.
Figure 8B:
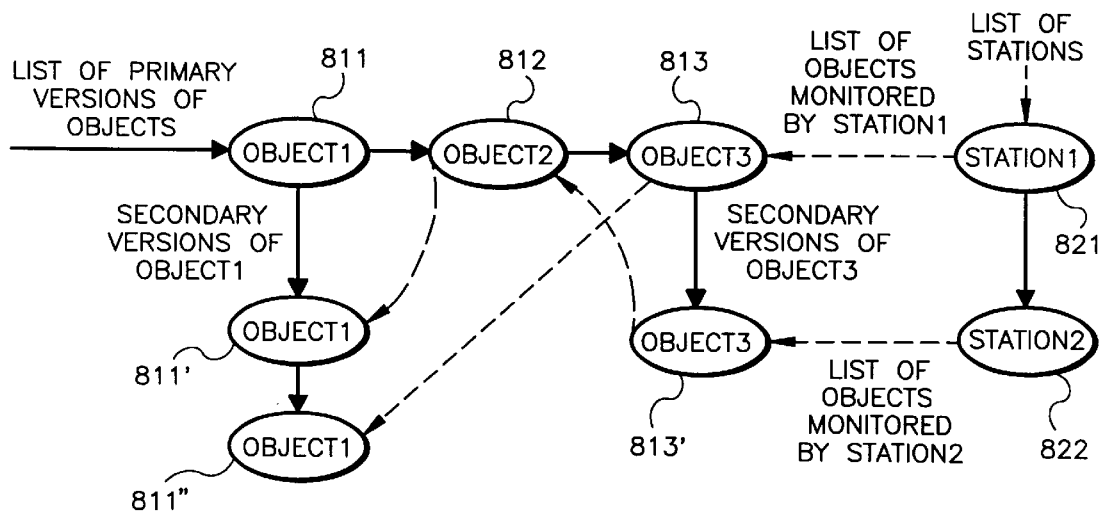

To organize the data in support of this model, the topology manager 310 tracks the multiple versions of objects in two different ways, as will be described with reference to FIGS. 8A and 8B. First, as illustrated in FIG. 8A, global lists are kept in the topology manager 310 that keep track of all the primary versions of objects of a given type. Second, as shown in FIG. 8B, lists are kept per station 100 concerning the objects reported just by that station 100. Whenever there are multiple versions of an object, the secondary versions of objects are kept track of as a list originating at the primary version.

There are other possible ways to organize the data that still keep the concept of a primary version of an object with zero or more secondary versions of objects. Further, the actual implementation tracks objects both as a generic set of objects and as lists based on their specific object type (e.g., a list for nodes, a list for networks, etc.)

For reasons having to do with the interactions with the rest of the system, the different versions of an object have the same object ID assigned to them. The different versions are distinguished by which station 100 is reporting the particular version. Other ID's are assigned when an object is first given to the topology manager 310 to insert into the topology database 314.

As mentioned above, each type of object has a unique type of name (e.g. node objects have an IP Hostname) that should uniquely identify an object of a given type. Two node objects with the same IP Hostname should really be two versions of the same object. Note that this is a description of the rules currently enforced in the code. There are possibilities for models where some of the name fields used, in particular, the IP address of interfaces, does not constitute a unique name for identification purposes.

To facilitate this model, local object ID's are assigned based on the name field for the object. If no name field exists, or if there is no existing object with the same name, a new local object ID is created. If an object exists with the same name, the same object ID is returned to be assigned to the new object.

Further note that this algorithm shows an object ID as being an integer value that is stored in nonvolatile memory and initialized to zero. Any format of object ID and algorithm for generating a unique one can be used without altering the basis of the design.

In addition to a local object ID and the object ID of the station reporting the object version, the system 400 also tracks the object ID of the object version as reported by the remote station 100. This is used to identify the object for future updates by the topology replicator 303. In the case of objects monitored locally by the network monitor 306, the local object ID and the remote object ID are the same.

Up to this point the discussion has largely been on the concepts that will drive the algorithms used in the topology manager 310. The focus will now switch to the algorithms used in the topology manager 310 to support the models described above.

E. Topology Manager

Figure 9:
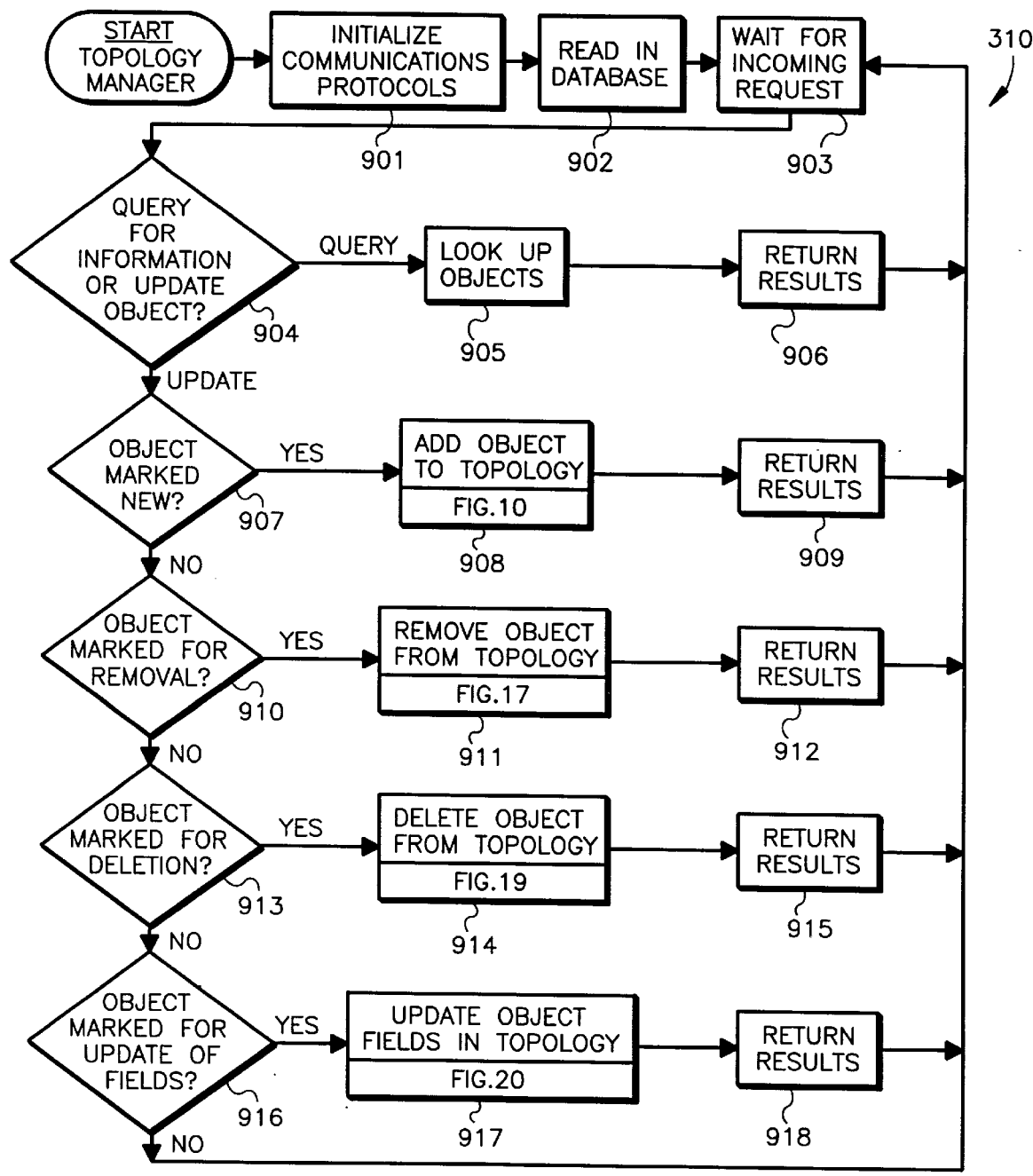
FIG. 9 is a flow chart showing a possible methodology that can be implemented by the topology manager of FIGS. 3A and 3B.

FIG. 9 illustrates a preferred methodology that is employed by the topology manager 310 (FIGS. 3A and 3B). At its highest level of abstraction, the topology manager 310 handles requests for topology information and for database updates from the network monitor 306, replicator 303, and the topology-to-map translator 318. In each of the flow charts described herein, each flow chart block represents a subroutine, block, or module of executable instructions or code.

Block 901 initializes the communications protocols. The code sets up to use the SNMP and UDP/IP. These protocols and their initialization are well known in the art. Block 901 transfers to block 902.

Block 902 reads in all data from the topology database 314 into memory and builds initial lists. In the preferred embodiment, a list of topology objects is built in memory for each object type. Block 902 transfers to block 903.

At block 903, the topology manager 310 waits for an incoming request for topology data or for database updates. After a request is received, block 903 transfers to block 904.

At block 904, the topology manager 310 determines whether the request is for topology data or for an object update. If the request is for topology data, then block 904 transfers to block 905. Otherwise, block 904 transfers to block 907.

When topology data is sought, block 905 looks up the relevant objects in the topology database 314 and obtains the desired data. Block 905 then transfers to block 906, which drives the topology data to the component that requested the information. Finally, block 906 transfers back to block 903, where the topology manager 310 awaits another request.

When an object update is to occur, block 907 makes a determination as to whether the object is marked as a new object. If so, then block 907 transfers to block 908. If not, then block 907 transfers to block 910.

When a new object is added, block 908 adds the object to the topology database 314. The process of block 908 will be further described hereafter with reference to FIG. 10. Block 908 then transfers to block 909, where an acknowledgement that the object has been added is sent to the source of the request. Further, the block 909 transfers to block 903, where the topology manager 310 awaits another request.

When a new object is not added, block 910 makes an inquiry as to whether the object is to be removed. If so, then block 910 transfers to block 911. Otherwise, block 910 transfers to block 913.

Figure 17:
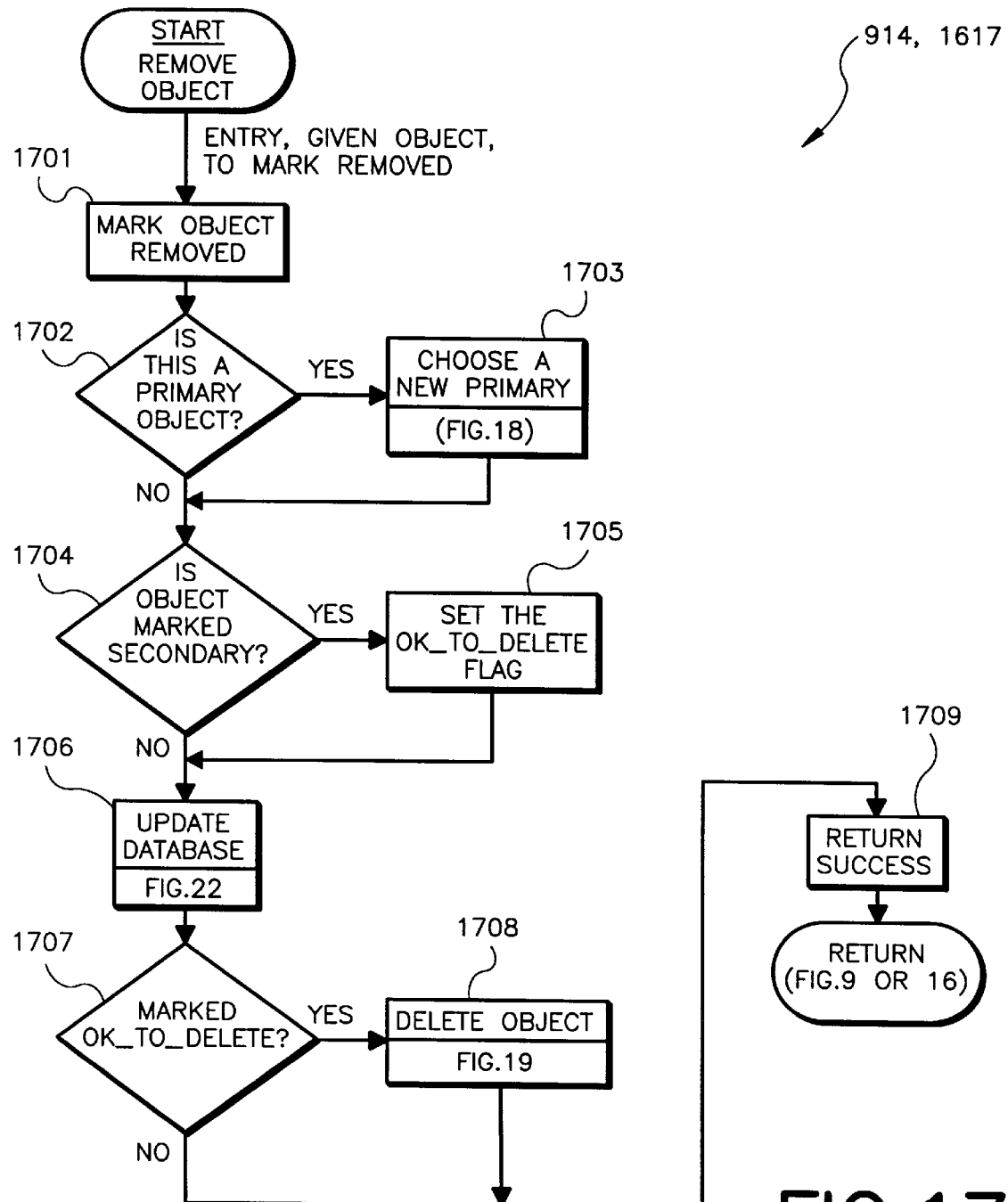
FIG. 17 is a flow chart showing a possible methodology that can be implemented in FIGS. 9 and 16 for removing an object from the topology database of FIGS. 3A and 3B.

When an object is to be removed, block 911 marks the object "removed" in the topology database 314, as further described in FIG. 17. Block 911 transfers to block 912, where an indication that the block has been removed is sent to the source of the request. Moreover, block 912 transfers to block 903, where the topology manager 310 awaits another request.

When the object is not to be removed, block 913 makes an inquiry as to whether the object has been marked for deletion. If so, then block 913 transfers to block 914. Otherwise, block 913 transfers to block 916.

At block 914, the object is deleted from the topology database 314. The process of block 914 will be further described hereafter with reference to FIG. 19. Block 914 transfers to block 915. At block 915, an indication that the object has been deleted is sent to the source of the request, and then block 915 transfers to block 903, where the topology manager 310 awaits another request.

At block 916, a determination is made as to whether the object is marked for an update of its fields. If so, then block 916 transfers to block 917. If not, then block 916 transfers back to block 903, where the topology manager 310 awaits another request.

In the event that fields are to be updated in the object, block 917 updates the object fields in the topology database 314. This process will be further described with reference to FIG. 20 hereafter. After the update, block 917 transfers to block 918, where an indication that an update has occurred is sent to the source of the request. Moreover, block 918 transfers to block 903, where the topology manager 310 awaits another request.

1. Add Object Subroutine

Figure 10:
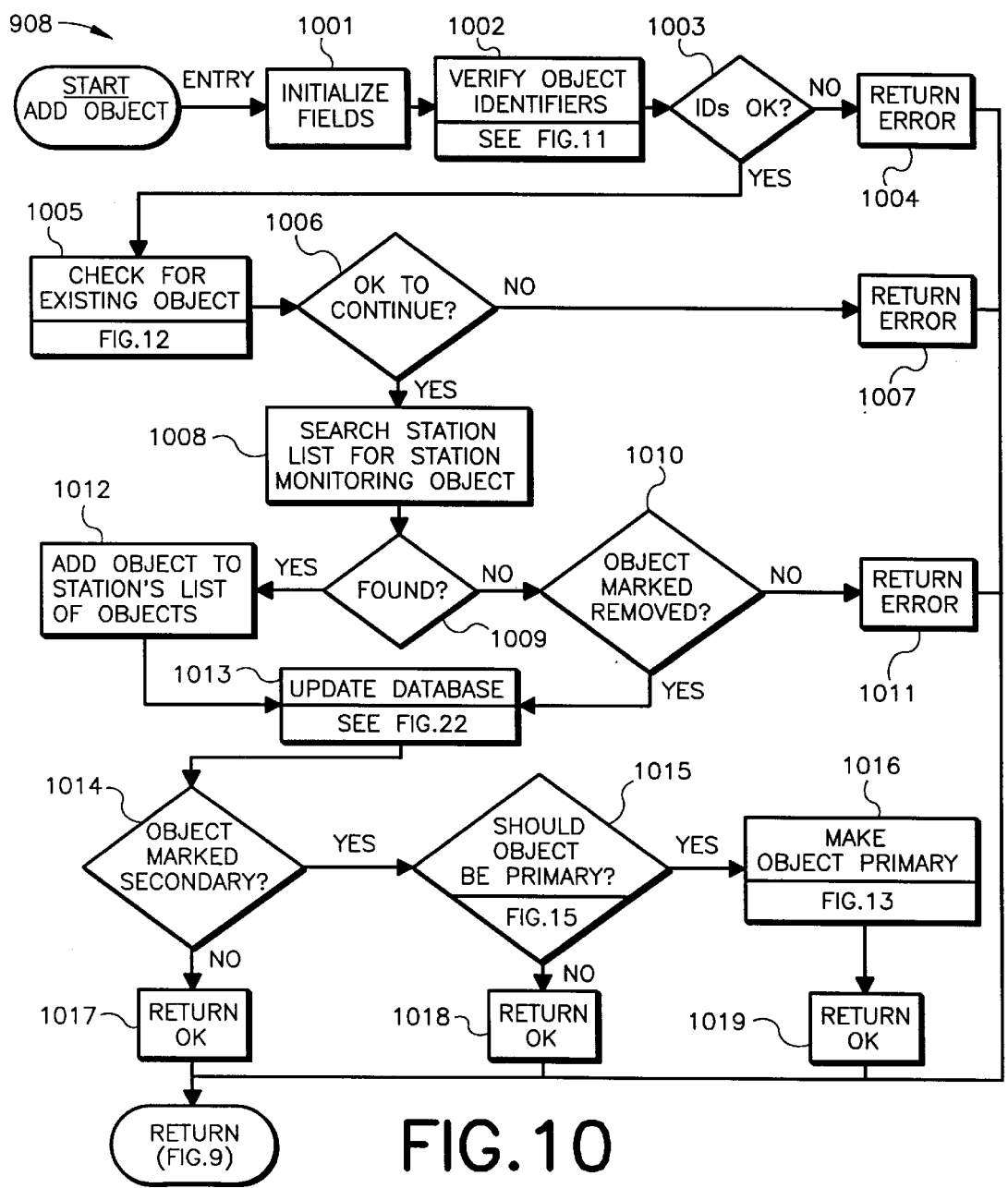
FIG. 10 is a flow chart showing a possible methodology that can be implemented in FIG. 9 for adding an object to the topology database of FIG. 3A and 3B.

FIG. 10 shows the code for adding an object. This process is implemented in block 908 of FIG. 9. In general, the add object subroutine of FIG. 10 verifies the integrity of the object, inserts the object into the topology database 314, and determines if there is an overlap with another object reported from another station 100.

First, the fields of the object are initialized. The fields that are initialized depends in large part upon the type of object. If an object is to be a primary object, then secondary fields associated with it are emptied. Counts of contained objects are initialized to zero. Lists of contained objects are initialized. After this initialization process, block 1001 transfers to block 1002.

At block 1002, object identifiers are verified. This process is more fully described with reference to FIG. 11. This is one of the places where an overlap can be detected by examining object names. As part of this process, the object is checked for a UUID and a local ID. A local ID may be assigned, if none exists. Block 1002 transfers to block 1003.

Block 1003 makes a determination as to whether the object identifiers have been verified based upon the results of block 1002. In other words, block 1003 determines whether the object has both a UUID and a local ID. If not, then block 1003 transfers to block 1004, which generates an error signal and passes the program flow to block 909 of FIG. 9. If verified, then block 1003 transfers to block 1005.

Next, a check is made for other versions of the object. In the event that more than one object have the same local object ID, then only one of the objects is made the primary and the local object ID is assigned thereto, while any other redundant objects are made secondary. This process is more fully described later in this document with reference to FIG. 12. Block 1005 transfers to block 1006.

Figure 12:
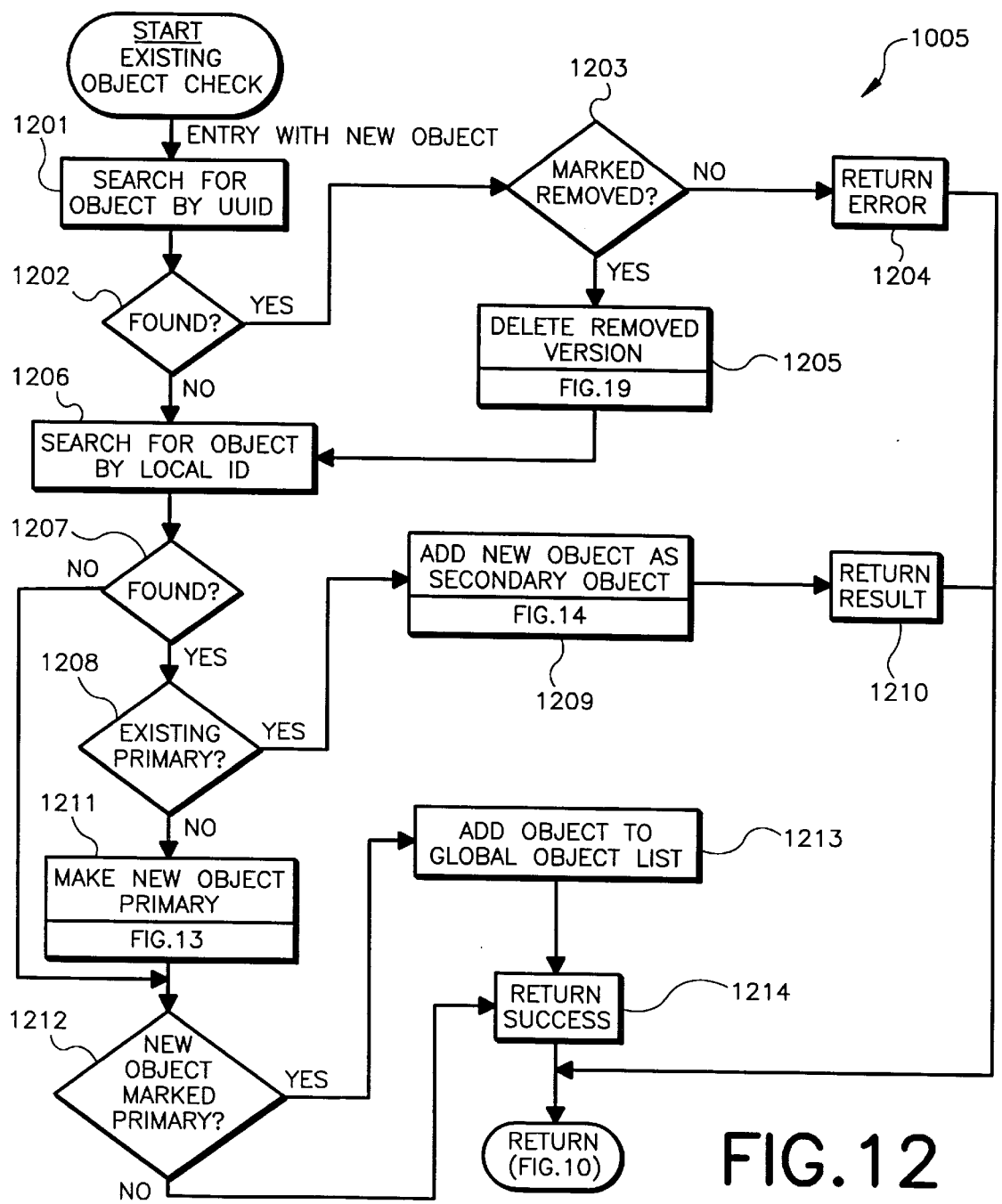
FIG. 12 is a flow chart showing a possible methodology that can be implemented in FIG. 10 for checking for existing objects in the topology database of FIGS. 3A and 3B.

At block 1006, the results from the code set forth in FIG. 12 are checked. If an error was detected, then control branches to block 1007, which returns an error to the code in FIG. 9. If not, then block 1006 transfers to block 1008.

At block 1008, a station list is searched to ensure that each object has a station ID, which identifies the station monitoring that object. If a station 100 with a station ID is found in the list, then block 1012 adds the object to the stations list of objects, and then block 1012 transfers to block 1013. If a station ID is not found for an object, then block 1010 makes the determination as to whether the object has been marked for removal. If not, then an error message is generated by block 1011. If so, then block 1010 transfers to block 1013.

At block 1013, the topology database 314 (FIG. 3) is updated. This process will be more fully described with reference to FIG. 22. Block 1013 transfers to block 1014.

At block 1014, a determination is made as to whether the object is marked as a secondary. If not, then block 1014 transfers to block 1017, the routine 906 concludes, and the routine 908 returns to FIG. 9 to execute block 909. If the object has been marked as secondary, then block 1014 transfers to block 1015.

At block 1015, an inquiry is made as to whether the object should be made the primary. The preferred process is set forth in FIG. 15 and will be described hereafter. If the object should not be the primary, then block 1015 transfers to block 1018, the subroutine 908 concludes, and the subroutine 908 transfers to FIG. 9 in order to execute block 909. If the object should be the primary, then block 1015 transfers to block 1016, which makes the object the primary. This process will be further described with reference to FIG. 13 later in this document. Afterwards, block 1016 transfers to block 1019, which concludes the subroutine 908, and then the subroutine 908 transfers to FIG. 9 for execution of block 909.

2. Verify Object Identifiers

Figure 11:
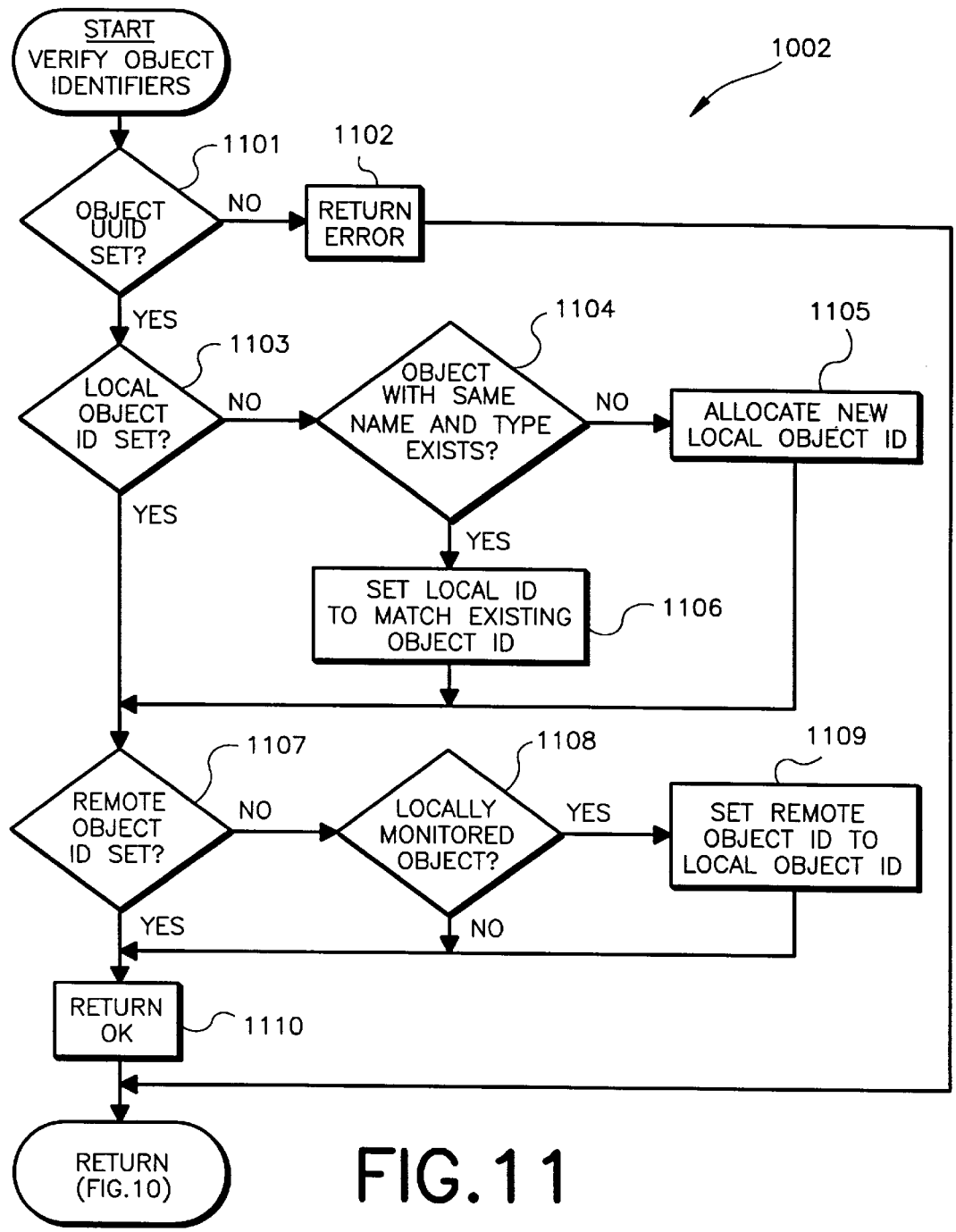
FIG. 11 is a flow chart showing a possible methodology that can be implemented in FIG. 10 for verifying object identifiers.

FIG. 11 shows the code for verifying object identifiers. This process is implemented at block 1002 in FIG. 10. This is one of the places in the program where an overlap can be detected by examining object names. In general, if an object does not have a UUID, then an error is returned. Moreover, if an object does not have a local object ID, then a local object ID is obtained.

At block 1101, a determination is made as to whether the object has a UUID. If not, then block 1101 transfers to block 1102, which sets an error indicator, and the subroutine 1002 concludes by returning to FIG. 10 for execution of block 1003. If the object does have a UUID, then block 1101 transfers to block 1103.

At block 1103, an inquiry is made as to whether the local object ID has been set for the object. If not, then block 1103 transfers to block 1104. At block 1104, a determination is made as to whether the object has the same name and type as an existing object in the local object ID set. If not, then block 1104 transfers to block 1105, which allocates a new local object ID for the object. If there is a match, then block 1104 transfers to block 1106, which sets the local object ID to match the existing object ID.

After blocks 1105, 1106, or alternatively, when it is determined that the object has a local object ID at block 1103, block 1107 is executed. At block 1107, a determination is made as to whether the object has a remote object ID. If not, then block 1107 transfers to block 1108, where a determination is made as to whether the object is locally monitored. If yes, then block 1108 transfers to block 1109, which sets the remote object ID to the local object ID.

The subroutine 1002 concludes and returns to execute block 1003 in FIG. 10 when the object has a remote object ID, when the object is not to be locally monitored, and after execution of block 1109.

3. Existing Object Check

FIG. 12 shows the code for checking for existing objects. This process is implemented at block 1005 in FIG. 10. Here, error detection is performed and objects that match are placed on an overlap list.

First, block 1201 searches for the object in a topology database using the UUID. Block 1201 transfers to block 1202.

At block 1202, a determination is made as to whether the object has been found with the UUID. If so, then a match has been found of the same object version being reported by the same station 100. In other words, there is an exact match of the exact same version of the object. When there is a match, block 1202 transfers to block 1203.

At block 1203, a determination is made as to whether the object has been marked for removal. If the object is not marked for removal, then there is no reason to reinsert it, and an error message is generated by block 1204. If the object is marked for removal, then the user was trying to delete it from the maps. Accordingly, block 1205 deletes the removed version. This process is further described with reference to FIG. 19. Afterwards, block 1205 transfers to block 1206.

At block 1206, a search is performed to locate the object by the local ID. Block 1206 transfers to block 1207.

At block 1207, a determination is made as to whether the object has been found in the local ID set. If not, then block 1207 transfers to block 1212. If so, then block 1207 transfers to block 1208, where an inquiry is made as to whether the existing object is the primary. If so, then block 1208 transfers to block 1209, which adds the new object as the secondary object (process described with reference to FIG. 14), and the result is returned by block 1210. If the existing object is not the primary, then block 1208 transfers to block 1211, which makes the new object the primary. This process is further described with reference to FIG. 13.

At block 1212, a determination is made as to whether the new object is marked primary. If so, then block 1212 transfers to block 1213, which inserts the object in the global object lists, and then block 1213 transfers to block 1214. If the new object is not marked primary at block 1212, then block 1212 transfers to block 1214.

At block 1214, the subroutine 1005 concludes and returns to execute block 1006 in FIG. 10.

4. Make Object Primary

Figure 13:
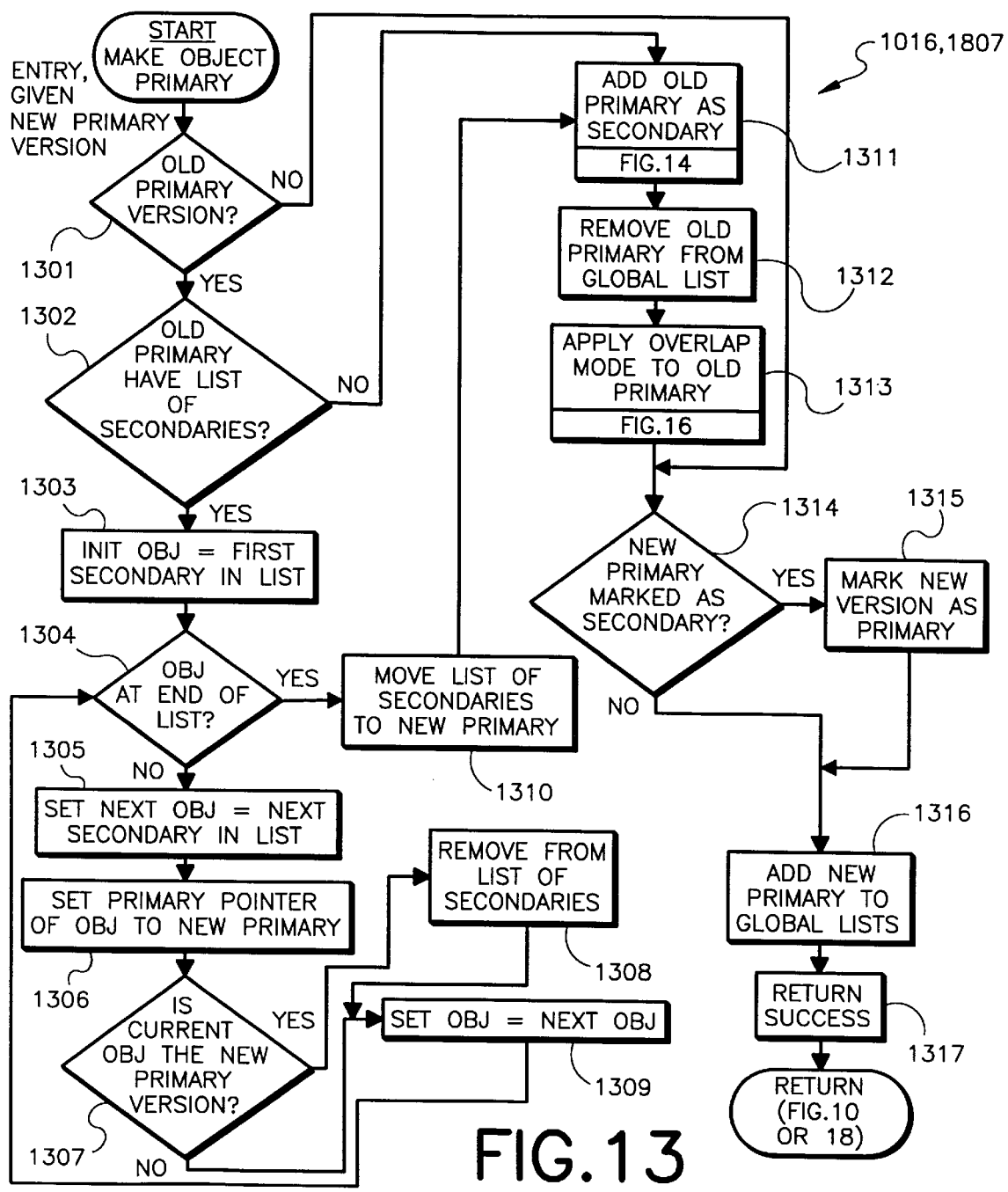
FIG. 13 is a flow chart showing a possible methodology that can be implemented in FIGS. 10 and 18 for making an object a primary object.

FIG. 13 shows the code for making an object a primary. This process is implemented at blocks 1016 and 1807 of FIGS. 10 and 18, respectively. At the start of the code in FIG. 13, an object is sought to be made the primary of an object list. The object may already exist in that list of secondaries or it may be a newly reported object. Essentially, the subroutine in FIG. 13 moves the secondaries from the list over to the new object, and then the old primary is added into the secondaries for the new object.

Initially, at block 1301, a determination is made as to whether there is an old primary version of the object. If not, then block 1301 transfers to block 1314. If so, then block 1301 transfers to block 1302.

At block 1302, an inquiry is made as to whether the old primary has a list of secondaries. If not, then block 1302 transfers to block 1311. If so, then block 1302 transfers to block 1303.

When there is a list of secondaries, block 1303 sets a variable OBJ to the first secondary in the list. Block 1303 transfers to block 1304.

A loop commences at block 1304 to examine each secondary in the list. Block 1304 makes an inquiry as to whether the object is at the end of the list. If not, then block 1304 transfers to block 1305, which sets a variable NEXTOBJ to the next secondary in the list. Block 1305 transfers to block 1306. At block 1306, the primary pointer of the secondary object is set to the new primary. Block 1306 transfers to block 1307. At block 1307, a determination is made as to whether the current secondary object is the new primary version. If so, then block 1307 transfers to block 1308, which removes the object from the list of secondaries. If the object is not the new primary version, then block 1307 transfers to block 1309. At block 1309, the variable OBJ is set to the variable NEXTOBJ, and block 1309 transfers back to block 1304.

When the object is at the end of the list as determined at block 1304, block 1304 transfers to block 1310. At block 1310, the list of secondaries is moved to the new primary object. Block 1310 transfers to block 1311.

At block 1311, the old primary object is added as a secondary object. This process is further delineated at FIG. 14. Afterwards, block 1311 transfers to block 1312.

Block 1312 removes the old primary object from the global object list. Block 13112 transfers to block 1313.

At block 1313, an overlap mode is applied to the old primary object. This process is further described with reference to FIG. 16. In essence, the secondary object is set to one of three modes. There is an "allow it" mode, which means nothing is done with the old primary object; an "unmanaged" mode, which means keep the old primary object around but make it unmanaged and do not do anything with it; and a "delete" mode, which means get rid of the old primary object completely. Networks and segments are not deleted and are kept around as unmanaged because they help keep the topology infrastructure. Block 1313 transfers to block 1314.

At block 1314, a determination is made as to whether the new primary object is marked as a secondary object. If so, then block 1314 transfers to block 1315, which marks the new version as the primary object. If not, then block 1314 transfers to block 1316.

At block 1316, the new primary object is added to the global lists. Block 1316 transfers to block 1317, which concludes the routine 1016, 1807, and the subroutine 1016, 1807 returns to either FIG. 10 or FIG. 18.

5. Add Secondary Object to Primary Object

Figure 14:
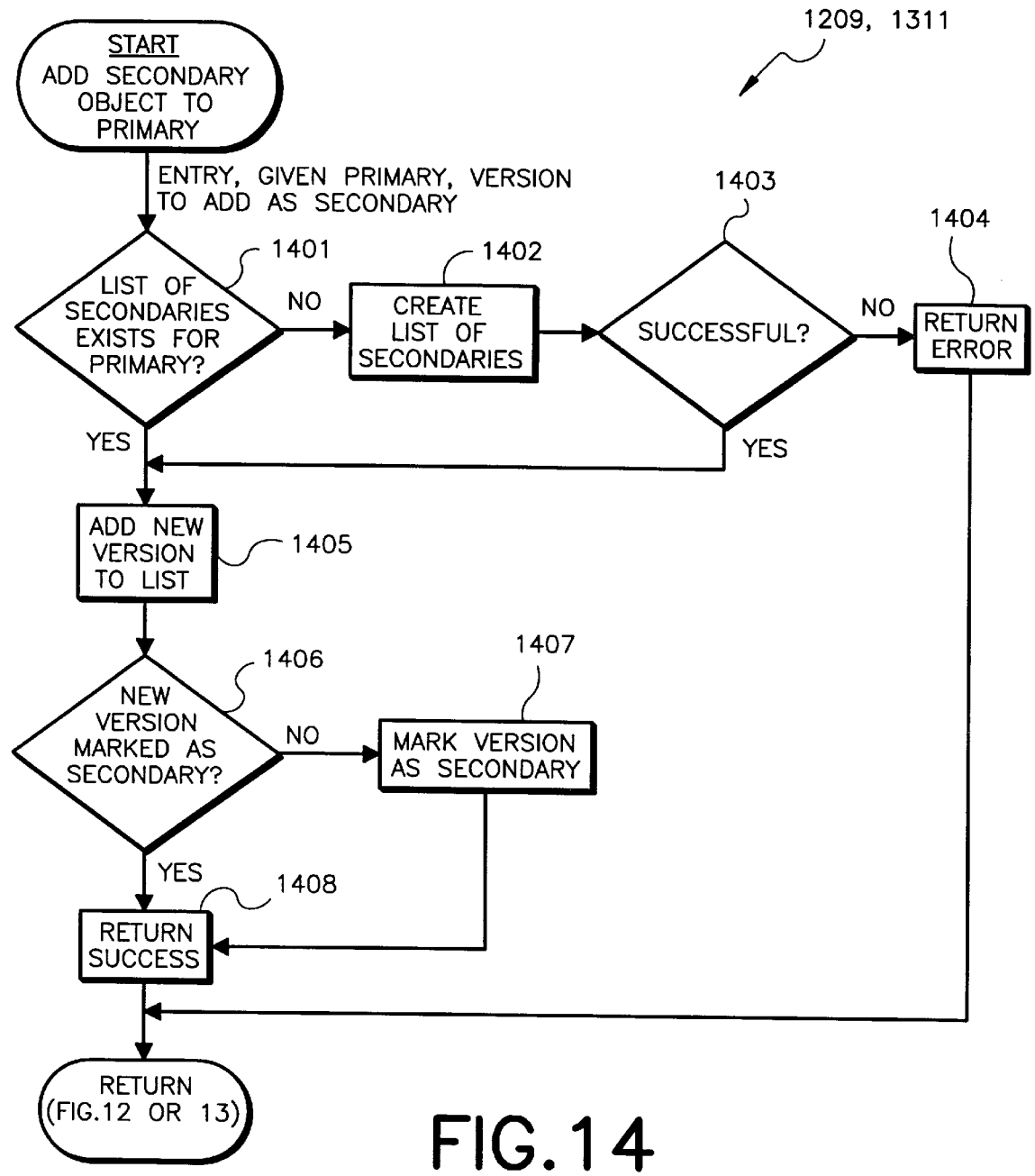
FIG. 14 is a flow chart showing a possible methodology that can be implemented in FIGS. 12 and 13 for adding a secondary object to a list associated with a primary object.

FIG. 14 shows the code for adding a secondary object to a list associated with a primary object. This process is implemented at blocks 1209 and 1311 in FIGS. 12 and 13, respectively. Basically, one object matches another, and the code puts the second on a list of objects that match. For optimization, a list is not created if there is nothing to put in it.

Initially, at block 401, a determination is made as to whether a list of secondaries exist for the primary object. If not, then block 1401 transfers to block 1402. If so, then block 1401 transfers to block 1405.

When there is not a list of secondaries for the primary object, block 1402 creates a list of secondaries and transfers to block 1403 to ensure that the process was successful. If not, then an error message is generated by block 1404 and the subroutine 1209, 1311 terminates by returning to either FIG. 12 or FIG. 13. If successful, then block 1403 transfers to block 1405.

Block 1405 adds the new object version to the list of secondaries. Block 1405 transfers to block 1406.

At block 1406, an inquiry is made as to whether the new object version is marked as a secondary. If not, then block 1406 transfers to block 1407, which marks the new version as a secondary, and then block 1407 transfers to block 1408. If the new version is marked as a secondary, then block 1406 transfers to block 1408.

Block 1408 concludes the subroutine 1209, 1311 by returning a success message, and then the subroutine 1209, 1311 returns to either FIG. 12 or FIG. 13, depending upon its initiation origin.

6. Determine Primary Object

Figure 15A:
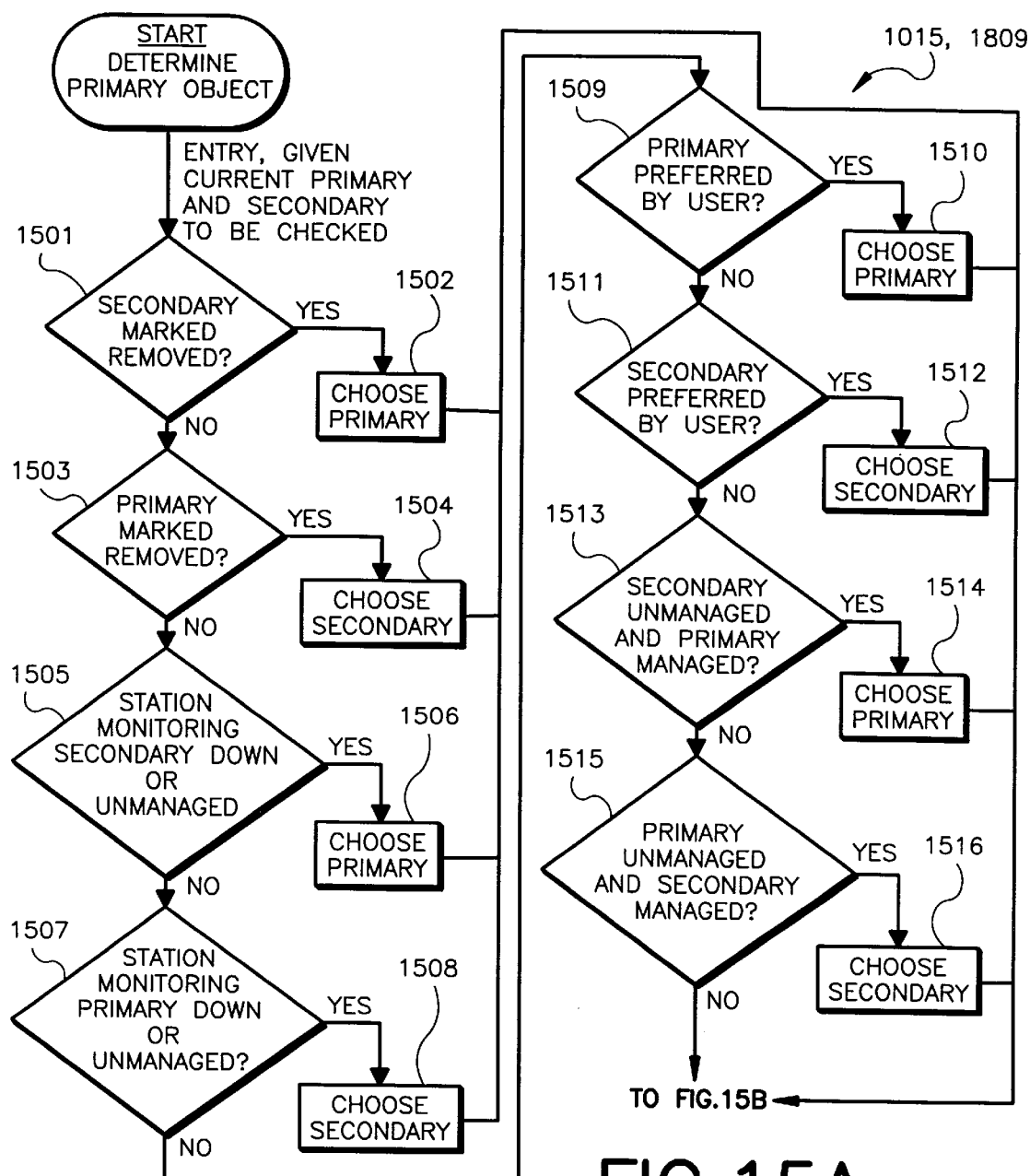
FIG. 15 is a flow chart showing a possible methodology that can be implemented in FIGS. 10 and 18 for prioritizing objects and determining a primary object from a list of objects.
Figure 15B:
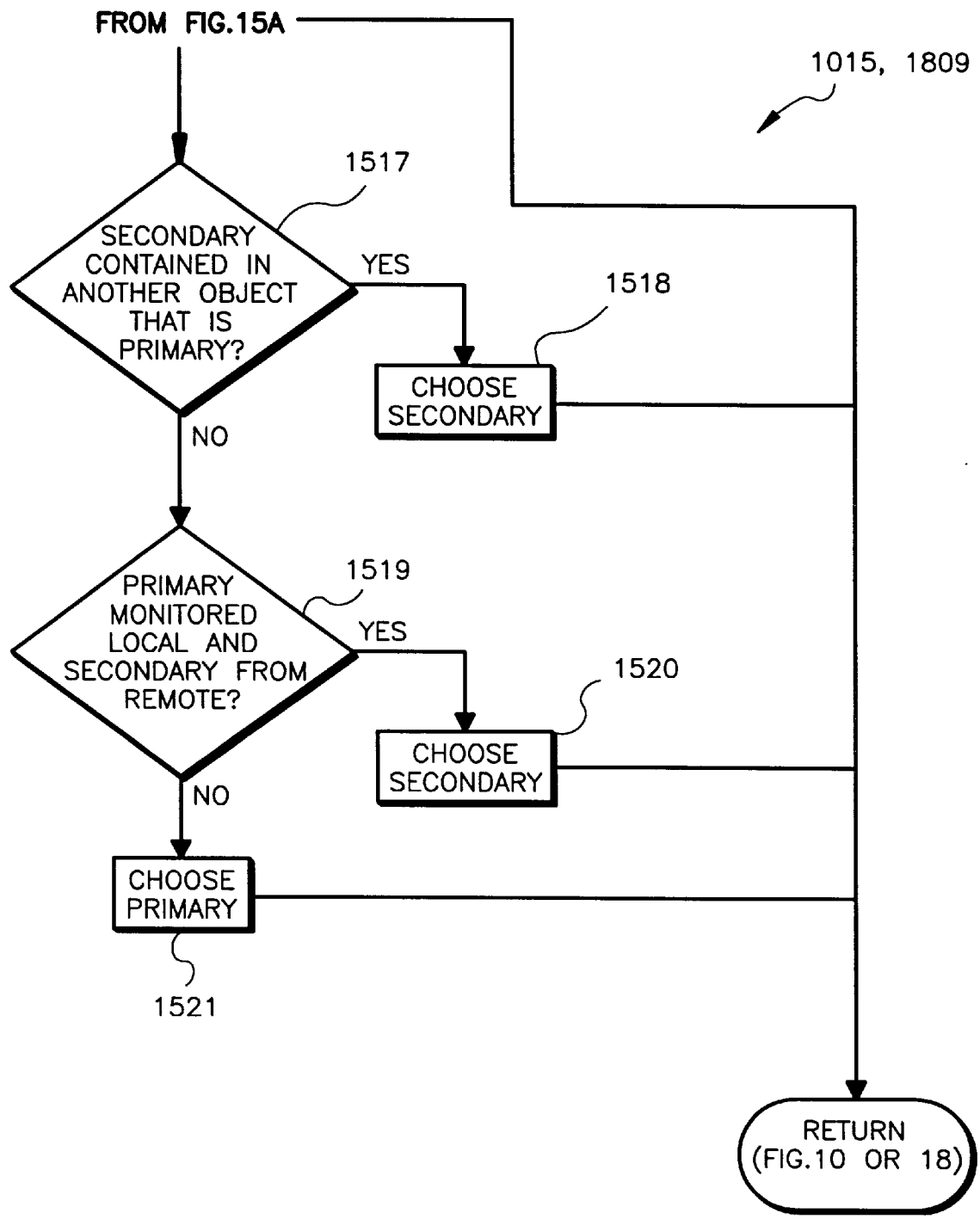

FIG. 15 shows the code for prioritizing objects and determining a primary object from a list of objects. This process is implemented in blocks 1015 and 1809 of FIGS. 10 and 18, respectively. In general, the priority scheme is as follows. Objects that are marked removed are not selected as the primary. Objects from stations 100 that have been in communication in the past are given priority over those objects from those stations 100 that have not been in communication. Managed objects are given priority over unmanaged objects. Finally, objects from remote stations 100 are given priority over objects from local stations 100.

First, at block 1501, a determination is made as to whether any of the secondary objects have been marked for removal. If so, then block 1501 transfers to block 1502, which designates the current primary as the primary, and then block 1502 transfers back to either FIG. 10 or FIG. 18, depending upon which block of code initiated the process of FIG. 15.

If the secondary object is not marked as removed, then block 1501 transfers to block 1503. At block 1503, a determination is made as to whether the primary object is marked as removed. If so, then block 1503 transfers to block 1504, which identifies the secondary object as the primary object. Block 1504 then transfers back to either FIG. 10 or FIG. 18. If, to the contrary, the primary object is not marked removed, then block 1503 transfers to block 1505.

At block 1505, a determination is made as to whether the station 100 that is monitoring the secondary object is down or is unmanaged. In essence, the algorithm is structured so that there is greater trust for a station 100 that the current station 100 is communicating with than one that the current station 100 has not been communicating with. The secondary object is checked first so that the primary is kept if both of them are down or if both of them are unmanaged. If the station 100 that is monitoring the secondary object is down or the secondary object is unmanaged, then block 1505 transfers to block 1506. Block 1506 chooses the primary object as the primary, and the subroutine 1015, 1809 concludes. In the alternative, block 1505 transfers to block 1507.

At block 1507, an inquiry is made as to whether the station 100 that is monitoring the primary object is down or whether the primary object is unmanaged. If either of the foregoing inquiries are in the affirmative, then block 1507 transfers to block 1508, which chooses the secondary object as the new primary. If either of the foregoing inquiries are in the negative, then block 1507 transfers to block 1509.

At block 1509, a determination is made as to whether the primary object is preferred by the user. This priority is input by the user and is kept track of with a flag on the object. If the primary object is preferred by the user, then block 1509 transfers to block 1510, which chooses the primary object as the new primary. If not, then block 1509 transfers to block 1511.

Block 1511 makes an inquiry as to whether the secondary object is preferred by the user. If so, then block 1511 transfers to lock 1512. Block 1512 chooses the secondary object as the new primary. If at block 1511 it is determined that the secondary object is not preferred by the user, then block 1511 transfers to block 1513.

At block 1513, a determination is made as to whether the secondary object is unmanaged and the primary object is managed. If this is the case, then block 1513 transfers to block 1514, which chooses the primary object as the new primary. If this is not the case, then block 1513 transfers to block 1515.

At block 1515, an inquiry is made as to whether the primary object is unmanaged and the secondary object is managed. If this is the case, then block 1515 transfers to block 1516, which chooses the secondary object as the new primary. If this is not the case, then block 1515 transfers to block 1517.

Block 1517 makes the determination as to whether the secondary object is contained in another object that is a primary object. As an example, if a particular node is in a segment or network, then the node should get its data from the same station 100 that is utilized for getting the data for the segment or network containing that node. If the answer to the inquiry is in the affirmative, then block 1517 transfers to block 1518, which chooses the secondary object as the new primary. If the answer to the inquiry is in the negative, then block 1517 transfers to block 1519.

At block 1519, a determination is made as to whether the primary object is monitored locally and whether the secondary object is monitored from a remote station 100. If the answer to the foregoing inquiry is in the affirmative, then block 1519 transfers to block 1520, which chooses the secondary object as the new primary. Otherwise, block 1519 transfers to block 1521, which chooses the primary object as the new primary. As is apparent from blocks 1519–1521, in the preferred embodiment, a remote object version is given preference over a local object version. This is by design choice as it is assumed that a remote station 100 is closer to the remote object(s) being monitored.

7. Overlap Mode

Figure 16:
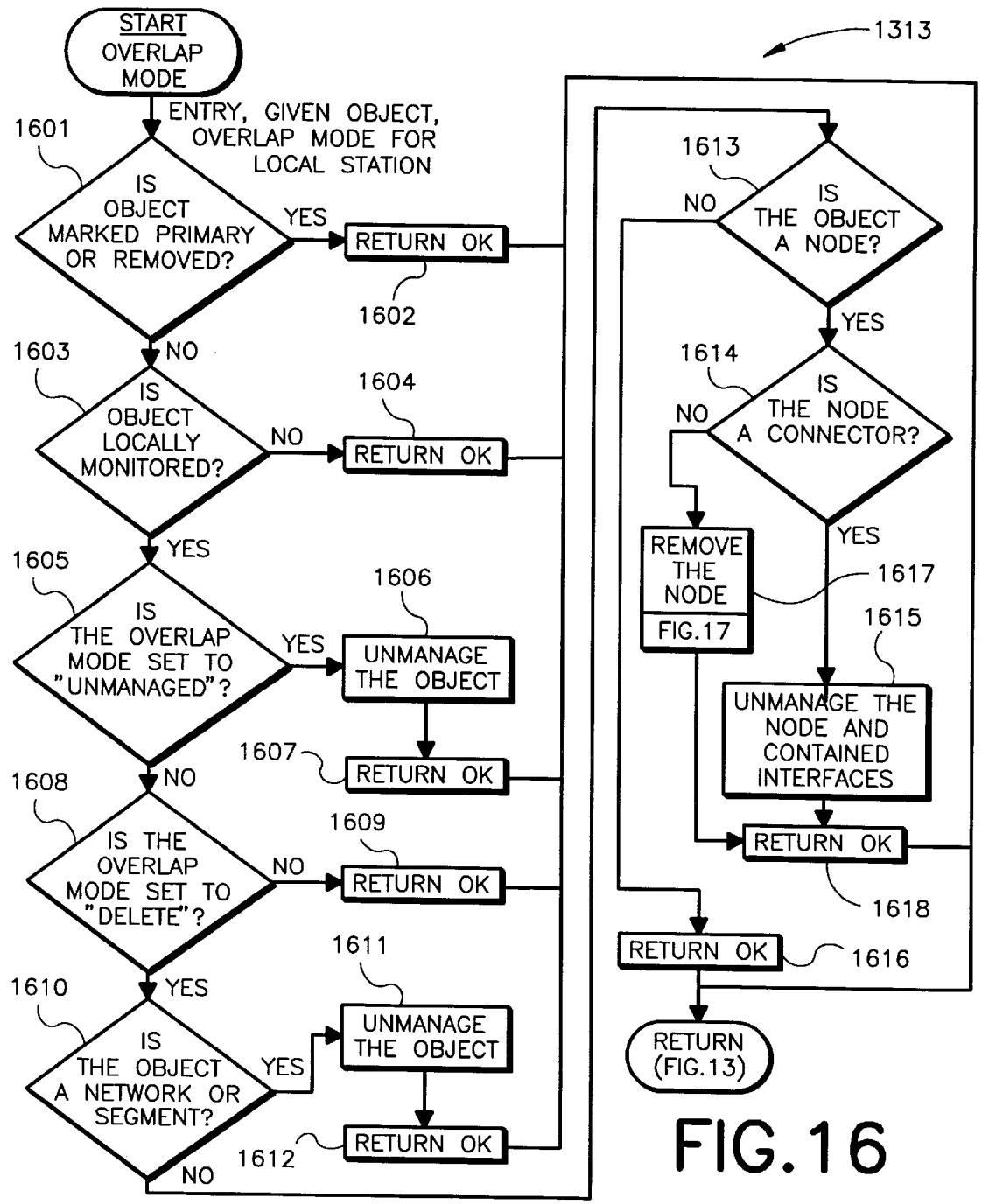
FIG. 16 is a flow chart showing a possible methodology that can be implemented in FIG. 13 for applying an overlap mode to local objects.

FIG. 16 shows the code for applying the overlap mode for local objects. This process is implemented at block 1313 in FIG. 13. In essence, this process is a special feature to help users who are transitioning from monitoring everything centrally to monitoring things remotely. There are basically three modes. There is an "allow it" mode, which means nothing is done with object; an "unmanaged" mode, which means keep the objects around but make them unmanaged and do not do anything with them; and a "delete" mode, which means get rid of the object completely. Networks, segments, and connecting devices are not deleted and kept around as unmanaged because they help keep the topology infrastructure.

Note that this process is only applied to local objects, that is, objects monitored locally by the local discovery process. The process is utilized when a locally monitored object is a secondary for a primary from another remote station 100.

Initially, at block 1601, an inquiry is made as to whether the object is marked as a primary or removed. If so, then block 1601 transfers to block 1602, which returns to FIG. 13. Otherwise, when the object is not marked as a primary or removed, then block 1601 transfers to block 1603.

At block 1603, a determination is made as to whether the object is locally monitored. If not, then block 1603 transfers to block 1604, which concludes the subroutine 1313 and transfers back to the code in FIG. 13. In the alternative, when the object is monitored locally, block 1603 transfers to block 1605.

Block 1605 makes a determination as to whether the overlap mode is set to unmanaged. If so, then block 1605 transfers to block 1606. Block 1606 specifies the object as unmanaged and transfers to block 1607, which concludes the subroutine 1313 and transfers to the code of FIG. 13. Otherwise, when the overlap mode is not set to unmanaged for this object, block 1605 transfers to block 1608.

Block 1608 makes an inquiry as to whether the overlap mode is set to "delete." If not, then block 1608 transfers to block 1609, which concludes the subroutine 1313 and transfers the code of FIG. 13. Alternatively, when the overlap mode is set to delete, then block 1608 transfers to block 1610.

Block 1610 determines whether the object is a network or segment. If so, then block 1610 transfers to block 1611, which defines the object as unmanaged and which transfers back to the code of FIG. 13. In the event that the object is not a network or segment, block 1610 transfers to block 1613.

Block 1613 determines whether the object is a node. If so, block 1613 transfers to block 1614. Block 1614 determines whether the node is a connector. When the node is a connector, block 1614 transfers to block 1615, which defines the node and the interfaces therein as unmanaged and concludes operation of the subroutine 1313. When the node is not a connector, block 1614 transfers to block 1617, which removes the node. This process is further described with reference to FIG. 17.

When the object is not a node as determined at block 1613, block 1613 transfers to block 1616, which terminates the subroutine 1313 and returns to the code of FIG. 13.

8. Remove Object

FIG. 17 shows the code for marking an object "removed" in the topology database 314. This process is implemented at blocks 914 and 1617 of FIGS. 9 and 16, respectively.

Block 1701 marks the object as one to be removed by setting an appropriate internal flag. Block 1701 transfers to block 1702.

At block 1702, a determination is made as to whether the object is a primary object. If so, then block 1702 transfers to block 1703, which chooses a new primary object. The preferred code for implementing this step is set forth in FIG. 18. Block 1703 transfers to block 1704. Furthermore, when it is determined that the object is not the primary object at block 1702, block 1702 transfers to block 1704.

Block 1704 makes a determination as to whether the object is marked as a secondary object. If so, block 1704 transfers to block 1705, which sets an internal flag to indicate that the object should be deleted. Then, block 1705 transfers to block 1706. In the event that it is determined at block 1704 that the object is not marked as a secondary, then block 1704 transfers to block 1706.

Block 1706 updates the topology database 314. This process will be further described with reference to FIG. 22. Afterwards, block 1706 transfers to block 1707.

At block 1707, a determination is made as to whether the object has been marked for deletion. If so, block 1707 transfers to block 1708, which deletes the object. The preferred methodology for this deletion is set forth in FIG. 19. Block 1708 transfers to block 1709. When it is determined that the object is not marked for deletion at block 1707, block 1707 transfers to block 1709.

Block 1709 concludes the subroutine 914, 1617 by returning a success flag pertaining to the object and returning to the code of either FIG. 9 or FIG. 16, depending upon which block of code initiated the subroutine.

9. Select Primary Object

Figure 18:
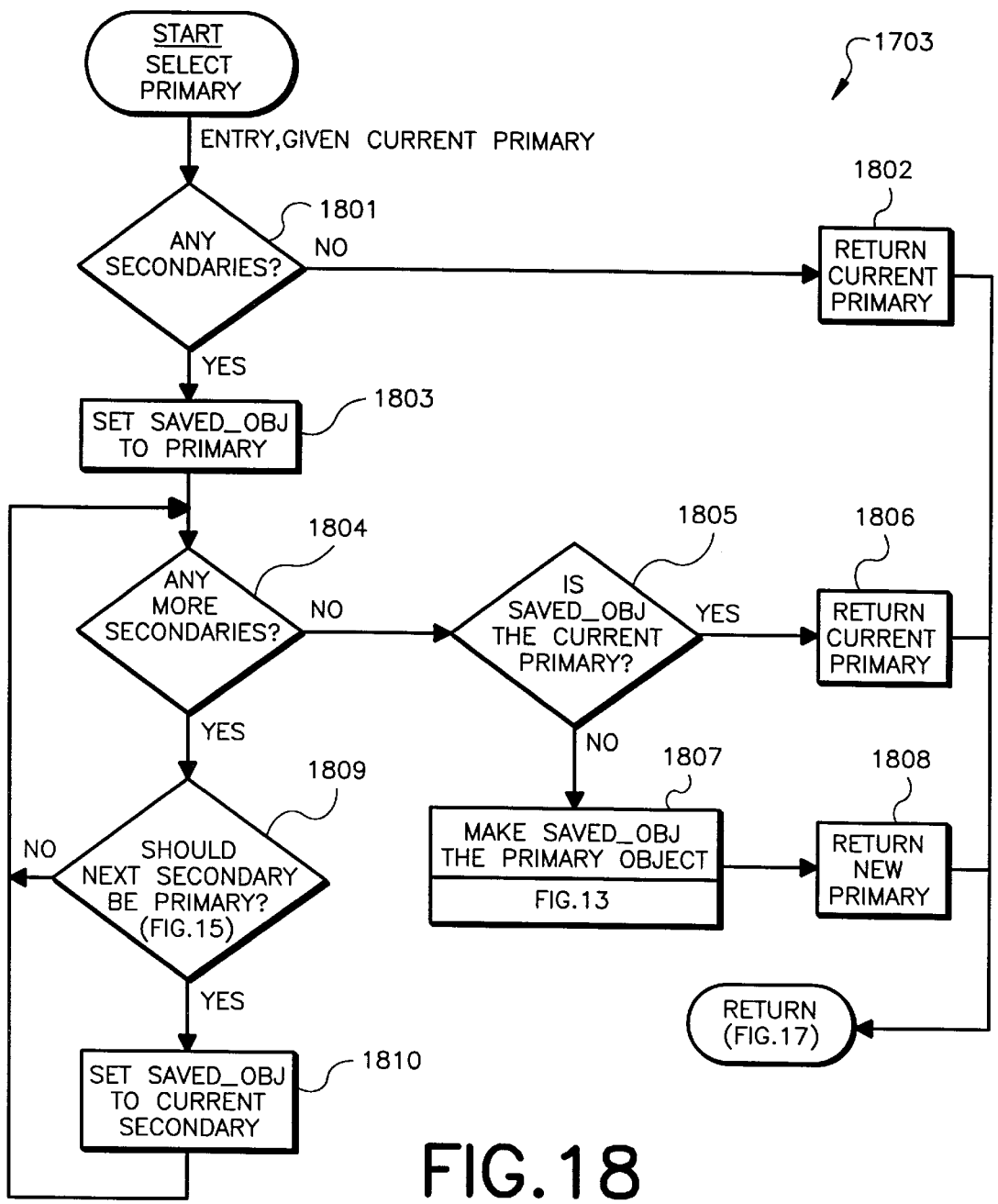
FIG. 18 is a flow chart showing a possible methodology that can be implemented in FIG. 17 for selecting a primary object from a list of secondary objects.

FIG. 18 shows the code for selecting a primary object from the list of secondary objects. This process is implemented at block 1703 in FIG. 17 and at block 914 in FIG. 9.

First, at block 1801, a determination is made as to whether there are any secondary objects given the current primary object. If not, then block 1801 transfers to block 1802, which returns the current primary object. If there are secondary objects, then block 1801 transfers to block 1803, which sets the variable "saved_obj" to the primary object. Block 1803 transfers to block 1804.

Block 1804 determines whether there are any more secondary objects. If so, then block 1804 transfers to block 1809. Otherwise, block 1804 transfers to block 1805.

When there is one or more other secondary objects, block 1809 determines whether any of the secondary objects should be the primary object. In order to make this decision, the code in FIG. 15 is again executed. If it is determined that the secondary object should not be the primary, then block 1809 transfers to block 1804. Otherwise, block 1809 transfers to block 1810, which saves the secondary object as the primary (sets the variable "saved_obj") and transfers to block 1804.

When it is determined that there are no other secondary objects to process at block 1804, block 1804 transfers to block 1805.

At block 1805, an inquiry is made as to whether the primary object has changed. If it has not changed, then block 1805 transfers to block 1806, which transfers back to block 1704 in FIG. 18. When the primary object has changed, then block 1805 transfers to block 1807, which makes the saved object the new primary object. This process is further delineated at FIG. 13. Block 1807 transfers to block 1808, which concludes the subroutine 1703 and transfers to block 1704 in FIG. 17.

9. Delete Object

Figure 19:
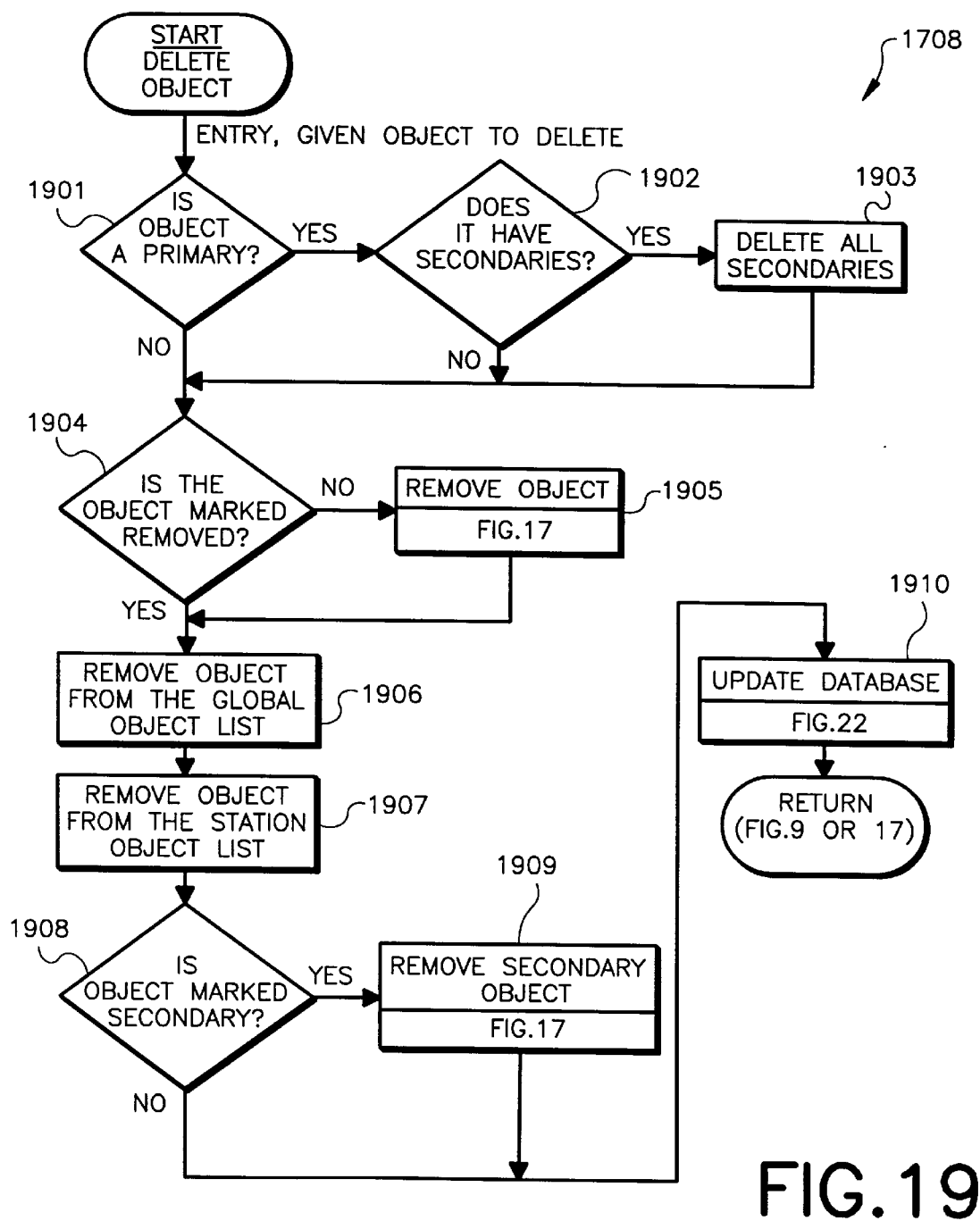
FIG. 19 is a flow chart showing a possible methodology that can be implemented in FIGS. 9 and 17 for deleting an object from the topology database of FIGS. 3A and 3B.

FIG. 19 shows the code for deleting an object from the topology database 314. This process is implemented at block 1708 in FIG. 17.

First, at block 1901, a determination is made as to whether the object is a primary object. If so, then block 1901 transfers to block 1902. Block 1902 determines whether the primary object has any secondary objects. If not, then block 1902 transfers to block 1904. If so, then block 1902 transfers to block 1903, which deletes all the secondary objects and then transfers to block 1904. When it is determined that the object is not a primary at block 1901, then block 1901 transfers to block 1904.

Block 1904 determines whether the object is marked for removal. If not, then block 1904 transfers to block 1905, which removes the object in accordance with the methodology set forth in FIG. 17 and transfers to block 1906. When it is determined that the object has been marked for removal at block 1904, then block 1904 transfers to block 1906.

Block 1906 removes the object from the global object list. Block 1906 transfers to block 1907.

Block 1907 removes the object from the stations object list. Block 1907 transfers to block 1908.

Block 1908 determines whether the object is marked as a secondary object. If so, then block 1908 transfers to block 1909 which removes the secondary object in accordance with the methodology set forth in FIG. 17 and transfers to block 1910. When it is determined that the object is not marked as a secondary at block 1908, then block 1908 transfers to block 1910.

Block 1910 updates the topology database 314. This process will be described in further detail with reference to FIG. 22. Afterwards, the subroutine 1708 transfers either to block 1709 in FIG. 17 or to block 914 in FIG. 9.

10. Update Object Fields

Figure 20:
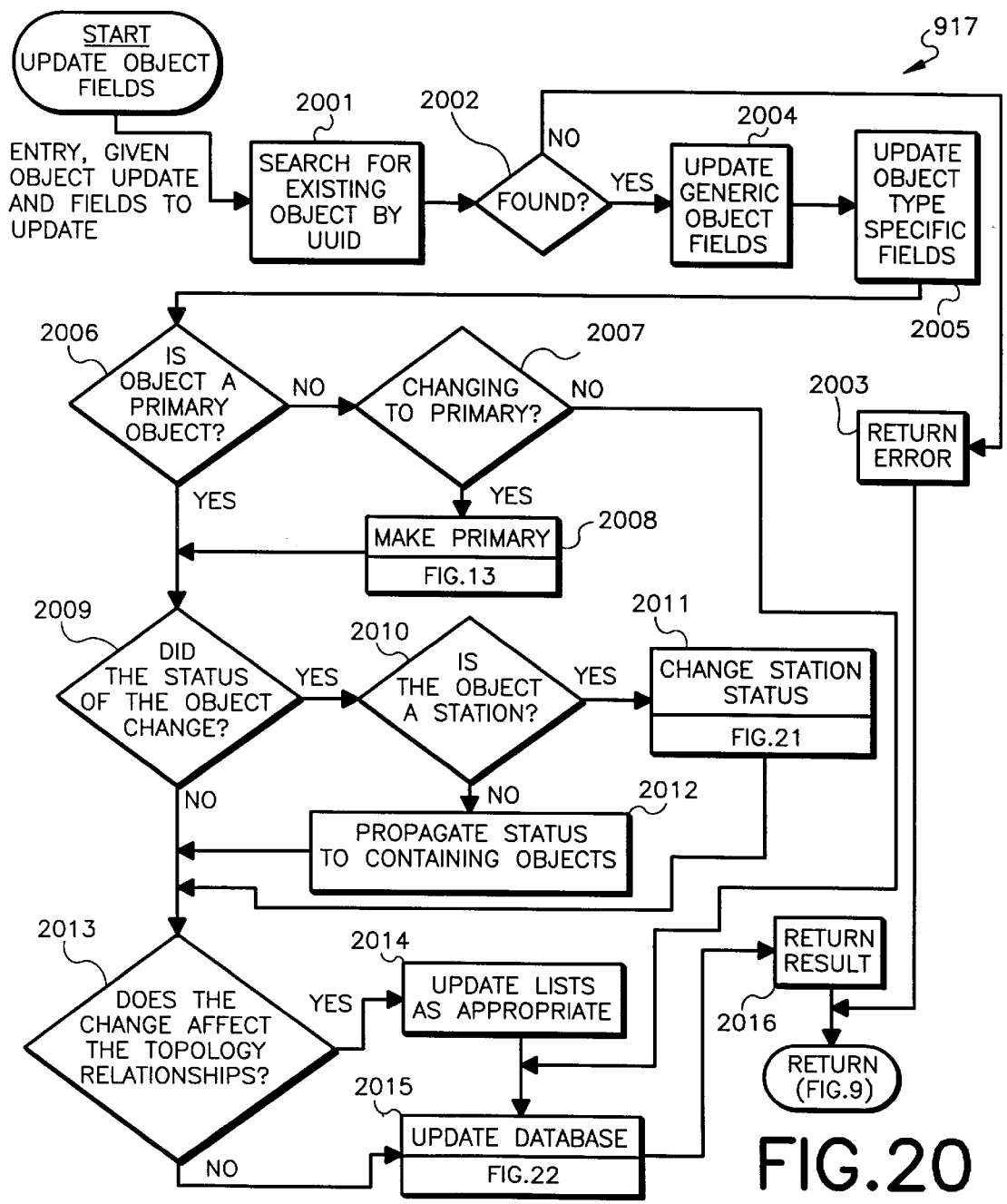
FIG. 20 is a flow chart showing a possible methodology that can be implemented in FIG. 9 for updating fields pertaining to an object in the topology database of FIGS. 3A and 3B.

FIG. 20 shows the code for updating fields pertaining to an object in the topology database 314. This process is implemented at block 915 in FIG. 9. Subroutine 915 is implemented when there has been a change to a field of an object. As examples, the fields change when the IP address of the object has changed, when the status of the object has changed, or when an internal flag has changed.

Block 2001 searches for the existing object by using the UUID. Block 2001 transfers to block 2002.

A determination is made as to whether the object has been found at block 2002. If it has not been found, then block 2002 transfers to block 2003, which returns an error message and transfers to block 916 in FIG. 9. When the object has been found, then block 2002 transfers to block 2004.

Block 2004 updates the generic object fields, for example, the object status or the internal flags. Block 2004 transfers to block 2005.

Block 2005 updates the specific fields pertaining to the object type. For example, in the case of a node object, a host name is updated. As another example, for an interface, the IP mask may change. Block 2005 transfers to block 2006.

At block 2006, a determination is made as to whether the object is a primary object. If not, then block 2006 transfers to block 2007. Block 2007 determines whether the object is to be changed to a primary object. If so, then block 2007 transfers to block 2008, which makes the object a primary object in accordance with the methodology set forth in FIG. 13 and transfers to block 2009. To the contrary, if the object is not to be changed to the primary object, then block 2007 transfers to block 2015. Moreover, if at block 2006, it is determined that the object is the primary object, then block 2006 transfers to block 2009.

Block 2009 determines whether the status of the object has changed. If so, then the status field is modified. In this regard, block 2009 transfers to block 2010. At block 2010, an inquiry is made as to whether the object is a station 100. If so, then block 2011 changes the station status in accordance with the methodology set forth in FIG. 21 and transfers to block 2013. If the object is not a station, then block 2010 transfers to block 2012, which propagates the status to objects containing the present object and then transfers to block 2013. As an example, if the status of a node has changed, then the status of segments containing the node may also have changed and the status fields of any such segments are modified. If, at block 2009, it is determined that the status of the object has not changed, then block 2009 transfers to block 2013.

Block 2013 makes a determination as to whether any change has affected any of the topology relationships. This determination depends upon the fields that are updated. For example, if an interface is getting moved from one segment to another segment because the system has detected that the node is actually moved, this information must be updated. When the change does affect the topology relationships, then block 2013 transfers to block 2014. At block 2014, the lists are updated as appropriate. Afterwards, block 2014 transfers to block 2015. At block 2013, if it is determined that the change does not affect the topology relationships, then block 2013 transfers to block 2015.

Block 2015 updates the topology database 314 in accordance with the methodology set forth in FIG. 22, as will be described hereafter. Upon completion, it transfers to block 2016, which returns to the code in FIG. 9.

11. Change Station Status

Figure 21:
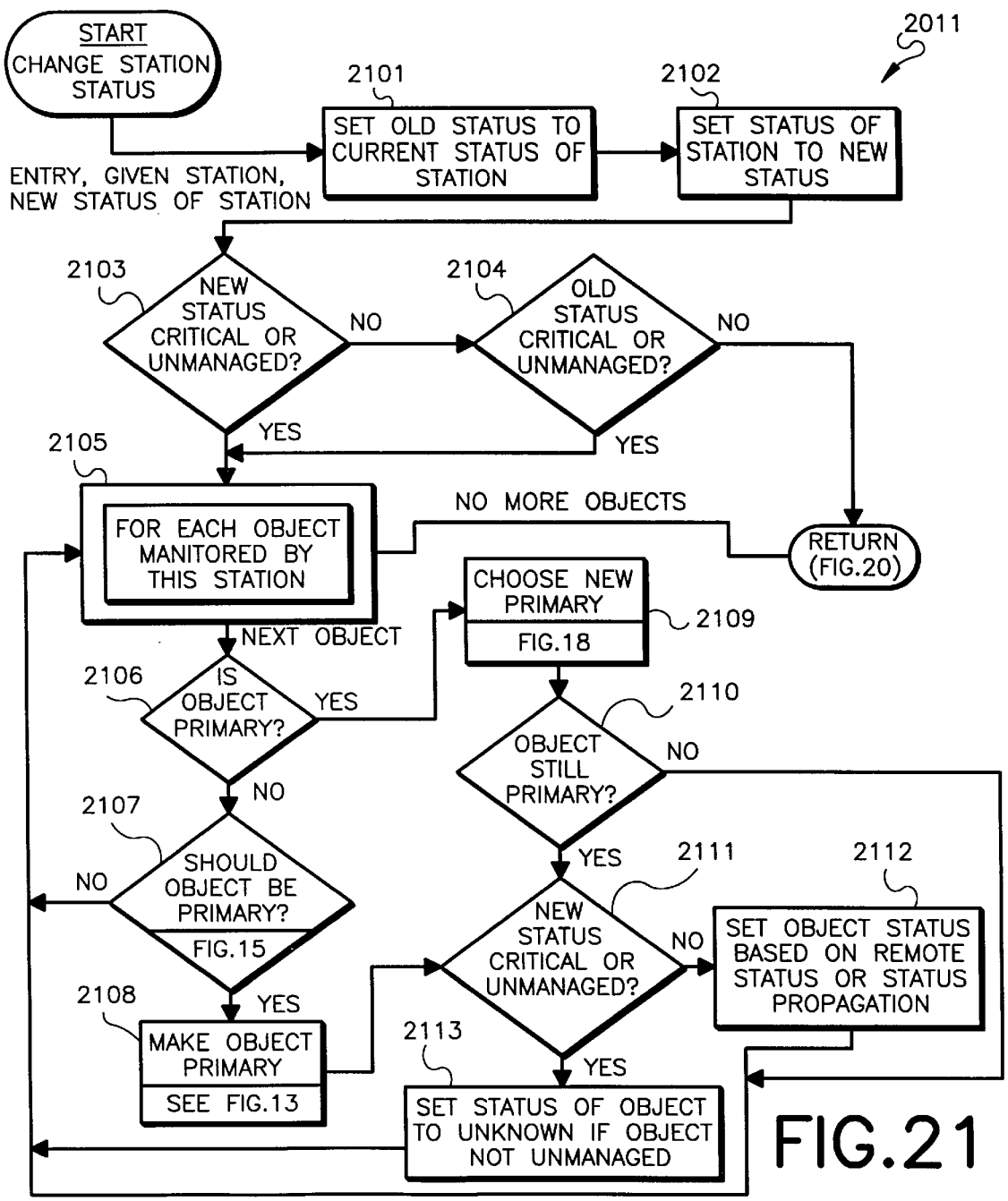
FIG. 21 is a flow chart showing a possible methodology that can be implemented in FIG. 20 for changing station status.

FIG. 21 shows the code for changing a station's status. In general, a status field is manipulated in the station object. This process is performed at block 2011 in FIG. 20. The subroutine is called upon when the replicator 303 has detected some change in the status of a remote status 100. The replicator 303 periodically checks with other stations 100 in order to detect whether the present station 100 can communicate with and retrieve information from the remote stations 100. Another example when the status of a station 100 can change is when the user specifies a station 100 as unmanaged. In this scenario, the user is indicating that the user does not wish to receive information any more from the specified station 100.

Initially, at block 2101, the old status of the station 100 is changed to the current status of the station 100. Block 2101 transfers to block 2102.

Block 2102 sets the status of the station 100 to the new status. Block 2102 transfers to block 2103.

Block 2103 determines whether the new status is critical or unmanaged. A station 100 is "critical" when the current station 100 attempted to communicate with the remote station 100 several times and did not get any response. If the answer to the inquiry is in the negative, then block 2103 transfers to block 2104. Alternatively, block 2103 transfers to block 2105.

At block 2104, a determination is made as to whether the old status is critical or unmanaged. If not, then block 2104 returns to block 2012 of FIG. 20. Otherwise, block 2104 transfers to block 2105.

A loop commences at block 2105 in order to change the status of each object that is monitored by the station 100 whose status has changed. Each iteration of the loop checks and updates, if necessary, the status of each object pertaining to the station 100 at issue.

An object is retrieved at block 2105, if any remain, and block 2105 transfers to block 2106.

Block 2106 determines if the object is a primary object. If so, then block 2106 transfers to block 2109 which chooses a new primary in accordance with the methodology set forth in FIG. 18. Further, block 2109 transfers to block 2110, which makes a determination as to whether the object is still the primary object. If not, then block 2110 transfers back to block 2105. If so, then block 2110 transfers to block 2111, which determines whether the new status is critical or unmanaged. If not, then block 2111 transfers to block 2112 which sets the object status based on the remote station status or status propagation. If the new status is critical or unmanaged, then block 2111 transfers to block 2113, which sets the status of the object to unknown if the object is not unmanaged.

At block 2106, if it is determined that the object is not a primary object, then block 2106 transfers to block 2107. Block 2107 determines whether the object should be the primary object based upon the methodology set forth in FIG. 15. If not, then block 2107 transfers back to block 2105 for analysis of the next object. If the object should be the primary, then block 2107 transfers to block 2108, which makes the object the primary object in accordance with the methodology set forth in FIG. 13. Moreover, block 2108 transfers to block 2111, the functionality of which was previously described.

After each object has been examined and updated, if necessary, then block 2105 transfers to block 2012 in FIG. 20.

12. Update Local Topology Database

Figure 22:
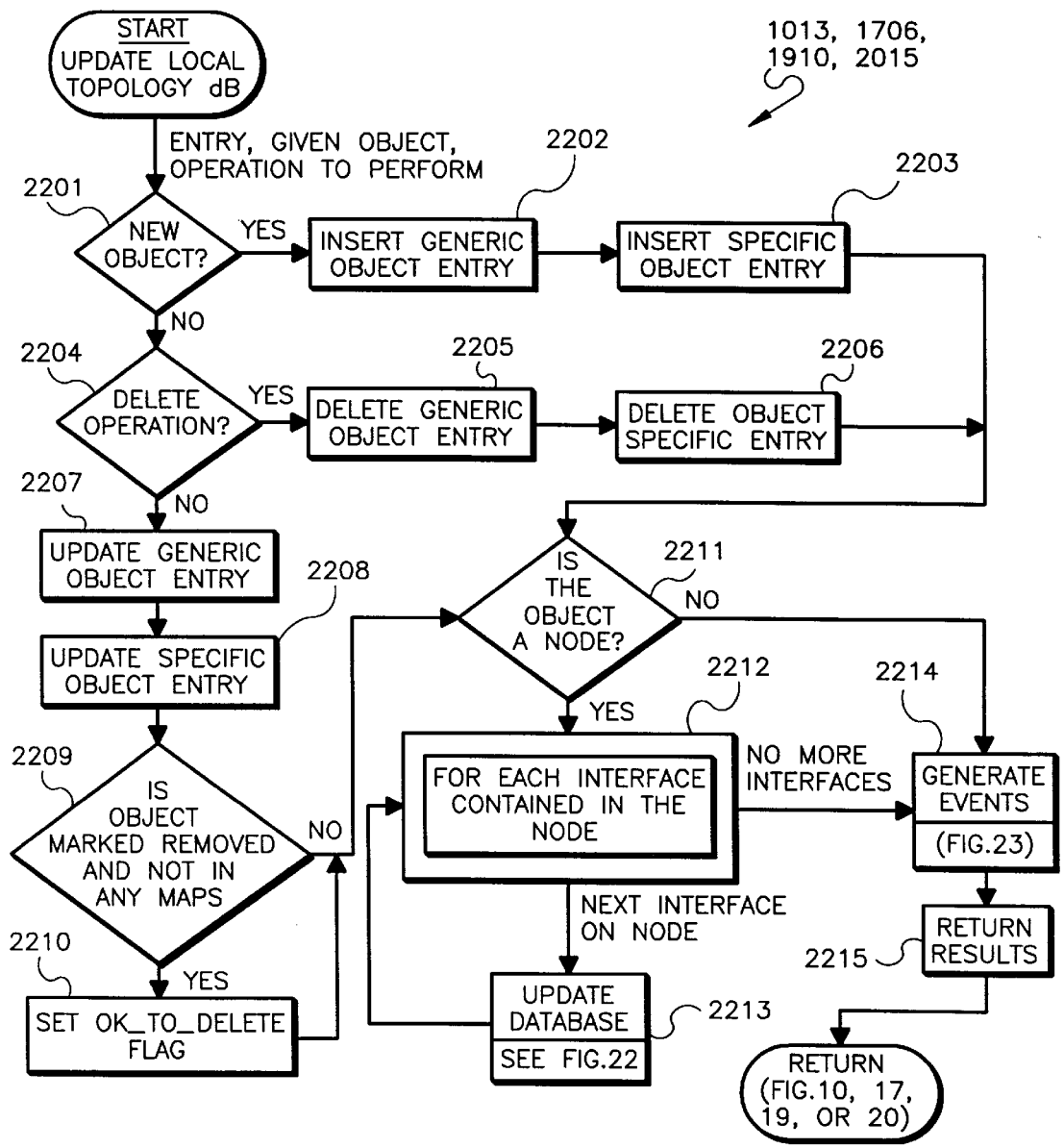
FIG. 22 is a flow chart showing a possible methodology that can be implemented in FIG. 20 for updating the topology database of FIGS. 3A and 3B.

FIG. 22 shows code for updating the topology database 314. This process is performed at block 1013 of FIG. 10, at block 1706 of FIG. 17, at block 1910 of FIG. 19, and at block 2015 of FIG. 20.

First, at block 2201, an inquiry is made as to whether the object is new. If so, then block 2201 transfers to block 2202, which inserts the generic fields pertaining to the object. Block 2202 transfers to block 2203, which inserts the specific fields pertaining to the object entry. Block 2203 transfers to block 2211. At block 2201, if it is determined that the object is not new, then block 2201 transfers to block 2204.

At block 2204, a determination is made as to whether the operation to be performed is a delete operation. If so, then block 2204 transfers to block 2205, which deletes the generic object entry. Block 2205 transfers to block 2206, which deletes the object specific entry. Block 2206 transfers to block 2211. At block 2204, if it is determined that the operation is not a delete operation, then block 2204 transfers to block 2207.

Block 2207 updates the generic object entry. Block 2207 transfers to block 2208.

At block 2208, the specific object entry is updated. Block 2208 transfers to block 2209.

At block 2209, a determination is made as to whether the object is marked for removal and is not in the maps. If so, then the object is flagged for deletion by block 2210, which in turn transfers to block 2211. If it is determined that the object is not marked for removal or resides in the map 200 (FIG. 2), the mark 2209 transfers to block 2211.

Block 2211 determines whether the object is a node. If not, then block 2211 transfers to block 2214, which generates events pertaining to the operation at issue. This process will be further described with reference to FIG. 23. After block 2214 is executed, block 2214 transfers to block 2215, which concludes the subroutine 2015 and transfers to block 2016 in FIG. 20. If at block 2211 it is determined that the object is a node, then block 2211 transfers to block 2212, where a loop is commenced to update the interfaces within the node. An interface is retrieved and then block 2212 transfers to block 2213. Block 2213 updates the topology database 314 relative to the interface pursuant to the methodology set forth in FIG. 22. Block 2213 transfers back to block 2212 and processes another interface, if any remain. After all interfaces have been processed, block 2212 transfers to block 2214.

Block 2214 generates events, if necessary, regarding topology updates. This process will be described with reference to FIG. 23. Afterwards, block 2214 transfers to block 2215, which returns the results and returns to FIG. 20.

13. Update Remote Topology Database

Figure 23:
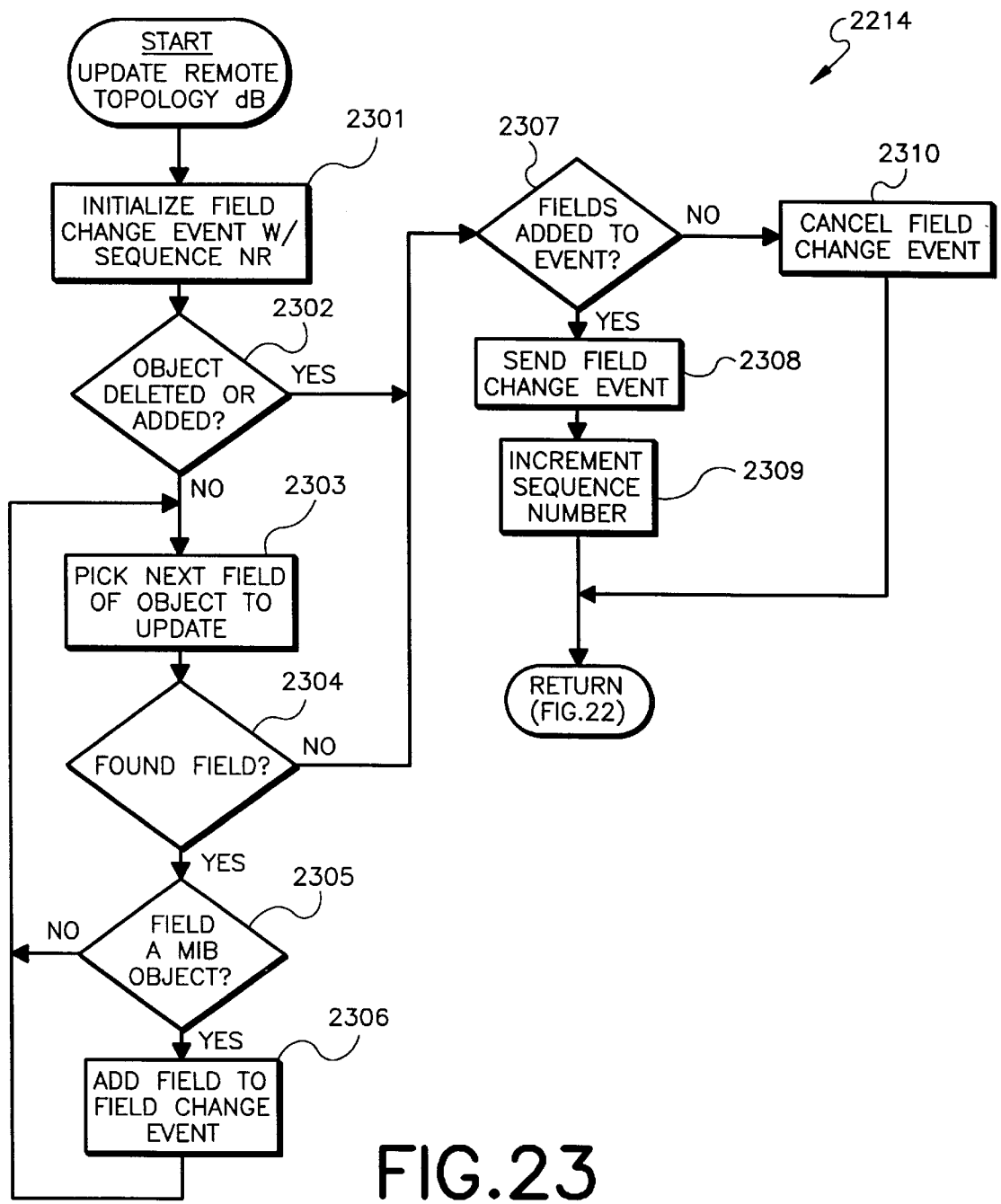
FIG. 23 is a flow chart showing a possible methodology that can be implemented in FIG. 22 for forwarding events from the topology manager of FIGS. 3A and 3B to a remote station regarding local topology changes.

FIG. 23 illustrates the code that is employed at block 2214 in FIG. 22. In essence, the subroutine 2214 as shown in FIG. 23 notifies replicators 303 to update any remote topology database situated at any remote station 100.

At block 2301, the field change event is initialized with a sequence number. Block 2301 transfers to block 2302.

At block 2302, a determination is made as to whether the object is to be deleted or added. If so, then block 2302 transfers to block 2307. If not, then block 2302 transfers to block 2303.

Block 2303 commences a loop where each field of the object is examined. Block 2303 picks the next field of the object to update and transfers to block 2304. At block 2304, a determination is made as to whether the field was found. If not, then block 2304 transfers to block 2307. If so, then block 2304 transfers to block 2305.

Block 2305 makes an inquiry as to whether the field is a management information base (MIB) object, which standard is well known in the art. The MIB is specified by the SNMP standard and is basically, a conceptual database for exposing information through the SNMP protocol. If not, then block 2305 transfers to block 2303. If so, then block 2305 transfers to block 2306, which adds the field to the field change event and transfers back to block 2303.

At block 2307, an inquiry is made as to whether any fields have been added to the field change event. If not, then block 2307 transfers to block 2310, which cancels the field change event. If so, then block 2307 transfers to block 2308.

Block 2308 sends the field change event to any remote station 100 so that the remote databases 314 can be updated. Block 2308 then transfers to block 2309, which increments the sequence number pertaining to the field change event to indicate that the field change event has been initiated. Finally, the subroutine 2214 terminates and returns control to block 2215 in FIG. 22.

F. Topology Replicator

Figure 24:
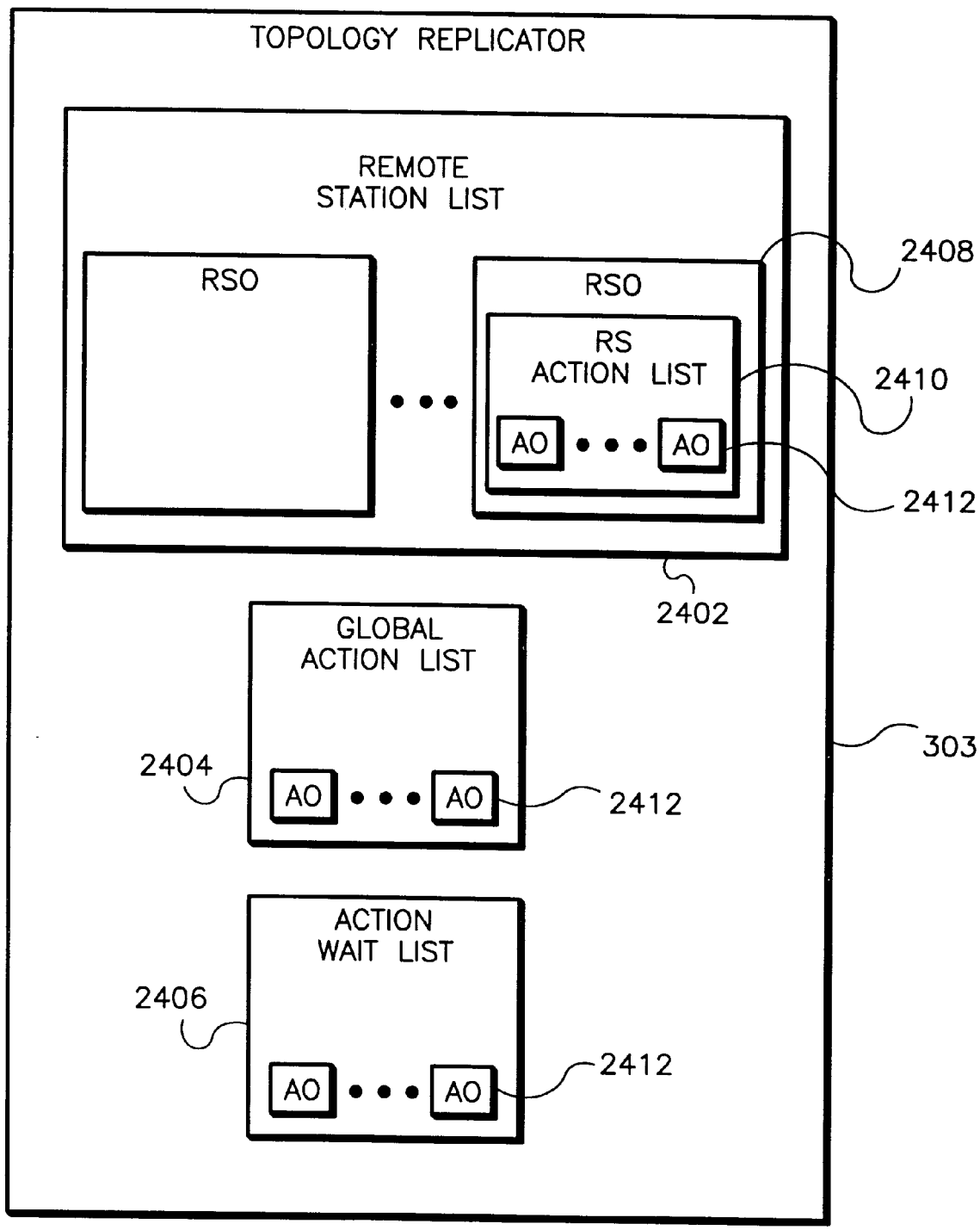
FIG. 24 is a block diagram illustrating a remote station list, global action list, and action wait list that are implemented within the replicator of FIG. 5.

The topology replicator 303 maintains a remote station list 2402, a global action list 2404, and an action wait list 2406, as is illustrated in FIG. 24. The remote station list 2402 is a list of all remote station objects managed by the local station 100 having the replicator 303. A remote station object represents a remote station 100 with which the replicator 303 communicates and from which remote topology data is received and merged with local topology data to form a distributed topology. The topology manager 310 maintains a set of remote station objects (RSOs) in the topology database 314. The remote station objects 2408 that the replicator 303 utilizes are a superset of information regarding each of the remote stations 100 that are managed.

Each remote station object 2408 has a remote station (RS) action list 2410, which contains an ordered list of action objects (AOs) 2412 that refer to the remote stations 100 that are to be managed. The list is ordered by action importance, action sequence, and action creation time.

An action object 2412 represents a specific set of operations that the replicator 303 is to perform. These actions may refer specifically to a particular remote station object or the replicator 303 as a whole. Action objects are created due to some sort of event that has occurred, for example, but not limited to, an event has come in from a remote station 100, is timed to perform a scheduled task (e.g., a status check), the replicator 303 has detected some sort of error condition, etc.

The global action list 2404 is a queue of actions that are ready to be processed by the management station 100 associated with the replicator 303. In operating systems terminology, this would be a ready list.

The action wait list 2406 is a list of actions that are waiting for a response to an SNMP request.

In the preferred embodiment, the following rules apply to the action objects 2412 and the lists 2402, 2404, 2406: (a) only the action at the head of a remote station action list 2410 can be placed on either the global action list 2404 or the action wait list 2406; (b) an action object 2412 cannot be on both the global action list 2404 and the action wait list 2406; (c) action objects 2412 on the global action list 2404 are processed one at a time with, preferably, round robin scheduling. (Note that actions may move between the global action list 2404 and the action wait list 2406 throughout their life span); and (d) an action object 2412 at the head of a remote station action list 2410 may be marked as nonexecuteable in which case the action object 2412 is prevented from being placed on the global action list 2404; this feature effectively stops all other actions on the same remote station action list 2402 from being placed on the global action list 2404 as well.

FIG. 25 illustrates the architecture of the code pertaining to the topology replicator 303 (FIGS. 3A and 3B). In its highest level of abstraction, the replicator 303 communicates directly with the topology manager 310 and with other stations 100 in order to gather information regarding the topology, and it provides this topology information to the topology manager 310 for processing.

Initially, at block 2501, connections, data structures, etc. are initialized. A list of initial stations 100 is retrieved from the topology manager 310. The replicator 303 requests this list and creates a remote station object 2408 for each managed station 100. Block 2501 transfers to block 2502.

Block 2502 initializes the static portions of a select ( ) mask. The select ( ) mask describes to the file descriptors from which the replicator 303 waits for input. The static file descriptors are the management daemon file descriptor (for process control and which is the process that starts and stops the replicator process) and the event file descriptor (for incoming events). Block 2502 transfers to block 2503.

Each event forwarded from the remote stations 100 to the local station 100 regarding adding, deleting, or changing topology objects is identified with a sequence number. This sequence number is unique only within a station 100. For instance, the station 100b (FIG. 4) could forward an event to the station 100a (FIG. 4) having a sequence number that is identical to one already accorded by the station 100a.

The sequence number allows the replicator 303 to determine the order that events occurred on a station 100 in the event that the events are received out of order. It also allows the replicator 303 to know if it is missing an event from a station 100. The sequence number check is used to determine if an event has been missed from any of the stations 100. The basic algorithm for each managed station 100 is as follows: if (a) the event from the station 100 with the smallest sequence number is greater than one plus the sequence number of the last event processed and if (b) a sufficient amount of time has elapsed for the next event to be received (currently one status check period), then the event is assumed to be lost. Because information is lost, that information should be retrieved via a synchronization with the particular station 100 involved. Accordingly, a synchronization action 2412 (FIG. 24) is added to this particular station's action list 2406 (FIG. 24). Block 2503 transfers to block 2504.

At block 2504, appropriate actions 2412 are added to the global action list 2404. Actions 2412 at the head of each action list 2406 are added to the tail of the global action list 2404, if the following criteria are met: (a) the action 2412 is not already on the global action list 2404 or the action wait list 2406; (b) the sequence number of the action 2412 is either −1 (not as a result of an event from a station 100) or 1 greater than the sequence number of the last action 2412 to be processed from this particular station action list 2406; and (c) the action 2412 is marked as executable. Afterwards, block 2504 transfers to block 2505.

Block 2505 initializes dynamic portions of the select ( ) mask and waits for input. Dynamic portions of the select ( ) mask include the file descriptors of SNMP sessions with outstanding requests. Waiting for input also involves choosing a reasonable time to wait before processing other actions that are ready. The following describes how time outs are determined: (a) if an action exists on the global action list 2404, then the time out is 0 seconds; that is, an outstanding input is checked for and if any exist, any associated actions are immediately processed; and (b) if the time out is not 0, the time out is determined as the minimum of the following time periods: (1) the time between now and the next scheduled station status check; (2) the time between now and the next time out for a local topology request; and (3) 2,147,483,647 seconds (i.e., maximum seconds in a signal 32-bit word). Block 2505 transfers to block 2506.

At block 2506, a determination is made as to whether the select ( ) call detected a time out. If so, then block 2506 transfers to block 2507. If not, then block 2506 transfers to block 2510.

Block 2507 places remote station status check actions on their respective remote station action lists 2410 (FIG. 24). If a remote station 100 is due for a status check, then a status check action is created for that remote station 100 and the new action is placed on the remote station action list 2410. The action is placed on the list as follows: (a) if another status check action 2412 exists on the remote station action list 2410, then it is ensured that the existing status check action is executable and the new status check action is deleted; and (b) if the action 2412 at the head of the remote station action list 2410 is nonexecutable, then that action is changed to be executable and the status check action is placed at the head of the remote station action list 2410; otherwise, the status check action is placed at the tail of the remote station action list 2410. Block 2507 transfers to block 2508.

At block 2508, appropriate action objects are added to the global action list 2404 in accordance with, preferably, the same methodology described previously relative to block 2504. Block 2508 transfers to block 2509. A synchronization subroutine 2509' (FIGS. 26A–26B) and a status check subroutine 2509" (FIGS. 27A–27B) are actions that can be found on the global action list 2404. These subroutines will be described later in this document.

Block 2509 executes an action found on the global action list 2404. The action taken depends on the action object 2412 that is being processed. Block 2509 transfers to block 2503. When, at block 2506, a determination is made that the select ( ) call did not time out, then block 2506 transfers to block 2510. At block 2510, a determination is made as to whether any events have been received. If so, then block 2510 transfers to block 2511. If not, then block 2510 transfers to block 2512.

At block 2511, any events are read and preprocessed into actions. Actions are either placed on the global action list 2404 if the event is not specific to a particular remote station 100 or on the remote station action list 2410 of the remote station 100 to which the action refers. The preferred process for preprocessing events into action is further shown at FIG. 28 and will be described in further detail hereinafter. After execution of the block 2511, the replicator returns to block 2503.

Block 2512 determines whether we have received any responses to SNMP requests. If so, then block 2512 transfers to block 2513. If not, then block 2512 transfers to block 2514.

Block 2513 reads the SNMP response and adds resulting information to the corresponding action. The SNMP response is read, and if the transaction ID of the SNMP response matches that of an action found on the action wait list 2406, then the data returned by the SNMP response is added to the action object 2412. The action is then removed from the action wait list 2406 and placed on the global action list 2404. If the transaction ID of the SNMP response does not match that of any action on the action wait list 2406, then the response is ignored. After execution of block 2513, block 2513 transfers back to block 2503.

At block 2514, an inquiry is made as to whether there are any SNMP time outs. If so, then block 2514 transfers to block 2515. If not, then block 2514 transfers to block 2503.

Block 2515 processes SNMP retries or generates error conditions. If a request times out, the request is retried up to three times, in the preferred embodiment. After the third time out, an error condition occurs. The steps taken after an SNMP time out depend on the action from which the SNMP request originated, but in most cases, a remote station status check action will be created and placed at the head of the remote station action list 2412 (FIG. 24). After execution of block 2515, block 2515 transfers to block 2503.

1. Synchronization Action

Figure 26A:
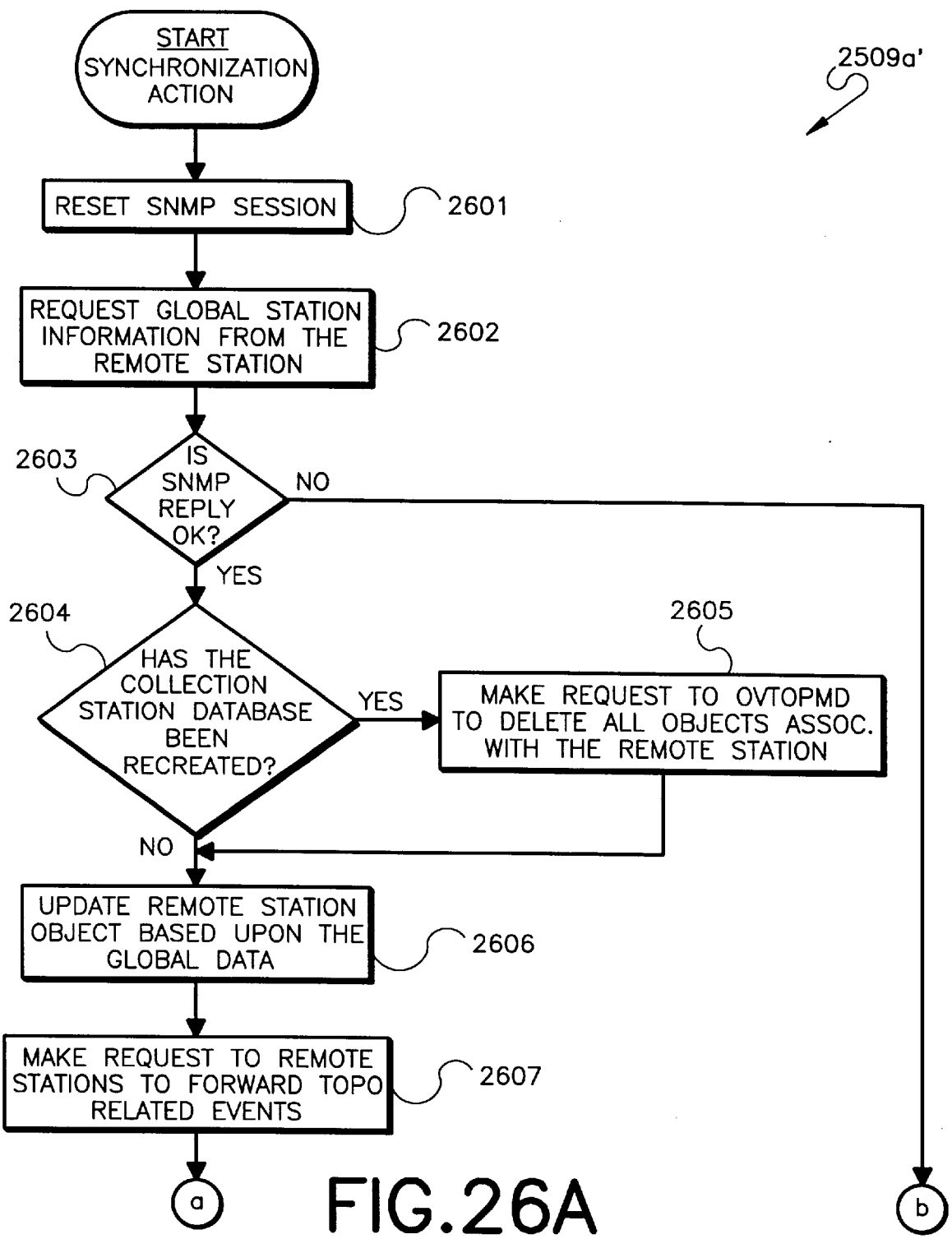
FIGS. 26A and 26B illustrate a flow chart showing a possible methodology that can be implemented in FIG. 25 for performing a synchronization action.
Figure 26B:
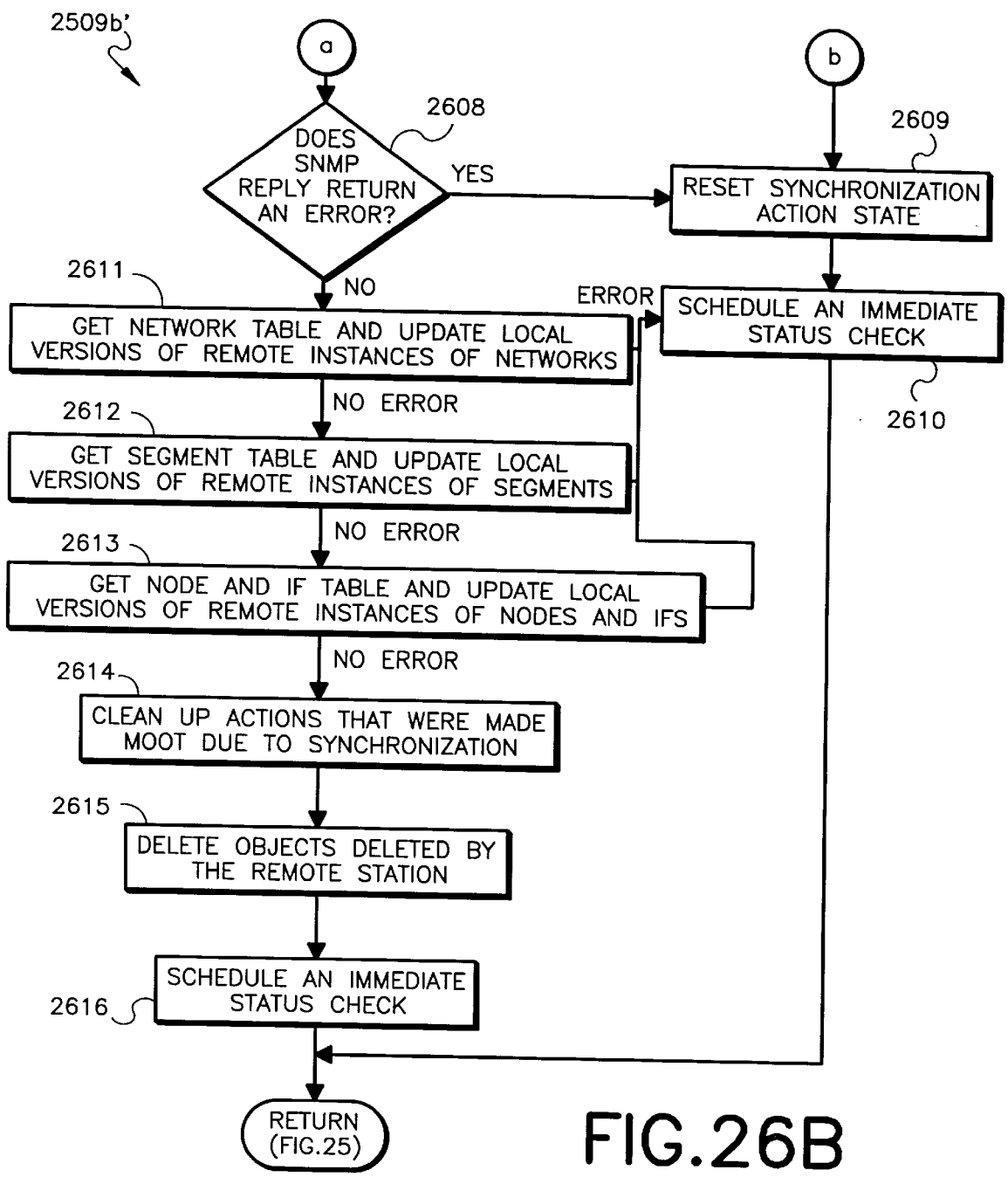

A synchronization action is performed as shown in FIGS. 26A and 26B. This methodology, generally denoted by reference numeral 2509', is implemented when a synchronization action is found on the global action list 2404. In general, the synchronization action requests all topology information from a remote station 100 and updates the local distributed topology based upon this information.

Initially, at block 2601, the SNMP session is reset, or closed and then reopened. This is done to ensure that the SNMP session has not gone down without the system knowing about it. Block 2601 transfers to block 2602.

Block 2602 requests information from the remote station 100. In essence, an SNMP request is made for all global station information. Block 2602 transfers to block 2603.

Block 2603 determines whether the SNMP reply is adequate by examining its structure and fields. If it is not, then block 2603 transfers to block 2609. If it is adequate, then block 2603 transfers to block 2604.

At block 2604, a determination is made as to whether the remote station database has been recreated. Here, the program tries to determine if the remote station 100 deleted and recreated its topology database 314. If this is the case, all of the topology information from the remote station 100 should be disregarded as inaccurate. Two methods are used to determine whether the remote station database 314 has been recreated.

One method involves comparing the database creation time passed in the SNMP response with the one stored in the remote station object. If the time passed in the SNMP response is greater than the time saved in the remote station object, the database has been recreated.

Another method involves comparing the last event sequence number passed in the SNMP response with the last event sequence number stored in the remote station object. If the sequence number passed in the SNMP response is less than the sequence number saved in the remote station object, then the database 314 has been recreated.

When the database 314 has been recreated, then block 2604 transfers to block 2605. Otherwise, block 2604 transfers to block 2606.

Block 2605 makes a request to the topology manager 310 to delete all objects associated with the remote station 100. It would be difficult to reconcile data in the new remote station topology database with the data stored locally originating from the old remote station topology database. Therefore, before making a request to the remote station 100 for object information, a request is made to the topology manager 310 to delete all the information in the local topology associated with the old remote station 100. Block 2605 transfers to block 2606.

Block 2606 updates the remote station object based upon the global data. If any of the global remote station data has changed as a result of the SNMP reply, then a request is made to the topology manager 310 to update the remote station object accordingly in the local topology. When this request has been satisfied, then block 2606 transfers to block 2607.

Block 2607 makes a request to the remote station 100 to forward topology related events to the local station 100. After the synchronization action 2509a' has been completed, asynchronous events from the remote station 100 will be depended upon to update the management station 100 if anything changes in the remote station's topology. This request serves to ensure that the remote station 100 is configured to forward these topology related events (traps). Block 2607 transfers to block 2608.

At block 2608, a determination is made as to whether the SNMP reply has returned an error. If the SNMP request to forward events to the management station 100 fails, then block 2608 transfers to block 2609. Otherwise, if an SNMP reply is not in error, then block 2608 transfers to block 2611.

Block 2609 resets the synchronization action state. Although the synchronization action has failed, the conditions that lead to the synchronization have not changed. Therefore, the synchronization action is reset to its initial state. Block 2609 transfers to block 2610.

Block 2610 schedules an immediate status check. Communication with the remote station 100 has failed. The station's state needs to be checked. A status check action is created and placed at the head of the remote station action list 2410. Block 2610 transfers to block 2503 of FIG. 25.

If, at block 2608, it is determined that an SNMP reply has been returned without an error, then block 2611 obtains a network table and updates local versions of remote instances of network objects. SNMP requests are made to retrieve all network objects from the remote station 100. The replies to these requests contain network objects that are used to update the remote network object instances located in the topology manager's local topology. If the network object does not need to be updated, the UUID of the network object is saved for future processing.

SNMP errors may occur in this operation. SNMP time outs are retried as described previously. Other SNMP errors are either ignored and stored or the UUID of the last successfully received object is saved in the station object and program flow is transferred to block 2610. In the latter scenario, when the status check action is successful, the synchronization action will pick up where it left off in the network table. After all network objects have been synchronized, block 2611 transfers to block 2612.

Block 2612 obtains the segment table and updates local versions of remote instances of segment objects. SNMP requests are made to retrieve all segment objects from the remote station 100. The replies to these requests contain segment objects that are used to update the remote segment object instances located in the topology manager's local topology. If the segment object does not need to be updated, the object ID of the segment object is saved for future processing.

SNMP errors may occur in this operation. SNMP time outs are retried as described previously. Other SNMP errors are either ignored and stored or the UUID of the last successfully received object is saved in the station object and the program flow is transferred to block 2610. In the latter scenario, when the status check action is successful, the synchronization action will pick up where it left off in the segment table. After all segment objects have been synchronized, block 2611 transfers to block 2613.

Block 2613 obtains the node and interface table and updates local versions of remote instances of node and interface objects. SNMP requests are made to retrieve all node and interface objects from the remote station 100. The replies to these requests contain node and interface objects that are used to update the remote node and interface object instances located in the topology manager's local topology. If the node or interface object does not need to be updated, the object ID of the node or interface object is saved for future processing.

SNMP errors may occur in this operation. SNMP time outs are retried as described previously. Other SNMP errors are either ignored and stored or the UUID of the last successfully received object is saved in the station object and the program flow is transferred to block 21610. In the latter scenario, when the status check action is successful, the synchronization action will pick up where it left off in the node and interface table. After all node and interface objects have been synchronized, block 2613 transfers to block 2614.

Block 2614 cleans up actions that were made moot due to the synchronization action. Any events that were received from the remote station 100 prior to the creation of the synchronization action are now moot, because all changes have been made (or will be soon made). The actions that apply are known based upon whether or not their sequence numbers are greater than that returned by the reply of the SNMP request for general topology information. If the sequence number of the action is less than or equal to the sequence number returned by the SNMP reply, then the action is now moot. The remote station action list 2410 is processed and all actions that are moot are deleted. Afterwards, block 2614 transfers to block 2615.

Block 2615 deletes objects deleted by the remote station 100. Blocks 2611 through 2613 of the synchronization action are effective in making changes to topology, if objects have been changed or have been added. However, they are not effective to flag objects that have been deleted by the remote station 100. To detect these objects, the list of object IDs that have been changed (gathered in blocks 2611 through 2613), and a request is made to the topology manager 310 to return a list of objects related to this remote station 100 that have not been changed since the beginning of this synchronization action, but not in the list of objects that were not updated, because no changes were made to them. The response to this request will contain a list of objects that have been deleted from the remote station 100. A request is then made to the topology manager 310 to remove all of the objects associated with the remote station that appear in the list. Block 2615 then transfers to block 2616 for scheduling and immediate status check.

Synchronization is complete. The remote station status should most likely be updated. Block 2616 creates a status check action and places it at the head of the remote station action list 2410 in order to update the current status of the remote station object. After execution of the code block 2616, block 2616 returns to block 2503 in FIG. 25.

2. Status Check Action

Figure 27A:
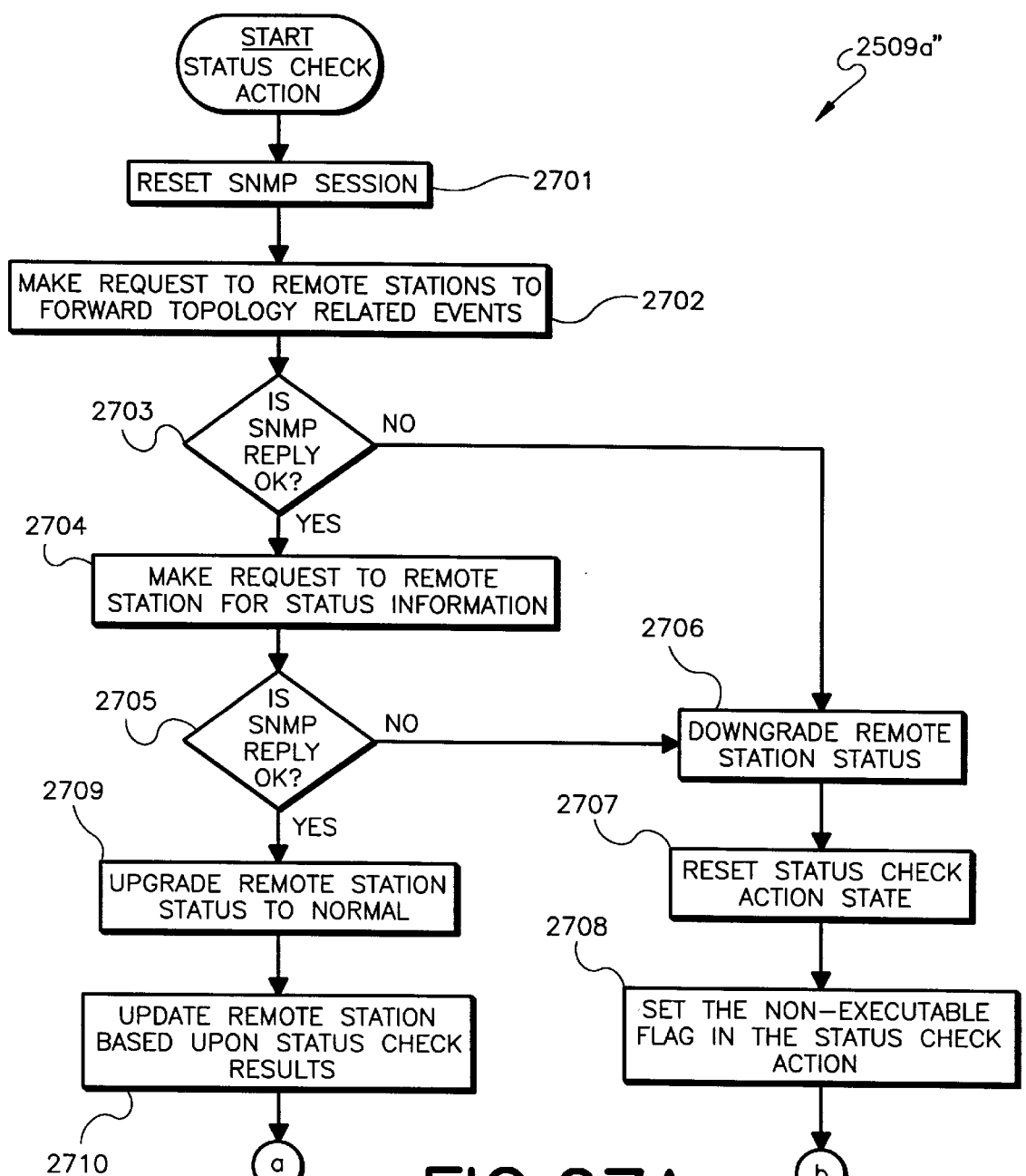
FIGS. 27A and 27B illustrate a flow chart showing a possible methodology that can be implemented in FIG. 25 for performing a status check action.
Figure 27B:
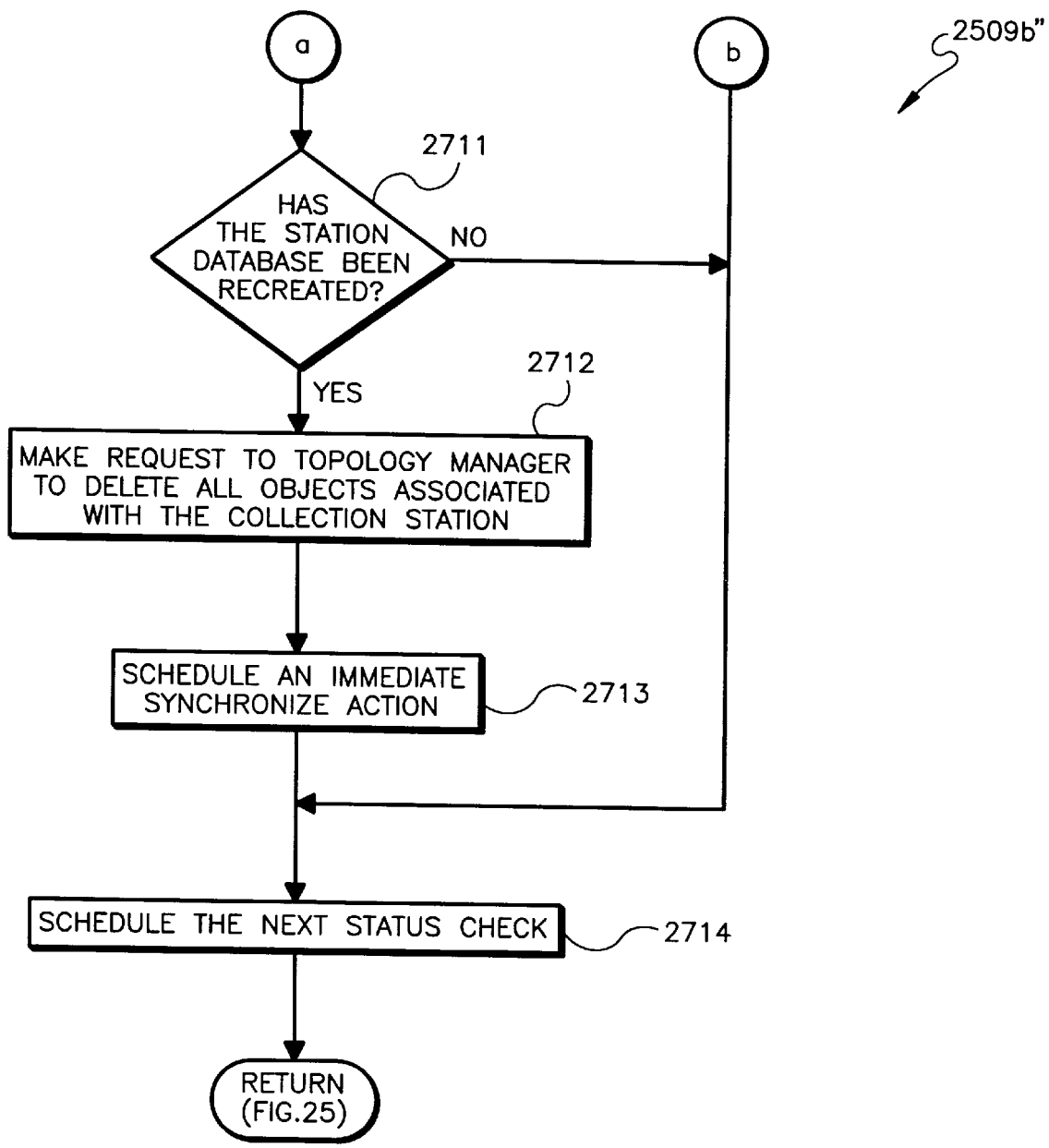

The preferred methodology for performing a status check action is set forth in FIGS. 27A and 27B. The purpose of the status check action is to give some indication regarding the "health" of the remote station 100. Health of the remote station 100 can be determined by answering the following questions: can we communicate with the remote station 100 and is it feeding information to the local station 100? This process is further described hereafter.

Initially, at block 2701, the SNMP session is closed and reopened for initialization purposes. Block 2701 transfers to block 2702.

Block 2702 makes a request to the remote station 100 to forward topology related events to the local station 100. This request ensures that the remote station 100 is configured to forward topology related events (traps) to the local station 100. Block 2702 transfers to block 2703. Block 2703 makes a determination as to whether the SNMP reply is adequate by examining the structure and fields thereof. If the reply is in error, then the block 2703 transfers to the block 2706. If the SNMP reply is adequate, then block 2703 transfers to block 2704.

Block 2704 makes a request to the remote station 100 for status information. This request is to ensure that the replicator 303 can obtain topology information from the remote station 100. Block 2704 transfers to block 2705.

At block 2705, a determination is made as to whether the SNMP reply is adequate. If not, then the block 2705 transfers to block 2706. If so, then block 2705 transfers to block 2709.

Block 2706 downgrades the station status. Stations are not automatically down just because of a failed status check. Block 2706 downgrades the status of the remote station object one notch, unless it is already at critical. This is accomplished by making a request to the topology manager 310 to update the remote station object based upon this change. Block 2706 transfers to block 2707. Block 2707 resets the status check action state to its initial state so that it can be run again. Block 2707 transfers to block 2708.

Block 2708 sets the nonexecutable flag in the status check action. In other words, the remote station 100 is blocked off until it is determined that the remote station 100 is again running properly. Block 2708 transfers to block 2714.

If, at block 2705, it is determined that the SNMP reply is adequate, then block 2705 transfers to block 2709. Block 2709 upgrades the station status of the remote station 100 to normal. The status field in the remote station object 2412 is changed to normal by making a request to the topology manager 310 to do so. Block 2709 transfers to block 2710.

Block 2710 updates the status object based upon the status information found in the SNMP response. It then makes a request to the topology manager 310 to update the remote station object 2412 based upon these changes. Block 2710 transfers to block 2711.

Block 2711 makes an inquiry as to whether the remote station's topology database 314 has been recreated. Here, the program attempts to determine if the remote station 100 deleted and recreated its topology database 314. If this is the case, all the topology information from the remote station 100 is unacceptable. It is determined whether the database 314 has been recreated based upon the methodology described in connection with block 2604 (FIG. 26A). That discussion is incorporated herein by reference. If it is determined that the station topology database 314 has been recreated, then block 2711 transfers to block 2712. Otherwise, block 2711 transfers to block 2714.

Block 2712 makes a request to the topology manager 310 to delete all objects 2412 associated with the remote station 100. At this point, it is known that the remote station topology database 314 has been recreated. It would be difficult to reconcile data in the new remote station topology database 314 with the data stored locally originating from the old remote station topology database 314. Therefore, before making a request to the remote station 100 for object information, a request is made to the topology manager 310 to delete all of the information in the local topology associated with the old remote station topology database 314. Block 2712 transfers to block 2713.

Block 2713 schedules an immediate synchronization action. It is added to the head of the remote station action list 2410. Block 2713 transfer to block 2714.

Block 2714 schedules the next status check for the remote station 100. It sets the remote station object field that determines when the next status check should happen. Block 2714 transfers to block 2503 in FIG. 25.

3. Event Sequencing

Figure 28:
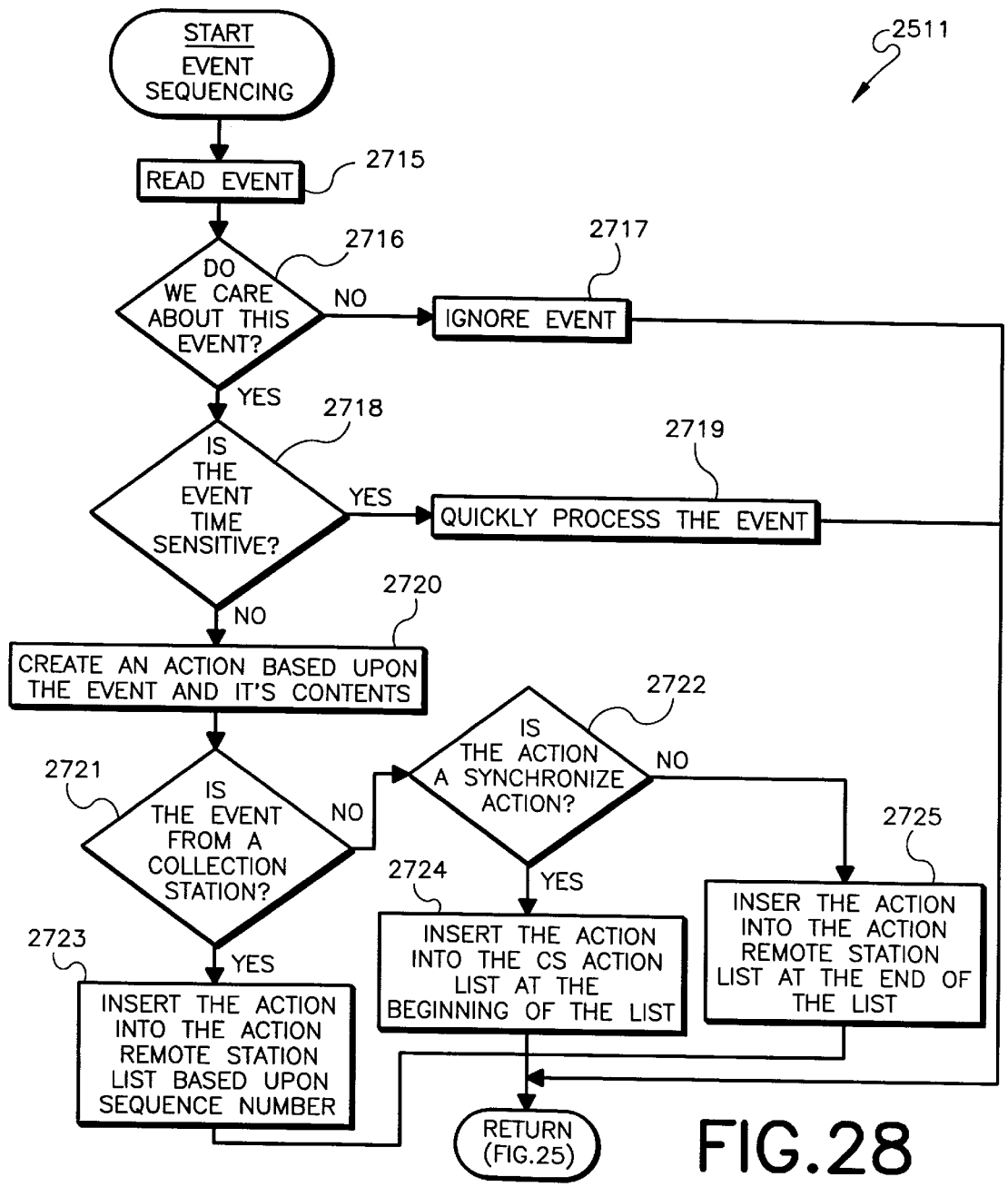
FIG. 28 is a flow chart showing a possible methodology that can be implemented in FIG. 25 for sequencing events received from remote systems.

The event sequencing block 2511 (FIG. 25) is shown in further detail in FIG. 28. The event sequencing subroutine 2511 sequences events in the remote station action list 2410 in the replicator 303.

The event sequencing subroutine 2511 commences after an event is received by the replicator 303. Block 2715 reads the event and parses the event. Block 2715 transfers to block 2716.

At block 2716, a determination is made as to whether the replicator 303 has an interest in the event. If not, then block 2716 transfers to block 2717. Block 2717 ignores the event and transfers program flow to block 2512 in FIG. 25. If it is determined that the replicator 303 does care about the event, then block 2716 transfers to block 2718.

Block 2718 makes an inquiry as to whether the event is time sensitive. This refers to events that trigger situations that require immediate attention without creating an action. If this is such an event, then block 2718 transfers to block 2719, which quickly processes the event and transfers program flow to block 2512 in FIG. 25. Otherwise, block 2718 transfers to block 2720.

Block 2720 creates an action based upon the event type and contents. Block 2720 transfers to block 2721.

At block 2721, a determination is made as to whether the event is from a remote station 100. If not, then block 2721 transfers to block 2722. If so, then block 2721 transfers to block 2723.

Block 2723 inserts the action into the remote station action list 2410 based upon a sequence number. This action was created as a result of an event received from a remote station 100. These actions should be sequenced based upon when they occurred on the remote station 100. If the remote station action list 2410 does not contain an action with a sequence number greater than that of this action, then this action is placed at the tail of the remote station action list 2410. Otherwise, this action is placed just before the action with the lowest sequence number greater than the sequence number of this action on the remote station action list 2410. Block 2723 transfers to block 2503 in FIG. 25.

At block 2722, a determination is made as to whether the action is a synchronization action. If so, then block 2722 transfers to block 2724, which inserts the action into the remote station action list 2410 at the beginning of the list. Block 2724 then transfers to block 2503 in FIG. 25. If it is determined at block 2722 that the action is not a synchronization action, then block 2722 transfers to block 2725. Block 2725 inserts the action into the remote station action list 2410 at the end of the list. Then, block 2725 transfers back to block 2503 in FIG. 25.

In concluding the detailed description, it should be noted that it will be obvious to those skilled in the art that many variations and modifications may be made to the preferred embodiments without substantially departing from the principles of the present invention. All such variations and modifications are intended to be included herein within the scope of the present invention, as set forth in the following claims. Further, in the claims hereafter, the structures, materials, acts, and equivalents of all means-plus-function elements and all step-plus-function elements are intended to include any and all structures, materials, or acts for performing the specified functions.

Wherefore, the following is claimed:

1. A system for permitting generation of a network management map of a data communication network, comprising:

first and second computers configured to determine respective first and second topology data by discovering devices and interconnections situated at respective first and second regions of said network; and a topology manager situated at one of said first and second computers for combining said first and second topology data into a merged set of topology data, said merged set of topology data defining a global view of network topology at said one computer.

2. The system of claim 1, wherein said topology manager further comprises a means for merging said first topology data and said second topology data by detecting an overlap in said data and selecting said first topology data instead of said second topology data when said overlap exists in said data.

3. The system of claim 1, said one computer having a replicator, said replicator comprising:

a remote station list having one or more remote station objects, one of said remote station objects corresponding to the other of said first and second computers, each said remote station object having an action list of one or more action objects corresponding to a respective computer, each said action object representing an operation that said replicator is to perform;

a global action list having actions that are ready to be processed by said replicator; and an action wait list having actions that are waiting for a response to a request made from said one computer to said other computer.

4. The system of claim 1, wherein said one computer having said topology manager further comprises:

a layout mechanism for displaying network objects;

means for tracking a first version of an object in said first topology data and for tracking a second version of said object in said second topology data, said first version of said object discovered by said first computer and said second version of said object discovered by said second computer; and means for selecting one of said versions for display by said layout mechanism.

5. The system of claim 1, wherein said first computer includes said topology manager and further comprises:

means for identifying a status of said second computer connected to said network as either managed or unmanaged; and means for selecting said first topology data instead of said second topology data for display based on said status.

6. The system of claim 1, wherein:

(a) said first computer comprises:

(1) a first network monitor configured to discover said first topology data corresponding with said first region of said network;

(2) a first topology database configured to store said first and second topology data;

(3) said topology manager configured to control said first topology database, to receive said first topology data from said first network monitor, and to receive said second topology data corresponding with said second region of said network; and (4) said replicator configured to communicate with said second computer to receive said second topology data and to forward said second topology data to said first topology manager; and (b) said second computer comprises:

(1) a second network monitor configured to discover said second topology data corresponding with said second region of said network;

(2) a second topology database configured to store said second topology data; and (3) a second topology manager configured to control said second topology database, to receive said second topology data from said second network monitor, and to forward said second topology data to said replicator.

7. The system of claim 1, wherein said first computer further comprises:

means for periodically checking an ability to communicate with said second computer; and means for marking objects from said second computer as unreliable when said first computer cannot communicate with said second computer.

8. The system of claim 1, wherein said first and second computers comprise a means for generating an event on said network for receipt by the other computer when a monitored object has changed.

9. The system of claim 2, wherein said first computer further comprises a layout mechanism configured to receive merged topology data from said topology manager and to drive a display based upon said merged topology data.

10. The system of claim 2, wherein said topology manager comprises a means for tracking a station object corresponding to the other computer.

11. The system of claim 2, wherein said topology manager further comprises:

means for tracking a universal object identifier corresponding uniquely with each object in said first and second topology data; and means for tracking a local object identifier corresponding with each said object, said local identifier being unique relative to either said first or second topology data.

12. The system of claim 3, further comprising a means for ordering said action objects in said remote station action list by one or more of the following considerations: action importance, action sequence, and action creation time.

13. The system of claim 3, further comprising:

means for identifying other stations connected to said network as either one of managed and unmanaged; and means for preventing unmanaged remote station objects from being placed in said remote station list.

14. The system of claim 3, further comprising:

means for placing a head of said remote station action list on either of said global action list and said action wait list;

means for preventing each action object from residing in both said global action list and said action wait list at a given time; and means for processing said action objects in said global action list one at a time.

15. The system of claim 3, further comprising a means for establishing a hierarchy of topology object versions, said hierarchy defining an order regarding accuracy and each of said topology object versions respectively received from one of a plurality of computers, wherein each of said computers is respectively located at a different region of said network.

16. The system of claim 14, further comprising a means for marking one of said action objects at a head of said remote station action list as nonexecutable in which case said one action object is prevented from being placed on said global action list, which in turn prevents other actions regarding a corresponding remote station from being placed on said global action list.

17. A management station for generating a network management map of a data communication network, comprising:

a processor;

a memory;

an output device;

an interface interconnecting said processor, said memory, and said output device and capable of connecting to said network;

a layout mechanism stored in said memory and configured to receive topology data indicative of devices and interconnections of said network and to drive said output device based upon said topology data; and a discovery mechanism stored in said memory and configured to discover and store said topology data, said discovery mechanism including:

a network monitor configured to discover first topology data corresponding with a first region of said network;

a topology database configured to store first and second topology data;

a topology manager configured to control said topology database, to receive first topology data from said network monitor, and to receive second topology data corresponding with a second region of said network; and a replicator configured to communicate with at least one other computer to receive said second topology data and to forward said second topology data to said topology manager.

18. The system of claim 17, wherein said topology manager further comprises:

means for deleting a topology object; and means for marking a topology object as removed, said removed object being ultimately deleted once map symbols maintained by said layout mechanism and representing said removed object are deleted.

19. The system of claim 17, further comprising:

a layout mechanism for displaying network objects;

means for tracking a first version of an object in said first topology data and for tracking a second version of said object in said second topology data; and means for selecting one of said versions for display by said layout mechanism; and means for either deleting or unmanaging the other one of said versions.

20. The system of claim 17, wherein said translator comprises:

a remote station list having one or more remote station objects, each said remote station object having an action list of one or more action objects corresponding to a respective remote station, each said action object representing an operation that said replicator is to perform;

a global action list having actions that are ready to be processed by said replicator; and an action wait list having actions that are waiting for a response to a request made from said station to a remote station.

21. The system of claim 17, wherein said topology manager further comprises a means for merging said first topology data and said second topology data to form a third topology data including data from said first and second topology data, said merging means defining an object in said third topology data with data from said first topology data instead of said second topology data when an overlap exists.

22. The system of claim 17, wherein said topology manager comprises a means for tracking at least one station object that corresponds to said at least one computer, said at least one station object including said second topology data.

23. The system of claim 17, wherein said topology manager further comprises:

means for tracking a universal object identifier corresponding uniquely with each object in said first and second topology data;

means for tracking a local object identifier corresponding with each said object, said local identifier being unique relative to either said first or second topology data; and means for tracking a remote object identifier corresponding to each local object identifier corresponding with objects in said second topology data.

24. The system of claim 17, further comprising:

means for selecting one of said first topology data and said second topology data for display when an overlap exists;

means for identifying said another station connected to said network as either one of managed and unmanaged; and means for disregarding during said selection said second topology data from said another station when identified as unmanaged.

25. The system of claim 19, further comprising a means for establishing a hierarchy of versions, said hierarchy defining an order regarding accuracy and each of said topology object versions respectively received from one of a plurality of computers, wherein each of said computers is respectively located at a different region of said network.

26. The system of claim 20, further comprising a means for ordering said action objects in said remote station action list by one or more of the following considerations: action importance, action sequence, and action creation time.

27. The system of claim 20, further comprising:

means for identifying other stations connected to said network as either one of managed and unmanaged; and means for preventing unmanaged remote station objects from being placed in said remote station list.

28. The system of claim 20, further comprising:

means for placing a head of said remote station action list on either of said global action list and said action wait list;

means for preventing each action object from residing in both said global action list and said action wait list at a given time; and means for processing said action objects in said global action list one at a time.

29. The system of claim 25, wherein said means for establishing said hierarchy comprises:

first means for receiving an old primary object and a secondary object;

second means for defining said old primary object as a new primary object when said secondary object is marked for removal; and third means, operative after said second means when said new primary object is yet to be defined, for defining said secondary object as said new primary object when said old primary object is marked for removal.

30. The system of claim 28, further comprising a means for marking one of said action objects at a head of said remote station action list as nonexecutable in which case said one action object is prevented from being placed on said global action list, which in turn prevents other actions regarding a corresponding remote station from being placed on said global action list.

31. The system of claim 29, further comprising:

fourth means, operative after said third means when said new primary object is yet to be defined, for defining said old primary object as said new primary object when a remote station monitoring said secondary object is either one of nonresponsive and unmanaged; and fifth means, operative after said fourth means when said new primary object is yet to be defined, for defining said secondary object as said new primary object when said station monitoring said old primary object is either one of nonresponsive and unmanaged.

32. The system of claim 31, further comprising:

sixth means, operative after said fifth means when said new primary object is yet to be defined, for defining said old primary object as said new primary object based upon a preprogrammed user preference; and seventh means, operative after said sixth means when said new primary object is yet to be defined, for defining said secondary object as said new primary object based upon another preprogrammed user preference.

33. The system of claim 32, further comprising:

eighth means, operative after said seventh means when said new primary object is yet to be defined, for defining said old primary object as said new primary object when said secondary object is unmanaged and said old primary object is managed; and ninth means, operative after said eighth means when said new primary object is yet to be defined, for defining said secondary object as said new primary object when said secondary object is managed and said old primary object is unmanaged.

34. The system of claim 33, further comprising:

tenth means, operative after said ninth means when said new primary object is yet to be defined, for defining said secondary object as said new primary object when said secondary object is contained in another object that is another primary object.

35. The system of claim 34, further comprising:

eleventh means, operative after said tenth means when said new primary object is yet to be defined, for defining said old primary object as said new primary object when said secondary object is from said remote station and is umnonitored locally by said station and said eleventh means for defining said secondary object as said new primary object when said secondary object is from said remote station and is monitored locally at said station.

36. A computer readable medium having a program for discovering and storing a network management map of devices and interconnections of a data communication network, the program comprising:

a network monitor configured to discover first topology data corresponding with a first region of said network;

a topology database configured to store first and second topology data, said second topology data corresponding with a second region of said network;

a topology manager configured to control said topology database, to receive first topology data from said network monitor, and to receive second topology data corresponding with a second region of said network; and a replicator configured to communicate with at least one other computer to receive said second topology data and to forward said second topology data to said topology manager.

37. A method for discovering network topology data, comprising the steps of:

determining a plurality of sets of topology data with a corresponding plurality of computers by discovering devices and interconnections situated at predetermined respective regions of said network; and combining said sets of topology data at a computer to provide a combined set of topology data;

identifying overlapping objects in said sets of said topology data;

selecting a preferred set of said topology data to define one of said overlapping objects in said combined set of topology data; and deriving a global view of said network topology data at said computer from said combined set of topology data.

38. The method of claim 37, further comprising the step of assigning an object identifier to each object in said topology data that is unique to said computers.

39. The method of claim 37, further comprising the steps of:

maintaining at said computer a remote station list having one or more remote station objects, said remote station objects corresponding respectively to said plurality of computers, each said remote station object having an action list of one or more action objects corresponding to a respective computer, each said action object representing an operation that said computer is to perform;

maintaining at said computer a global action list having actions that are ready to be processed by said computer; and maintaining at said computer an action wait list having actions that are waiting for a response to a request made from said computer to said another computer.

40. The method of claim 37, further comprising the steps of:

tracking multiple versions of objects from said plurality of computers at said computer; and selecting one of said multiple versions for display at said computer.

41. The method of claim 37, further comprising the steps of:

selecting one set of said topology data instead of another set of said topology data for display when a redundancy exists;

identifying one of said computers as either one of managed and unmanaged; and disregarding said one computer during said selection when identified as unmanaged.

42. The method of claim 37, further comprising the steps of:

periodically checking at said computer an ability to communicate with another of said computers; and marking objects from said another computer as unreliable when said computer cannot communicate with said another computer.

43. The method of claim 37, further comprising the step of generating an event on said network at a remote computer for receipt by said computer when a monitored object has changed.

44. The method of claim 37, further comprising the step of tracking at said computer a station object corresponding to another of said computers.

45. The method of claim 37, further comprising the steps of:

tracking at said computer a universal object identifier corresponding uniquely with each object in a combination of said sets of topology data;

tracking at said computer a local object identifier corresponding with each said object, said local identifier being unique relative to only one of said sets of topology data; and tracking at said computer a remote object identifier corresponding with each said object from a remote computer.

46. The system of claim 37, further comprising the step of establishing a hierarchy of object versions from said sets of topology data, said hierarchy defining an order regarding accuracy, wherein each of said topology object versions is respectively received from one of a plurality of computers and each of said computers is respectively located at a different region of said network.

47. The method of claim 39, further comprising the step of ordering said action objects in said remote station action list by one or more of the following considerations: action importance, action sequence, and action creation time.

48. The method of claim 39, further comprising the steps of:

identifying another of computers connected to said network as either one of managed and unmanaged; and preventing a remote station object corresponding to said another computer from being placed in said remote station list when said another computer is identified as unmanaged.

49. The method of claim 39, further comprising the steps of:

placing a head of said remote station action list on either of said global action list and said action wait list;

preventing each action object from residing in both said global action list and said action wait list at a given time; and processing said action objects in said global action list one at a time.

50. The method of claim 39, further comprising the steps of:

marking one of said action objects at a head of said remote station action list as nonexecutable;

preventing said one action object from being placed on said global action list; and preventing other actions regarding a corresponding remote station from being placed on said global action list.

51. The method of claim 46, wherein said step of establishing said hierarchy comprises the steps of:

receiving an old primary object and a secondary object;

defining said old primary object as a new primary object when said secondary object is marked for removal; and defining said secondary object as said new primary object when said old primary object is marked for removal.

52. The method of claim 46, wherein said step of establishing said hierarchy comprises the steps of:

defining said old primary object as said new primary object when a remote station monitoring said secondary object is either one of nonresponsive and unmanaged; and defining said secondary object as said new primary object when said station monitoring said old primary object is either one of nonresponsive and unmanaged.

53. The method of claim 46, wherein said step of establishing said hierarchy comprises the steps of:

defining said old primary object as said new primary object based upon a preprogrammed user preference; and defining said secondary object as said new primary object based upon another preprogrammed user preference.

54. The method of claim 46, wherein said step of establishing said hierarchy comprises the steps of:

defining said old primary object as said new primary object when said secondary object is unmanaged and said old primary object is managed; and defining said secondary object as said new primary object when said secondary object is managed and said old primary object is unmanaged.

55. The method of claim 46, wherein said step of establishing said hierarchy comprises the step of defining said secondary object as said new primary object when said secondary object is contained in another object that is another primary object.

56. The method of claim 46, wherein said step of establishing said hierarchy comprises the steps of:

defining said old primary object as said new primary object when said secondary object is from said remote station and is unmonitored locally by said station; and defining said secondary object as said new primary object when said secondary object is from said remote station and is monitored locally at said station.

57. The method of claim 37, further comprising the step of disregarding data outside of said preferred set during said combining step.

* * * * *

UNITED STATES PATENT AND TRADEMARK OFFICE
CERTIFICATE OF CORRECTION

PATENT NO. : 5,948,055
DATED : September 7, 1999
INVENTOR(S) : Eric A. Pulsipher et al.

It is certified that error appears in the above-identified patent and that said Letters Patent is hereby corrected as shown below:

Column 3,
Lines 35-36, delete "determining a various sets of topology data" and insert therefor -- determining various sets of topology data --

Column 26,
Line 3, delete "signal 32-bit" and insert therefor -- signed 32-bit --

Column 29,
Line 9, delete "block 21610" and insert therefor -- block 2610 --

Column 30,
Line 63, delete "block 2713 transfer to" and insert therefor -- Block 2713 transfers to --

Column 36,
Line 44, delete "umnonitored locally" and insert therefor -- unmonitored locally --

Signed and Sealed this

Ninth Day of July, 2002

Attest:

Attesting Officer

JAMES E. ROGAN
Director of the United States Patent and Trademark Office